Oct. 27, 1959   W. M. GRUBER   2,909,948
BALANCING EQUIPMENT
Filed May 15, 1956   18 Sheets-Sheet 1

INVENTOR
WARREN M. GRUBER
BY
Synnestvedt + Lechner
ATTORNEYS

Oct. 27, 1959     W. M. GRUBER     2,909,948
BALANCING EQUIPMENT
Filed May 15, 1956     18 Sheets-Sheet 2

INVENTOR
WARREN M. GRUBER
BY
Synnestvedt & Lechner
ATTORNEYS

Oct. 27, 1959  W. M. GRUBER  2,909,948
BALANCING EQUIPMENT
Filed May 15, 1956  18 Sheets-Sheet 4

INVENTOR
WARREN M. GRUBER
BY
Synnestvedt + Lechner
ATTORNEYS

INVENTOR
WARREN M. GRUBER
BY Synnestvedt & Lechner
ATTORNEYS

Oct. 27, 1959  W. M. GRUBER  2,909,948
BALANCING EQUIPMENT
Filed May 15, 1956  18 Sheets-Sheet 6

INVENTOR
WARREN M. GRUBER
BY
Synnestvedt & Lechner.
ATTORNEYS

Oct. 27, 1959  W. M. GRUBER  2,909,948
BALANCING EQUIPMENT
Filed May 15, 1956  18 Sheets-Sheet 7

INVENTOR
WARREN M. GRUBER
BY
*Synnestvedt & Lechner*
ATTORNEYS

Oct. 27, 1959 W. M. GRUBER 2,909,948
BALANCING EQUIPMENT
Filed May 15, 1956 18 Sheets-Sheet 8
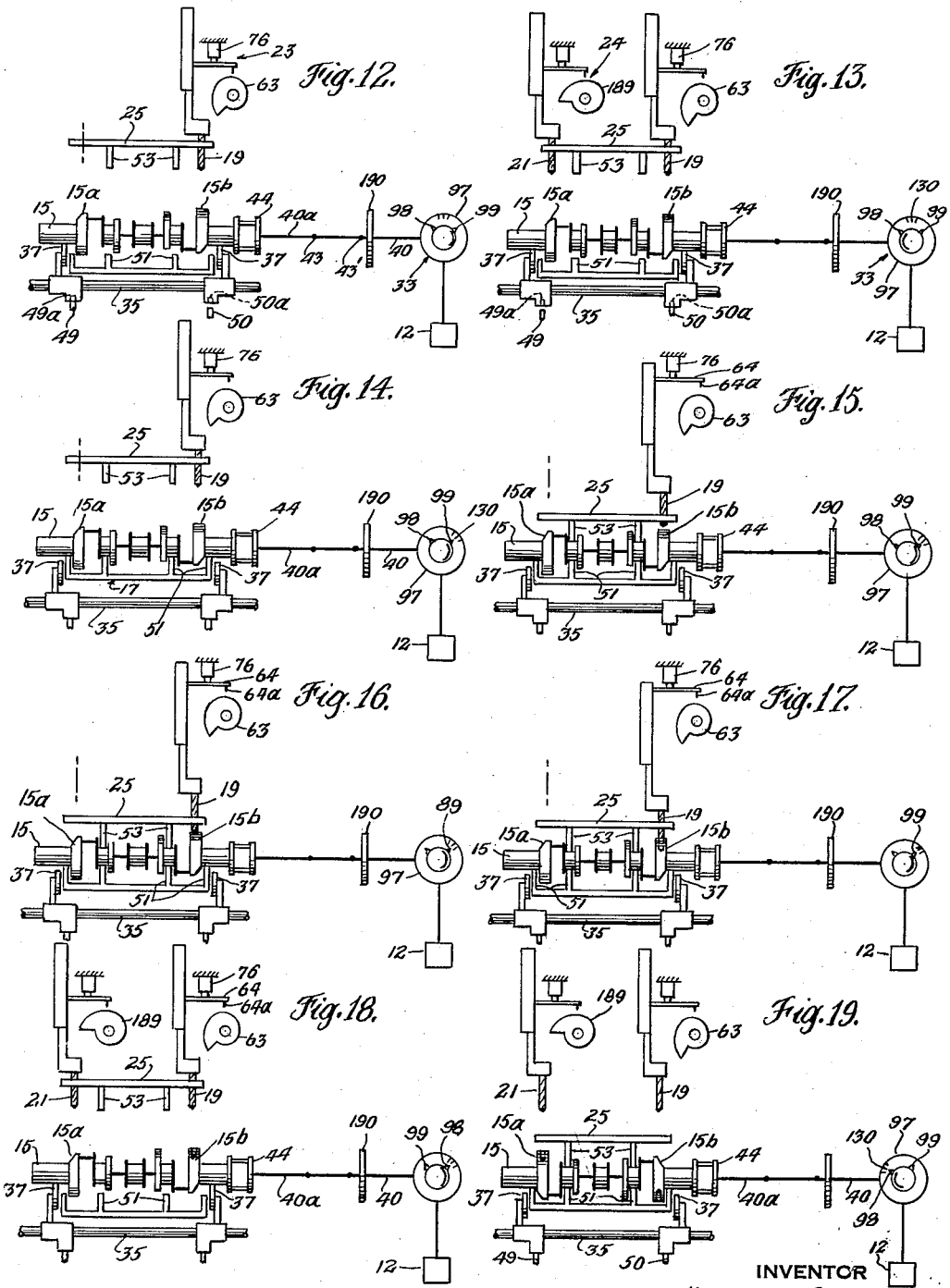
INVENTOR
WARREN M. GRUBER
BY
Synnestvedt & Lechner
ATTORNEYS

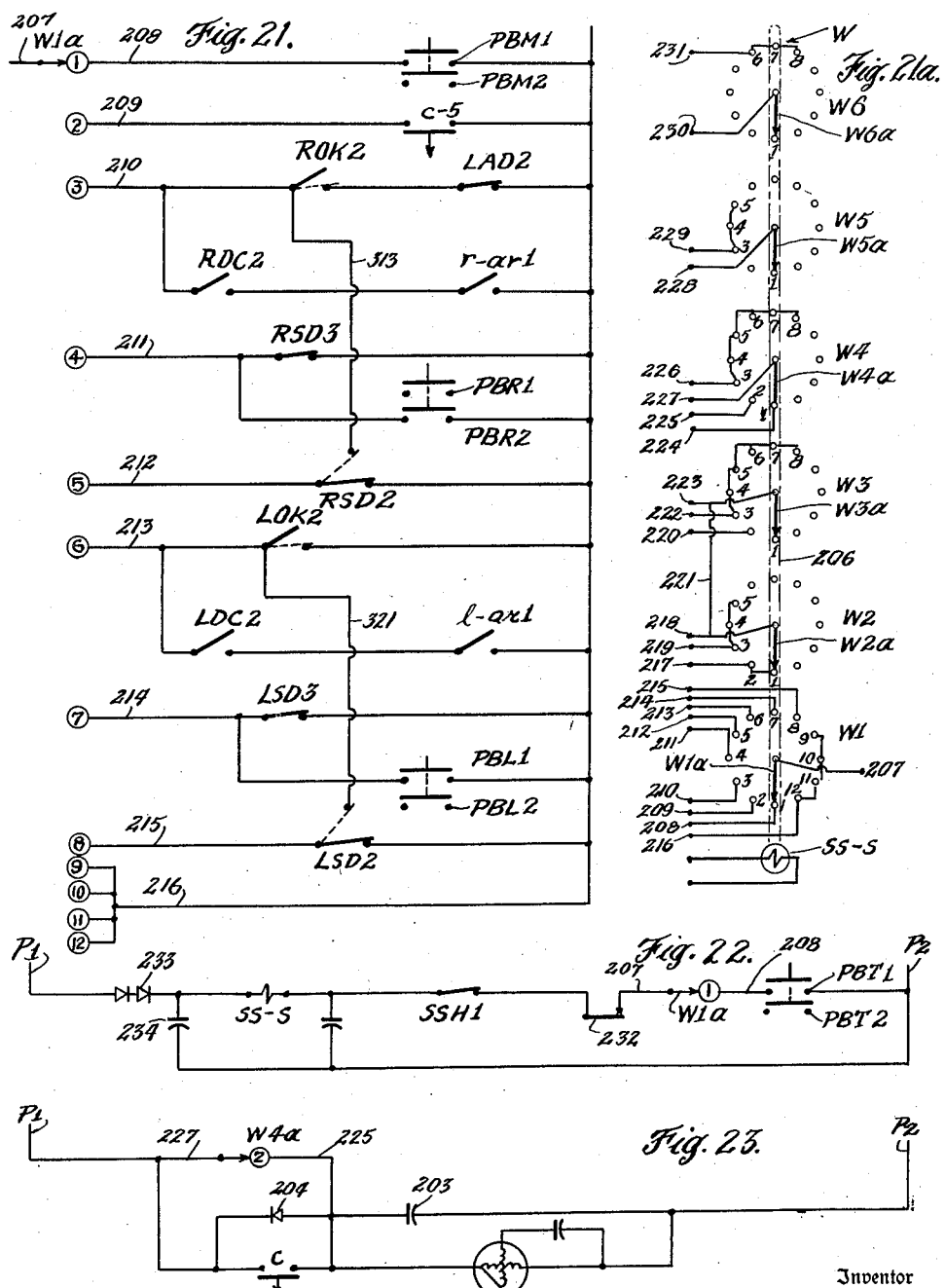

Oct. 27, 1959 W. M. GRUBER 2,909,948
BALANCING EQUIPMENT
Filed May 15, 1956 18 Sheets-Sheet 11
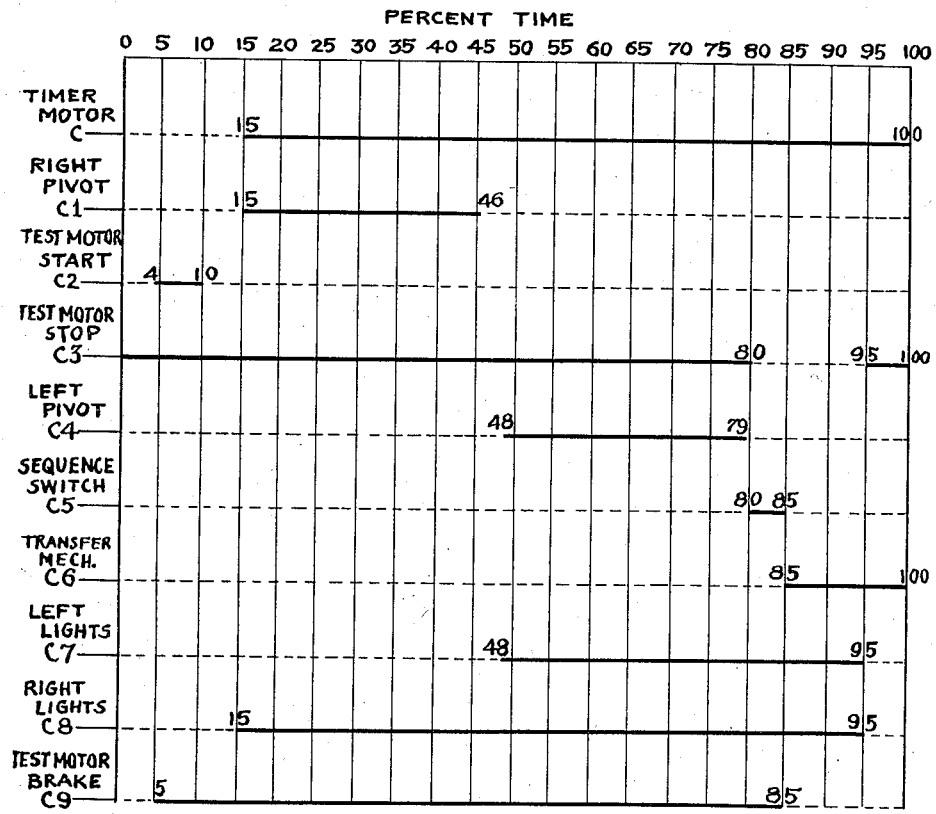
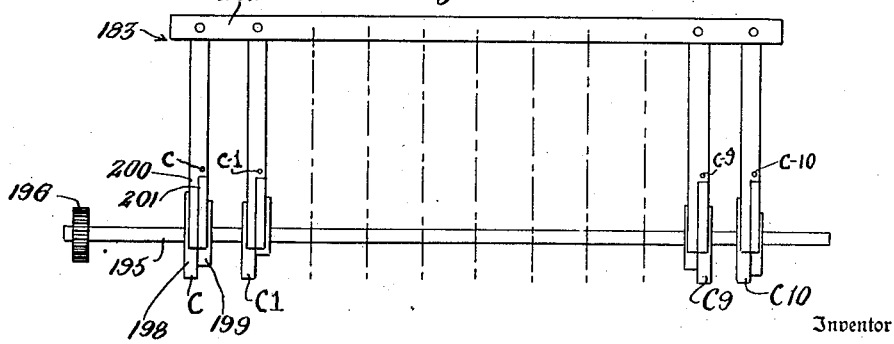
Inventor
WARREN M. GRUBER
By Synnestvedt & Lechner
Attorneys Inventor
WARREN M. GRUBER
By
Synnestvedt & Lechner
Attorneys Oct. 27, 1959 W. M. GRUBER 2,909,948
BALANCING EQUIPMENT
Filed May 15, 1956 18 Sheets-Sheet 13
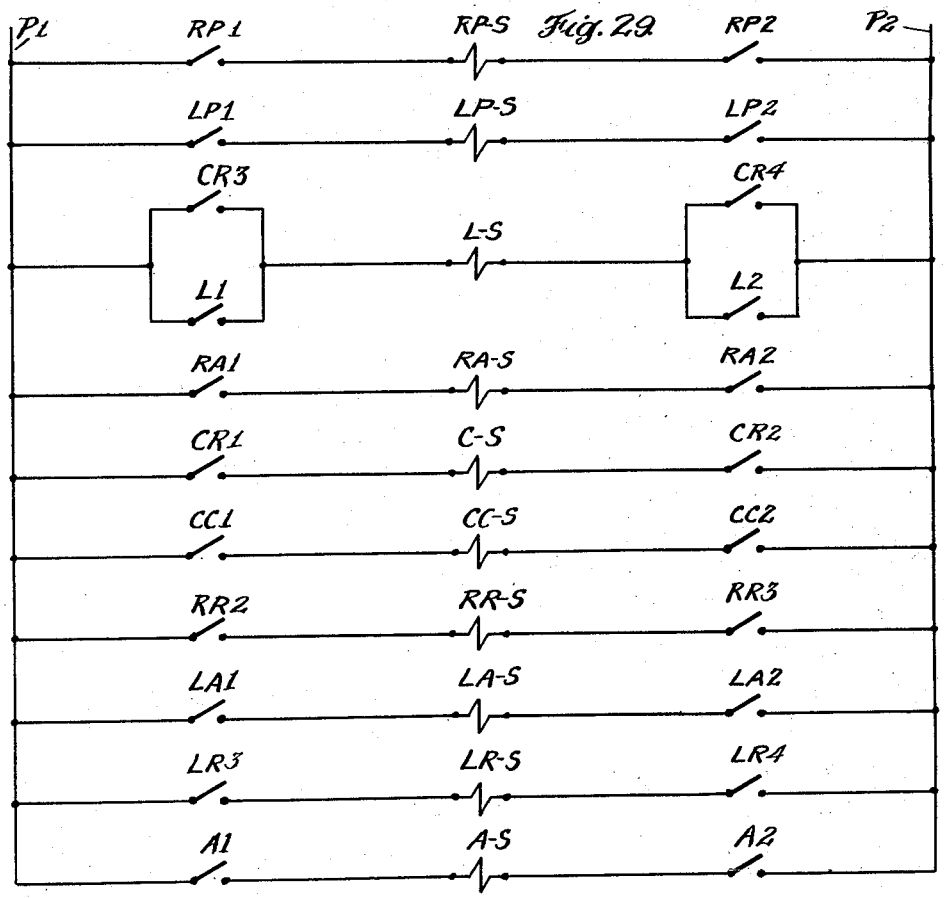
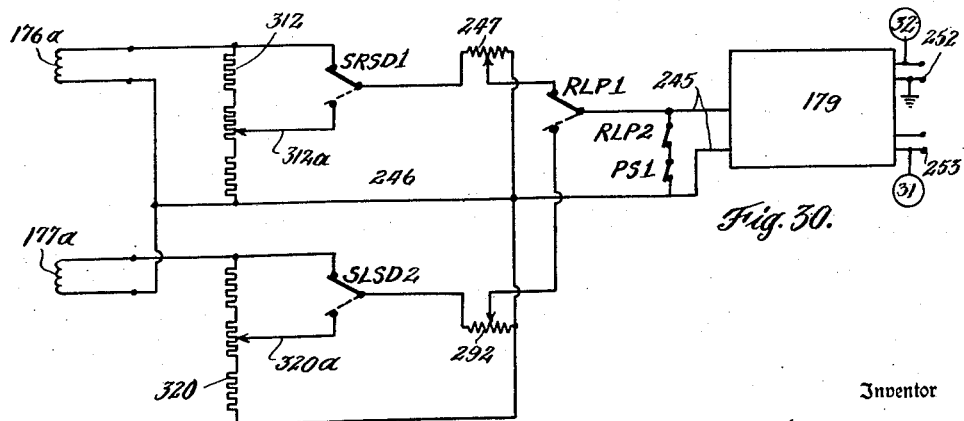
Inventor
WARREN M. GRUBER
By Synnestvedt & Lechner
Attorneys Inventor
WARREN M. GRUBER

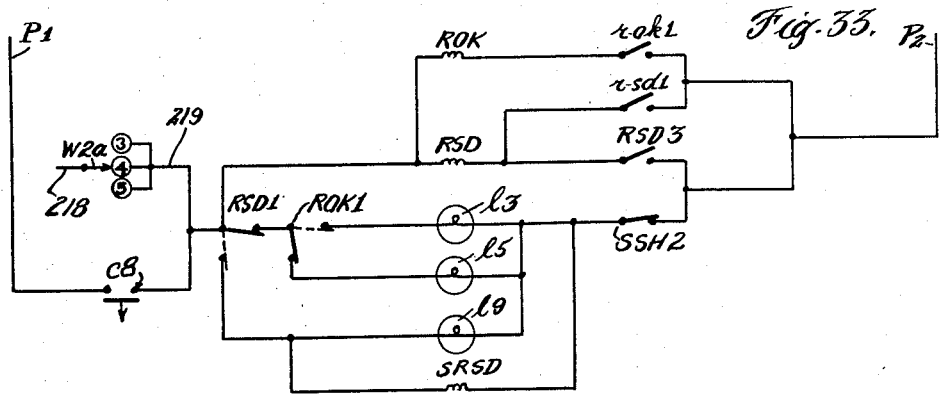
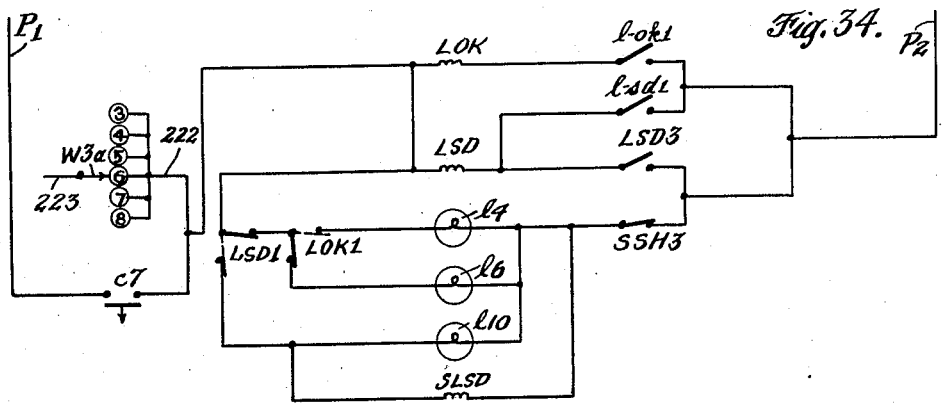
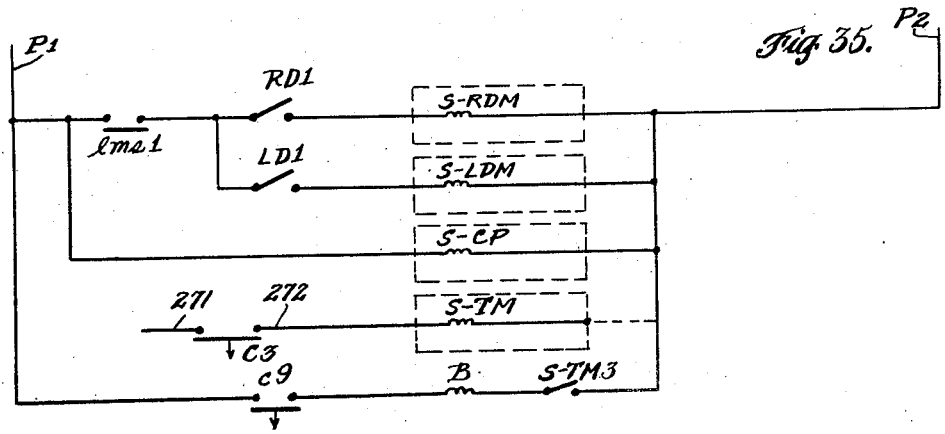

Oct. 27, 1959 W. M. GRUBER 2,909,948
BALANCING EQUIPMENT
Filed May 15, 1956 18 Sheets-Sheet 16
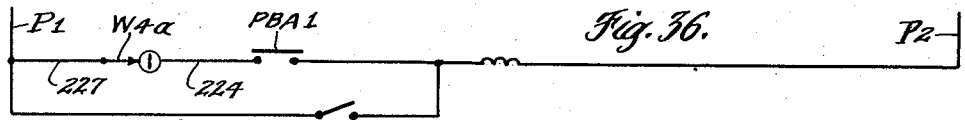
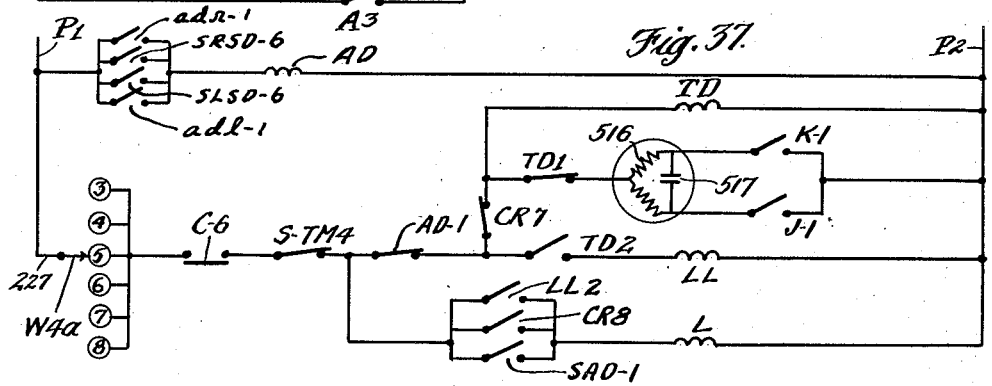
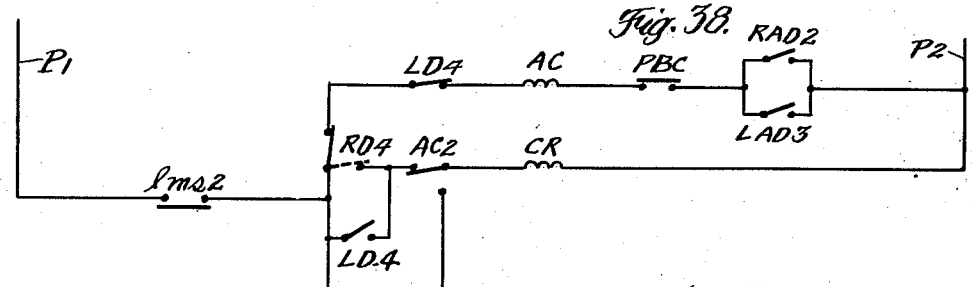
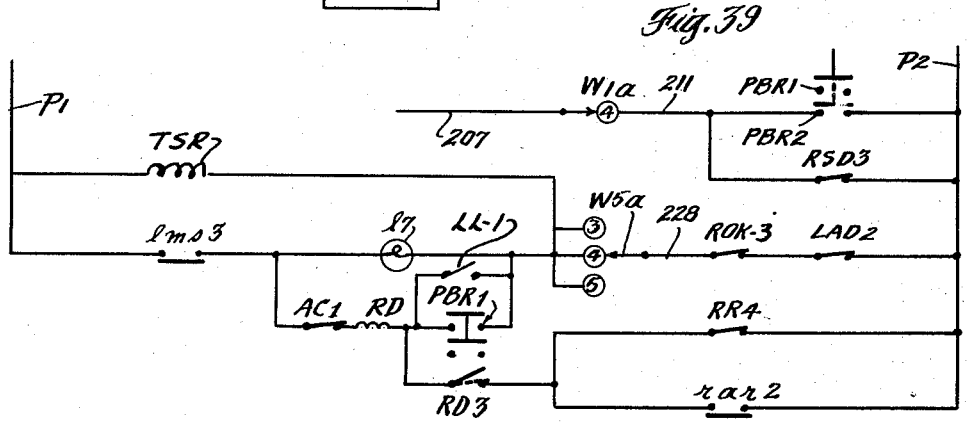
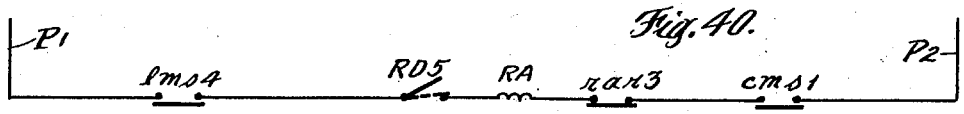
INVENTOR
WARREN M. GRUBER
BY
Synnestvedt & Lechner
ATTORNEYS Oct. 27, 1959 W. M. GRUBER 2,909,948
BALANCING EQUIPMENT
Filed May 15, 1956 18 Sheets-Sheet 17

Inventor
WARREN M. GRUBER
By Synnestvedt & Lechner
Attorneys

Oct. 27, 1959  W. M. GRUBER  2,909,948
BALANCING EQUIPMENT
Filed May 15, 1956  18 Sheets-Sheet 18
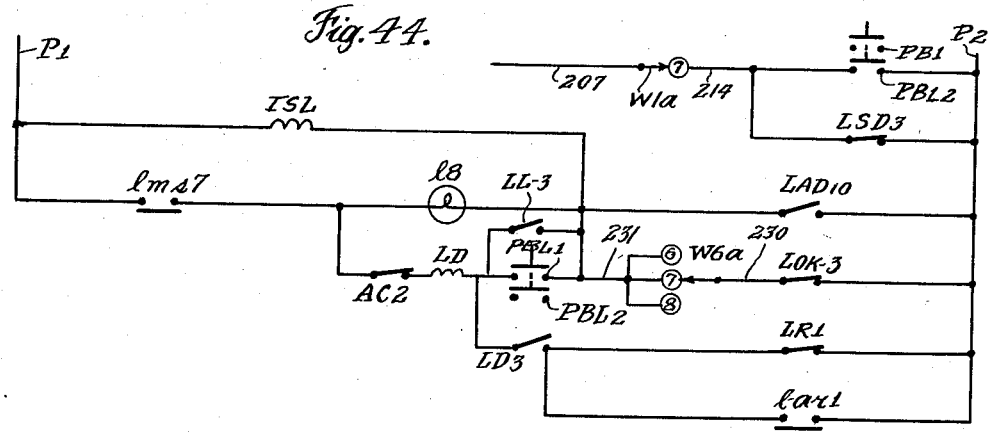
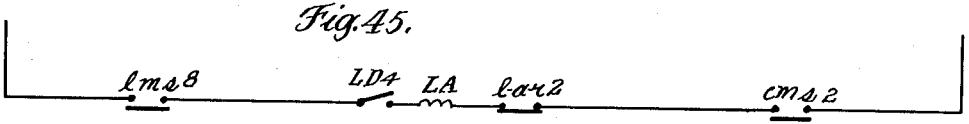
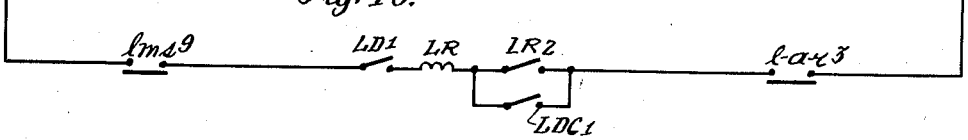
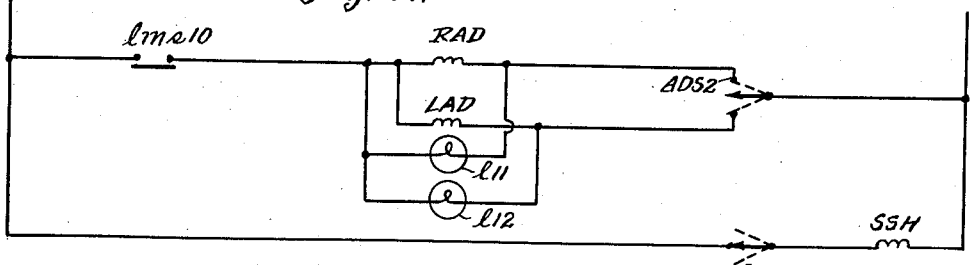
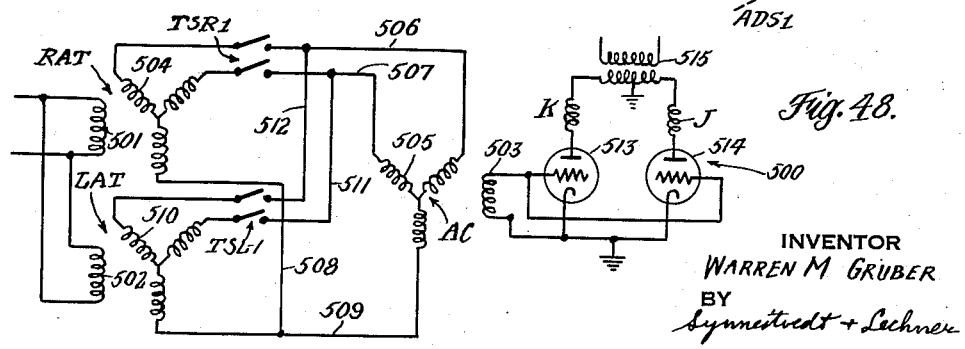
INVENTOR
WARREN M GRUBER
BY
Synnestvedt + Lechner
ATTORNEYS United States Patent Office 2,909,948
Patented Oct. 27, 1959

2,909,948

BALANCING EQUIPMENT

Warren M. Gruber, Horsham, Pa., assignor to Tinius Olsen Testing Machine Company, Willow Grove, Pa., a corporation of Pennsylvania Application May 15, 1956, Serial No. 584,941

5 Claims. (Cl. 77—5)

This invention relates to improvements in equipment for testing work pieces to determine unbalance therein and for correcting such unbalance.

One of the objects of the invention is to provide in equipment for balancing a work piece, means automatically operative to position the work piece with respect to means for correcting for unbalance therein.

Another object of the invention is to provide equipment for balancing a work piece including positioning mechanism which is automatically operative at the end of an unbalance determining operation to position the work piece with respect to mechanism for correcting for the unbalance and then initiate the correction operation.

Another object of the invention is to provide equipment for balancing a work piece including positioning mechanism which is automatically operative at the end of an unbalance determining operation to position the work piece in one plane of correction and then initiate operation of the correction mechanism for that plane and then position the work piece in another plane of correction and initiate the operation of the correction mechanism for that plane.

It is to be noted here that certain portions of the equipment preferably used in connection with the present invention shown herein are disclosed in copending application of John R. Stovall, Jr., et al., Serial No. 260,957, filed December 11, 1951, now Patent No. 2,779,217, and assigned to the assignee of the present invention.

The following is a brief description of the drawings:

Figure 2a is a diagrammatic view illustrating the connection between the drive motor and the positioner motor;

Figure 20:
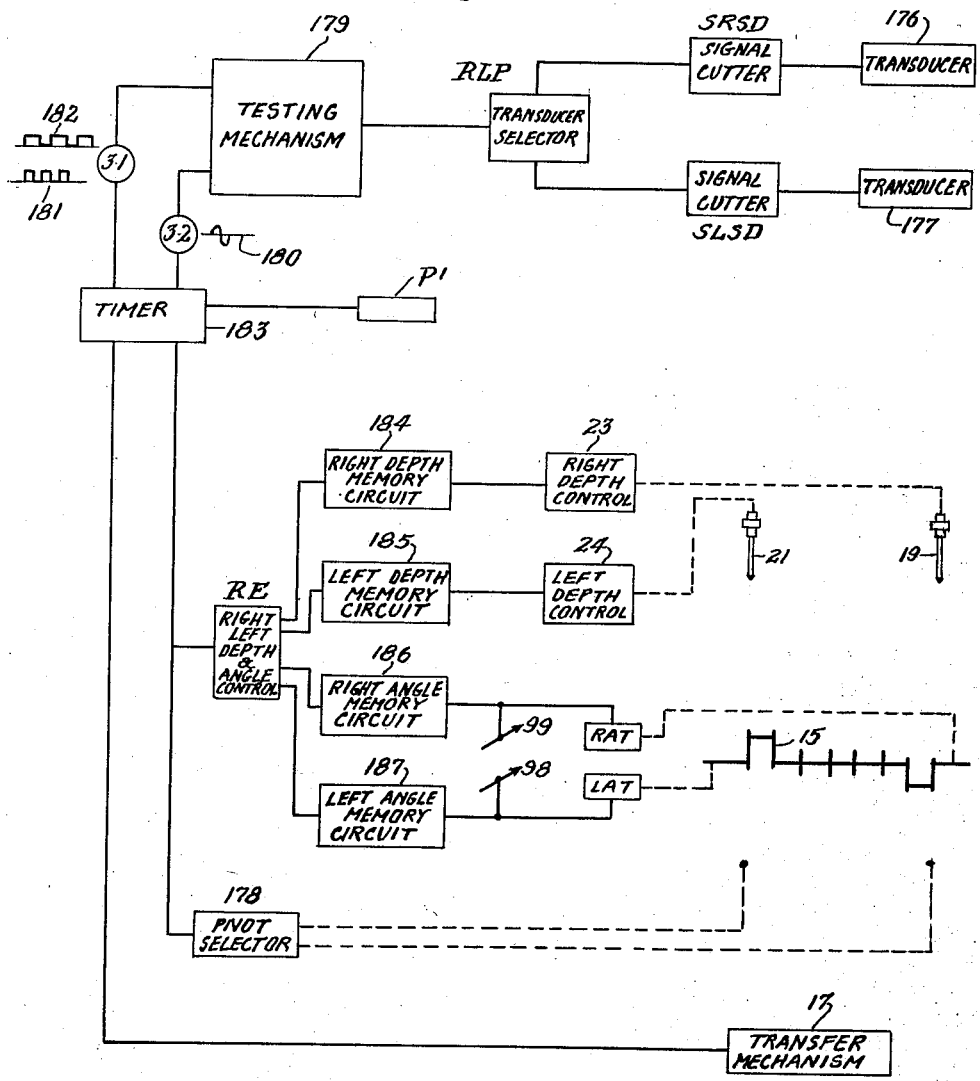
Figure 26:
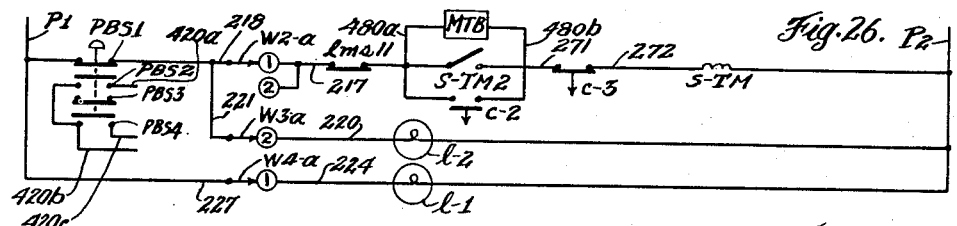
Figure 27:
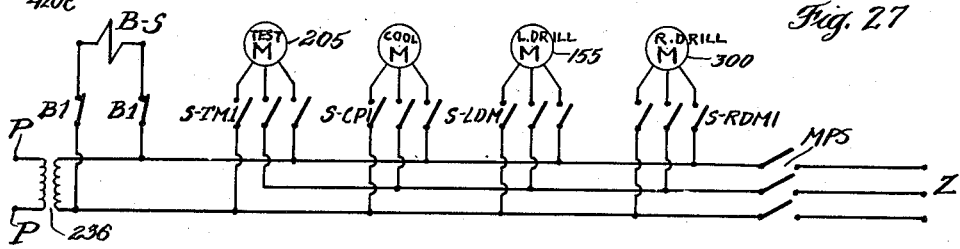
Figure 28:
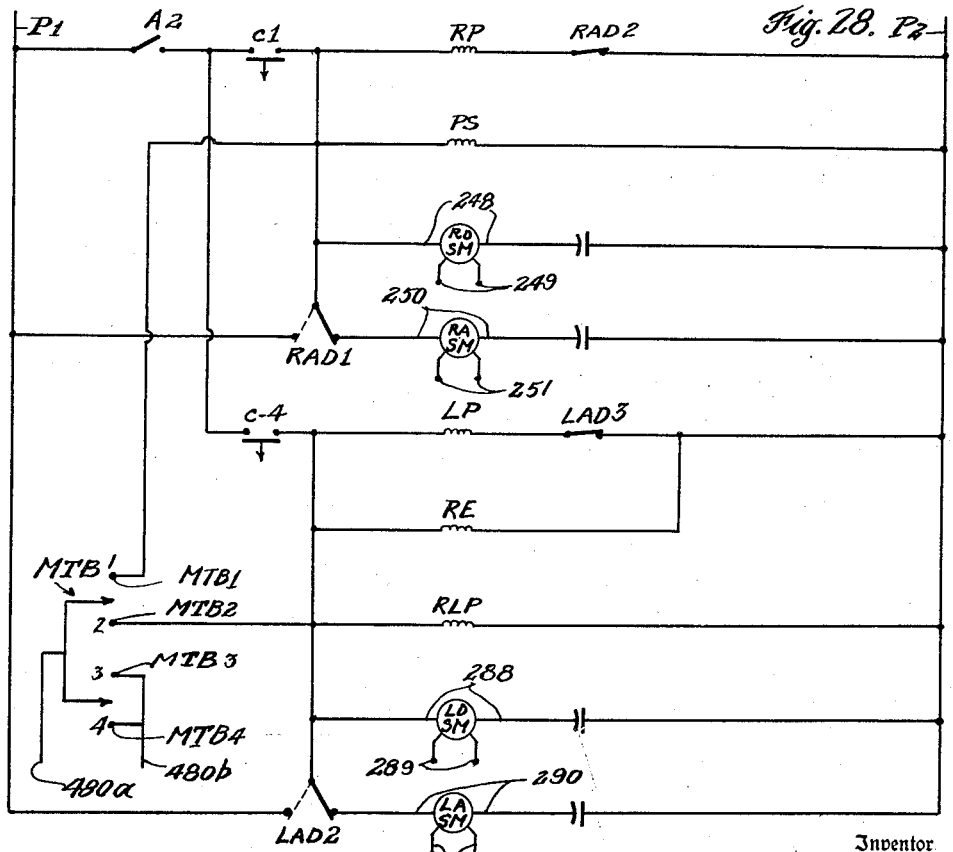
Figure 31:
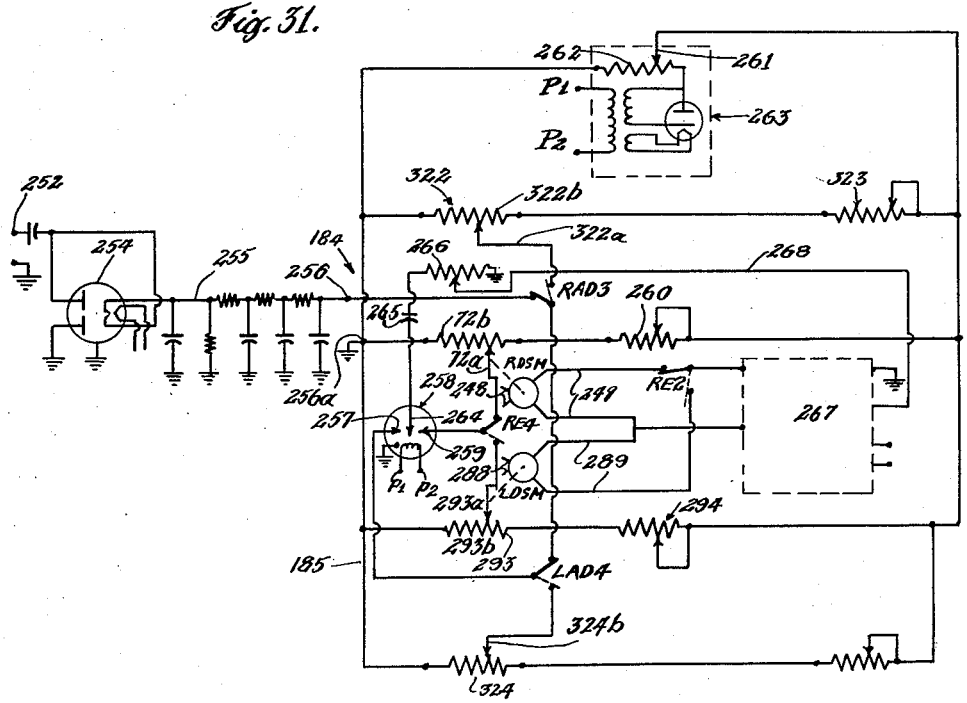
Figure 32:
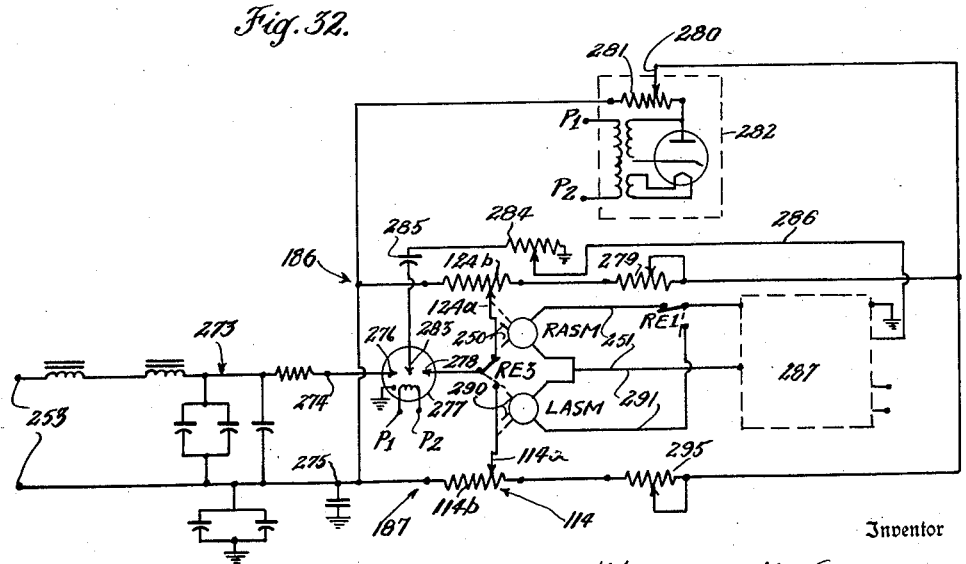
Figure 41:
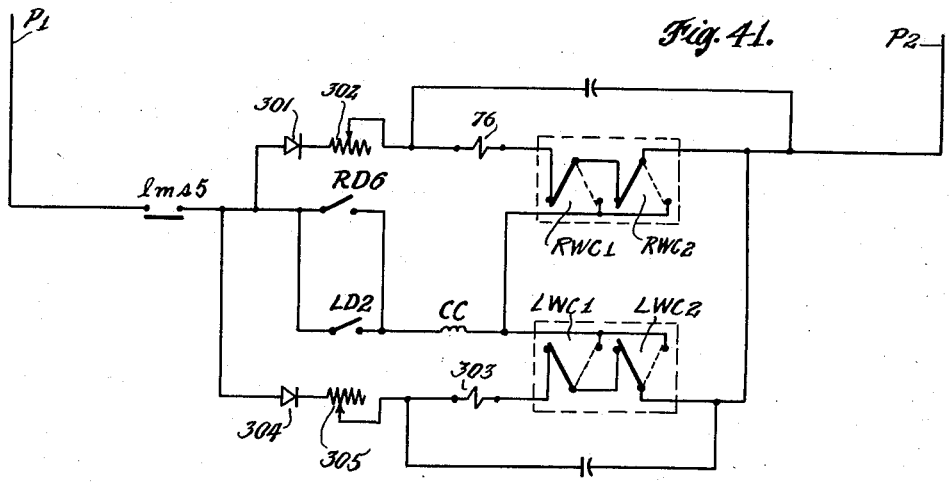
Figure 42:
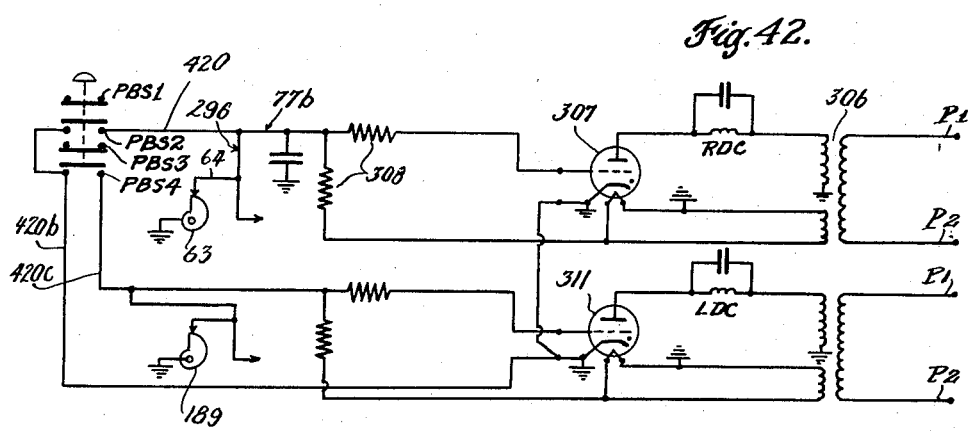
Figure 43:
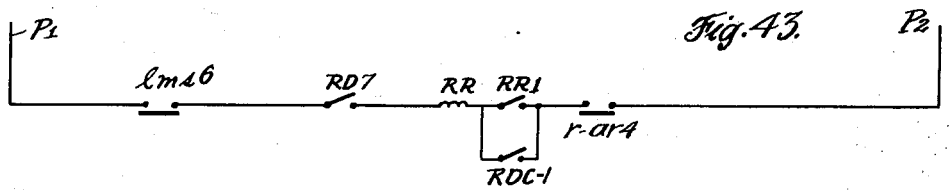

Figures 12 to 19 inclusive are diagrammatic views illustrating certain parts in various positions they assume in the sequence of operations of the machine;

Figure 20 is a block diagram diagrammatically representing the general interrelation of certain of the major components of the equipment;

Figure 21 is a schematic wiring diagram of a master circuit for controlling sequence of operations of the equipment;

Figure 21a is a somewhat diagrammatic exploded view of the wafers of the sequence controlling or stepping switch;

Figure 22 is a schematic wiring diagram of the circuit for initiating the operation of the testing cycle;

Figure 23 is a schematic wiring diagram of the circuit for controlling the operation of the timing mechanism including the timer motor;

Figure 24 is a timing chart illustrating certain of the operations of the timing mechanism;

Figure 25 is a diagrammatic view of the timing mechanism illustrating the relationship between the timer contacts and the timer cans;

Figure 26 is a schematic wiring diagram of the safety stop circuit;

Figure 27 is a schematic wiring diagram of the system power supply circuit together with the supply circuits of certain of the motors used in the present invention;

Figure 28 is a schematic wiring diagram of the pivot, transducer and servo motor circuits;

Figure 29 is a schematic wiring diagram of the circuits for controlling certain solenoids;

Figure 30 is a schematic wiring diagram of the input circuits to the testing mechanism;

Figure 31 is a schematic wiring diagram of certain memory circuits described hereinafter;

Figure 32 is a schematic wiring diagram of certain other memory circuits also described hereinafter;

Figure 33 is a schematic wiring diagram of certain of the right side (when viewed as in Figure 2) indicator lights, actuating switches and actuating relays;

Figure 34 is a schematic wiring diagram of certain of the left side indicator lights, actuating switches and actuating relays;

Figure 35 is a schematic wiring diagram of certain motor starters;

Figure 36 is a schematic wiring diagram of the control circuit for certain pneumatic mechanism used to change the operating condition of the equipment;

Figure 37 is a schematic wiring diagram of the circuit for setting up the positioner mechanism for operation and for actuating the mechanism for transferring the work piece from the testing to the correcting station;

Figure 38 is a schematic wiring diagram of the circuit for actuating the mechanism for clamping the work piece in the correcting station;

Figure 39 is a schematic wiring diagram of the right drill starter circuit;

Figure 40 is a schematic wiring diagram of the circuit for advancing the right drill;

Figure 41 is a schematic wiring diagram of the work piece contact switches, together with the circuit for supplying coolant to the drills;

Figure 42 is a schematic wiring diagram of the drilling depth contactor circuits for the drills;

Figure 43 is a schematic wiring diagram of the right drill return circuit;

Figure 44 is a schematic wiring diagram of the left drill starter circuit;

Figure 45 is a schematic wiring diagram of the circuit for advancing the left drill;

Figure 46 is a schematic wiring diagram of the left drill return circuit;

Figure 47 is a schematic wiring diagram of the circuit for controlling certain auxiliary or manual drilling operations; and Figure 48 is a schematic wiring diagram of certain circuitry of the positioner mechanism.

GENERAL ARRANGEMENT OF THE EQUIPMENT

Figure 1:
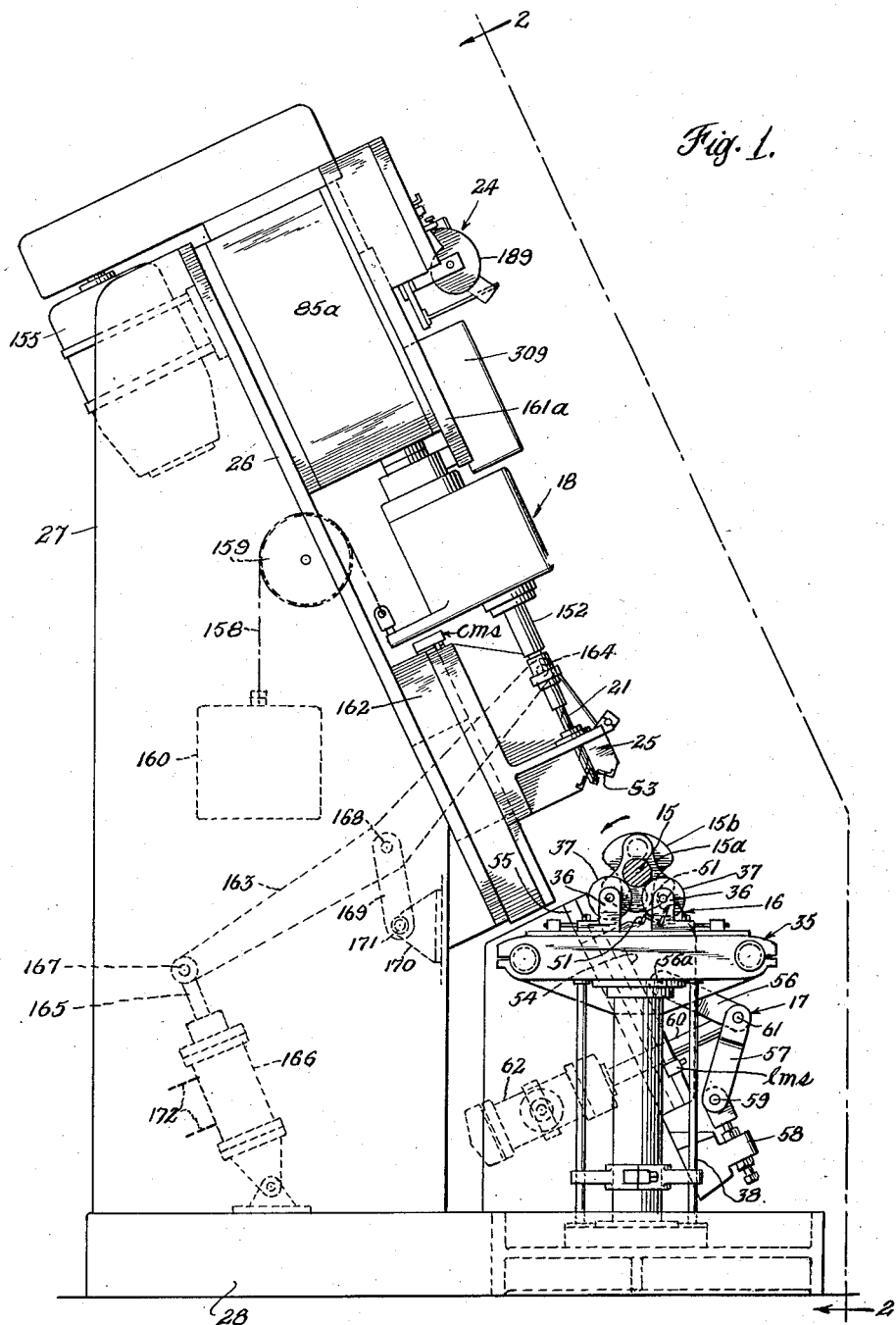
Figure 1 is a side elevational view of a machine for determining and correcting for unbalance in a crankshaft.
Figure 2:
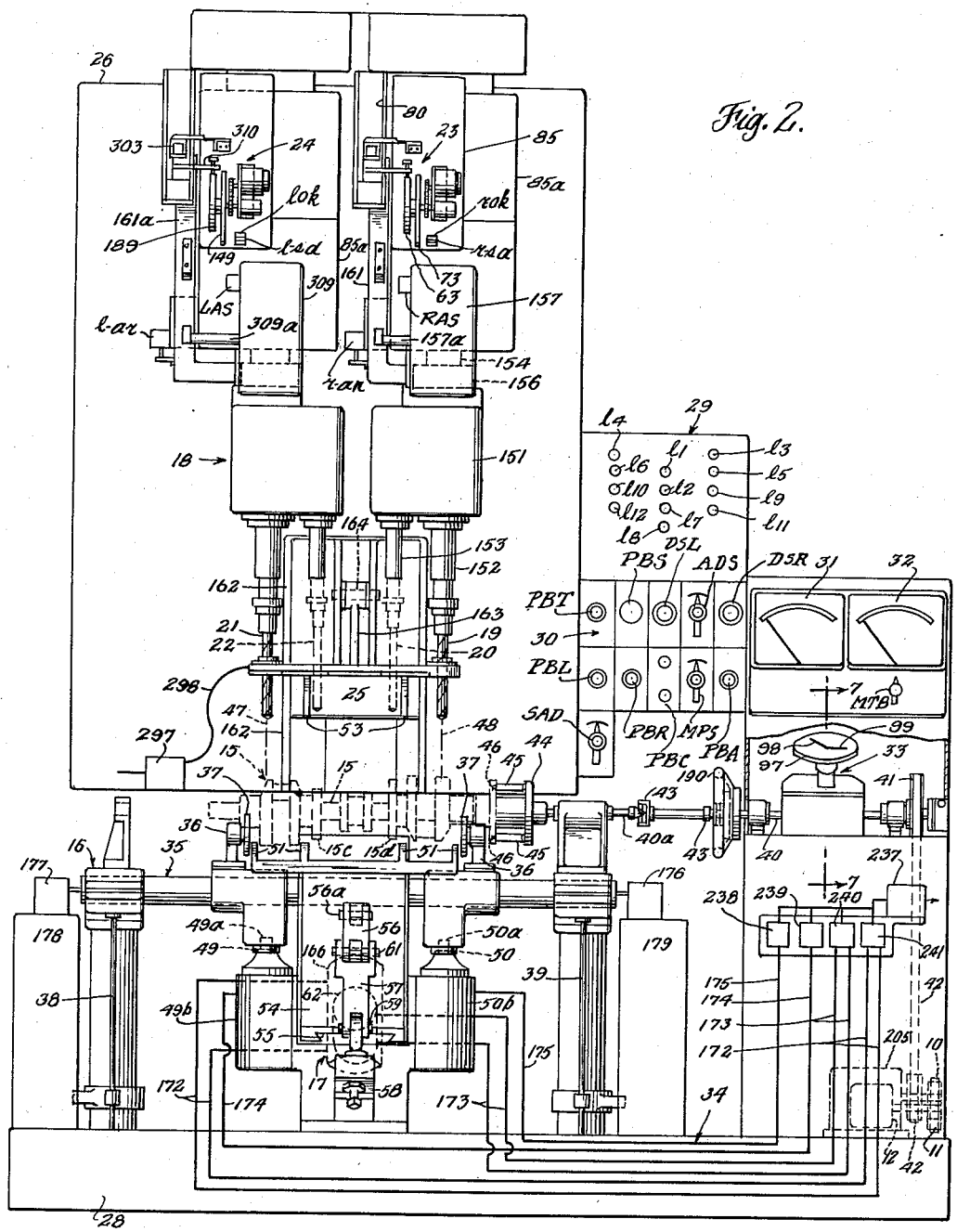
Figure 2 is a front elevational view of the machine, viewed as indicated by the line 2—2 of Figure 1 with certain control panels and pneumatic connections added.

The general arrangement of the equipment of the present invention is shown in Figures 1 and 2 and the physical relationship of certain of the parts of the invention will be briefly described in the paragraphs following.

The mechanism for supporting and rotating a work piece, for example, a crankshaft 15, is generally indicated by the reference numeral 16. The mounting arrangement includes means for supporting the crankshaft in a testing station or position for determining the dynamic unbalance of the work piece and means for supporting the work piece in a correction station or position for performing a correction operation. The mechanism for transferring the work piece from one station to the other is indicated at 17. Certain portions of the mechanism for properly positioning the crankshaft, namely, the servo motor 12, are shown on the lower right-hand side of Figure 2.

The correction mechanism is generally indicated by reference numeral 18. Included in the correction mechanism are right drill 19, right auxiliary drill 20, left drill 21 and left auxiliary drill 22. These drills are mounted for traverse toward and away from the work piece 15. The mechanism to control the traverse of the right drills 19 and 20 is indicated at 23, while the mechanism for control of the traverse of the left drills 21 and 22 is indicated at 24. Also shown in Figures 1 and 2 is a clamp 25 which is adapted to secure the work piece during the correction operation. As is clearly illustrated in Figure 2, the above referred to mechanisms are supported on the back plate 26 and the upright member 27. Also, it is to be observed that the mechanisms for supporting and rotating the work piece, and the member 27 are mounted on the base plate 28.

As is best seen in Figure 2, the operator's control board consists of signal light panel 29, pushbutton panel 30 and meters 31 and 32. The controls shown on the pushbutton panel are for initiating certain of the testing and correction operations to be later described. The lights on the light panel indicate to the operator certain information regarding unbalance in the work piece and also information regarding the correction operation being performed. Meter 31 indicates the angular orientation of unbalance in the work piece while meter 32 indicates the amount of unbalance.

Also shown in Figure 2 is the indicating mechanism 33, which provides information for the operator relative to the angular location of unbalance.

Certain of the controls and fluid lines for the pneumatic system utilized in the equipment are indicated in Figure 2 by the reference numeral 34.

Cooling fluid is supplied to the drills through control mechanism 297 and fluid line 298.

It is pointed out that the physical locations of the various elements for the control systems of the present invention, for example, the relays, contacts, switches, electron tubes, and wiring interconnections, are not shown in Figures 1 and 2. In the preferred embodiment of the invention, these elements are located in a housing on the back side of the panels 29 and 30. These various elements are shown in schematic form in Figures 21 through 48, and will be referred to in detail in the description of the control systems given later.

DETAILED DESCRIPTION OF THE EQUIPMENT

Having described the general physical relationship of certain of the components of the invention, these components will be described in greater detail, particularly certain of the mechanical parts.

Mounting mechanism—Testing station

The mechanism for mounting the work piece (in this instance, a crankshaft) in a testing station to perform the testing operation will be described first.

Referring to Figure 2, the crankshaft 15 is supported in cradle 35. The crankshaft is adapted to be rotatably supported by means of members 36—36 which are interconnected with the cradle 35 and carry rotatable idling disks 37—37 on which the crankshaft rests. The cradle is mounted on flexible upright rods 38 and 39, providing freedom for oscillation of the cradle and thus of the work piece. The rotating or driving mechanism for the crankshaft consists of a drive shaft 40 carrying pulley 41 adapted to be driven by motor 205 by belt 42. Included in the driving mechanism are universal joints 43—43', accommodating oscillation of the work piece. The crankshaft is adapted to be coupled with the drive shaft by means of member 44 which is axially slidable on shaft 40a. Member 44 has pins 45 which are adapted to engage holes 46 on the crankshaft.

When the crankshaft is rotated, centrifugal force exerted by the unbalance will tend to cause the work piece and the cradle to oscillate in a sinusoidal manner with a displacement proportional to the amount of dynamic unbalance.

In an article such as a crankshaft it is preferred to test and correct for unbalance in two correction planes. Such crankshafts commonly have counterweights 15a and 15b which are angularly offset about the axis 180° from one another. The counterweights are such that the center of mass for each end of the crankshaft is located within the respective counterweights. The proper correction planes are located, for example, by planes drawn through the counterweights perpendicular to the axis of rotation of the crankshaft 15, the left correction plane being indicated by dotted lines 47 and the right correction plane by dotted lines 48. Such crankshafts are also commonly provided with auxiliary counterweights 15c and 15d, which are angularly offset about the axis 180° from one another. The mean diameter connecting these auxiliary counterweights is angularly oriented in a certain relation to the mean diameter through the main counterweights 15a and 15b. The foregoing features of a typical crankshaft are related to operations performed by the equipment of the invention.

For determining the unbalance in each of the correction planes, the cradle 35 is provided with left pivot 49 and right pivot 50. The pivots 49 and 50 are normally engaged with the corresponding holes 49a and 50a and are adapted to be selectively engaged and disengaged with their respective holes as by means of pneumatic piston and cylinder devices 49b and 50b, having air supply lines 174 and 175. The pivots are connected to pistons (not shown) in the cylinders which are spring-loaded to force the pivots upwardly into engagement. Air pressure forces the pistons down to disengage the pivots.

As mentioned above, the crankshaft 15 is coupled to the driving source by the universal joints 43—43', the joints allowing the cradle and crankshaft to oscillate freely about either of the pivots with no apreciable restraining forces from the driving source.

Positioning mechanism

As mentioned above, the crankshaft, during an unbalance determining operation, is rotated through the drive connected to the motor 205. This same drive is used in positioning the crank. As seen in Figures 2 and 2a, the motor 205 has pulleys 42' and 10 on the same shaft, the pulley 10 being connected to pulley 11 on the motor 12 by the belt 13. During an unbalance determining operation, the motor 205 is energized while the motor 12 is deenergized, and it will be apparent that rotation of motor 205 will cause rotation of servo motor 12. During the positioning operation, the servo motor 12 is energized (with the motor 205 de-energized) and rotation of pulley 11, belt 13, pulleys 10 and 42', belt 42 and pulley 41 will cause rotation of shaft 40, hence rotation of the crankshaft.

In the embodiment shown, the motor 12 is a synchronous reluctance type motor. The use of this type motor has special advantages herein because it has practically instantaneous acceleration and deceleration characteristics, and this is desirable from the standpoint of the motor rotating to and stopping in the correct angular position in a minimum amount of time. Furthermore, its normal speed is low, which is desirable for positioning and also a simple pulley arrangement rather than a gear system can be used to obtain necessary speed reduction between the motor and the crank. Furthermore, I have discovered that this type of motor can be "back driven" at speeds greatly in excess of its normal operating speed; therefore, there is no necessity of a clutch to disconnect the motor 12 from the motor 205 when the latter is operated.

The circuitry for operating the motor 12 will be explained in connection with Figure 48.

The control circuit comprises a right angle transmitter RAT, a left angle transmitter LAT, an angle receiver AC, and a phase-sensitive device 500. The receiver and the two transmitters are preferably self-synchronizing induction machines. Each machine has a three-phase stator winding and a single phase rotor winding which is externally connected through slip rings.

The rotor windings 501 and 502 of the two transmitters are connected in parallel and energized from the same source and are respectively adapted to be positioned in accordance with the angle of unbalance in the right and left correction planes, as will be explained hereinafter. The rotor winding 503 of the angle receiver AC is connected to and rotatable with the crankshaft as will be explained later, and is also connected to the input of a phase-sensitive device 500. The stator windings 504 of the right angle positioner RAT are interconnected to the stator windings 505 of the angle receiver AC via lines 506, 507, 508 and 509. It will be noted that the lines interconnect corresponding terminals of the windings. The contacts TSR-1 in the lines 506 and 507 are for connecting and disconnecting the transmitter RAT with the receiver AC.

The stator winding 510 of the left angle positioner LAT is also connected to the stator winding 505 of the receiver by lines 509, 511 and 512 which interconnect corresponding terminals of the windings. The TSL-1 contacts in the lines 511 and 512 are for connecting and disconnecting the transmitter windings 510 with the receiver windings 505.

It will be apparent that the transmitters RAT and LAT are selectively interconnectible with the receiver AC by the action of the TSR-1 and TSL-1 contacts.

With regard to the phase-sensitive device 500, several standard types of such devices are commercially available such as the so-called phase-sensitive relays or phase-sensitive amplifiers. The device shown has two relays J and K which are adapted to be de-energized when the input through the device is zero and selectively energized, depending upon the phase of the input voltage. The device has tubes 513 and 514, whose grids are commonly connected to one side of the rotor winding 503 and whose cathodes are commonly connected to the other side of the winding 503. As will be apparent, the winding 503 forms the input to the device. In the plate circuits of the tubes are the relays K and J, both interconnected to plate supply transformer 515, which is energized from the same source as the rotors 501 and 502. It will be noted that when the input signal on the winding 503 is zero, neither tube will conduct so that both relays are de-energized.

Also, it will be noted that one or the other of the tubes will conduct, hence energizing its associated relay, depending upon the phase relationship of the input voltage to the voltage on the plate, i.e., a tube will conduct when both its plate and grid are positive.

The contacts of the relays K and J are used for driving the positioner servo motor 12, as will be seen from an inspection of Figure 37. In that figure it will be noted that when the contact K-1 of the relay K and the contact J-1 of the relay J are open, the winding 516 of the motor 12 is disconnected as between the power terminals P-1 and P-2. However, when K-1 is closed and J-1 open, the top half of the winding 516 is directly connected as between the power terminals while the lower half is connected through the capacitor 517. When the K-1 contact is open and J-1 closed, the lower half of the winding is directly connected while the upper half is connected through the capacitor 517. The effect of the foregoing is to cause the motor to turn in opposite directions, depending upon which relay is energized.

The manner in which the positioner circuit operates is explained following. The resultant magnetic field of the receiver is a function of the angular position of the transmitter rotor. If the receiver rotor is normal to the resultant field, no voltage will be developed therein; however, if at any other angle, a finite voltage will be developed whose phase is a function of the angle. This voltage in the receiver coil 503 is fed to the device 500 which, depending upon the phase of the voltage, energizes K or J, which close the K-1 or J-1 contacts (Figure 37) to cause the servo motor 12 to turn the crankshaft. Since the rotor 503 is interconnected to the crankshaft, the coil 503 turns until it assumes a known position with respect to the connected transmitter coil, i.e., until there is no voltage induced therein, hence no signal fed to the device 500, which opens both the K-1 and J-1 contacts to stop the operation of the motor 12. Thus, the crankshaft assumes a position as dictated by the transmitter coil, i.e., in accordance with the angle of unbalance.

The angle of unbalance is determined with respect to a known rotational position of the crankshaft and the drills are predeterminedly oriented with respect to this position. The stators of the transmitters and receiver are oriented so that positioning of the crank is with respect to said known point.

*Mounting mechanism—Correction station*

Upright supporting members of jaws or lift 51 shown in Figures 1 and 2 are adapted to be moved upwardly to engage the crankshaft and to bodily move the crankshaft out of engagement with the rollers 37. In typical equipment, the shaft is disengaged from the rollers so that the separation between the shaft and the rollers is approximately 1/64". When the shaft is disengaged as above described, the clamp 25, having jaws 53, is adapted to be moved downwardly so that the jaws engage the crankshaft. Thus, the crankshaft is securely held so that the correction operation may be performed as by drilling.

Although the mounting mechanism may take a variety of forms, there are certain advantages in using the type described. For example, disengaging the crankshaft from the rollers for the drilling operation eliminates the possibility of damage that might be done to the anti-friction bearings which serve to mount the rollers 37 or damage to the rollers themselves. In addition, damage that might be done by pressure applied to the flexible supports 38 and 39 as a result of the drilling operation is eliminated.

*Transfer mechanism*

The mechanism for upwardly moving the lift or jaws 51, i.e., for transferring the crankshaft from the testing station to the correction station, is generally indicated by reference numeral 17, and consists of a slide member 54 slidably mounted on a support 55. Member 54 is interconnected with the jaws 51 as is shown in Figure 2 and is actuated by toggle arms 56 and 57. The upper end of toggle arm 56 is connected to the slidable member 54 as by pivot 56a and the lower end of toggle arm 57 is connected to the fixed support 58 by pivot 59. The lower end of toggle arm 56 and the upper end of toggle arm 57 are connected together and interconnected with piston rod 60 by pivot 61. The piston rod 60 is connected to a piston within the cylinder 62. Actuation of the piston moves the piston rod 60 forward and backward, to move the slidable member 54 and the jaws 51 upwardly or downwardly by the action of toggle arms 56 and 57. The cylinder 62 is pneumatically operated via admission and exhaust lines 173.

When the jaws 51 are in the upward or correction position, the toggle arm 57 has pivoted upwardly and is adapted to engage the transfer microswitch *lms*. The switch has various contacts which are opened or closed depending upon whether the switch is actuated. These contacts will be referred to more in detail in connection with the description of the various control circuits. The purpose of the switch is to condition various of the control circuits for operation only when the transfer mechanism is up or down.

Although the transfer mechanism may take a variety of forms, there are certain advantages in using the single toggle arm arranged for movement in a plane transverse to the axis of rotation of the piece. For example, in the described arrangement, the toggle mechanism and the actuating cylinder are "in line" approximately at the center of the crankshaft. This arrangement provides ample room for chip collecting pans and, therefore, aids in avoiding collection of chips on certain of the working parts.

Correction mechanism

Certain components of the correction mechanism serving to rotate the drills and to provide for movement up and down are not described in detail, as they form no part of the invention per se. However, brief reference is made to the right side drill mechanism to explain the general arrangement.

As is seen in Figures 1 and 2, the drills 19 and 20 are supported from a housing 151 by means of spindles 152 and 153. The drills are detachable from the spindles by means of suitable chucks. The housing 151 encloses a gear arrangement for connecting the spindles to shaft 154 (Figure 2) which is interconnected with the right drill drive motor (not shown). The right drill drive motor is mounted in a similar manner as left drill drive motor 155 (Figure 1).

The drills and the parts 152, 153, 151 and 154 are adapted to be moved upwardly and downwardly by hydraulic controls enclosed within housing 157 and other parts (not shown). Housing 157 is mounted on a fixed member 85a and, therefore, does not move with the drills. The drill mechanism is counterweighted by means of a counterweight 160 connected thereto by means of cable 158 and pulley 159.

Figure 5:
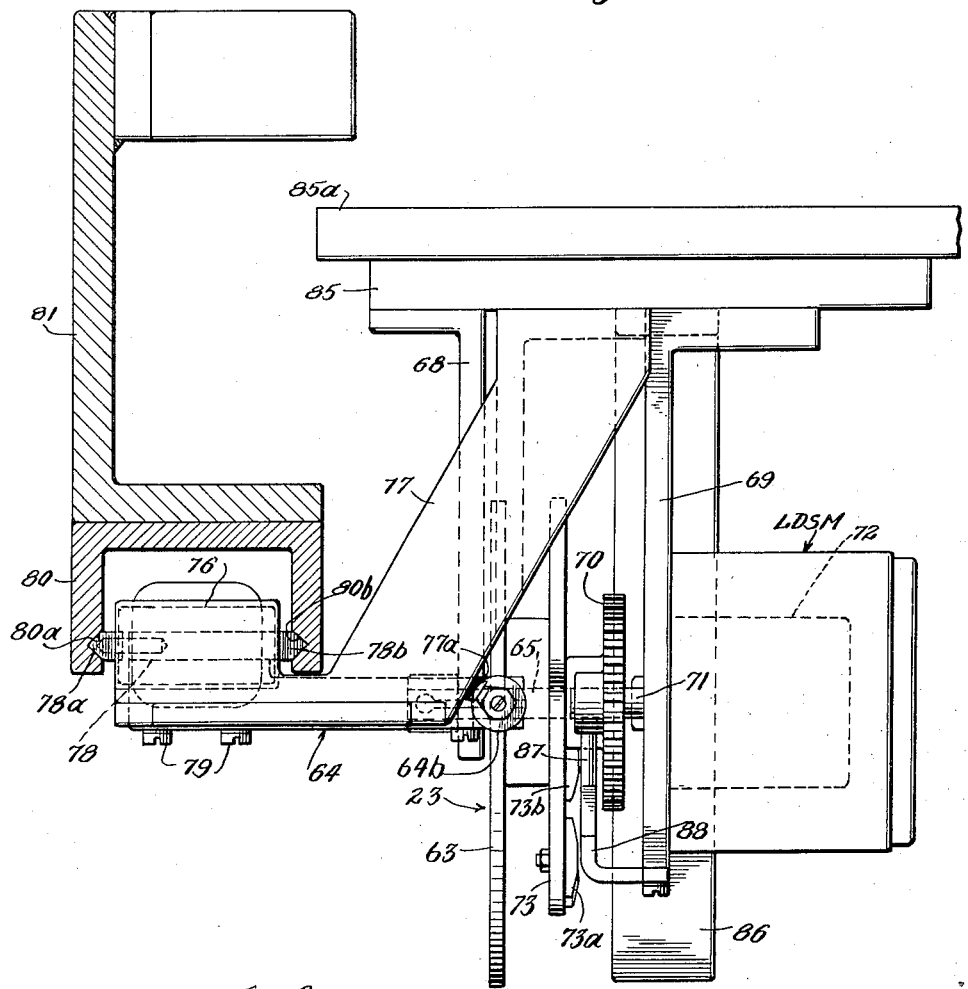
Figure 5 is a plan section taken on the line 5—5 of Figure 4.

Vertically extending member 161 is attached at its lower end to the part 156 secured on the top of housing 151. As seen in Figure 5, a channel member 80 and another structural member 81 are attached to the upper part of member 161. These components also move upwardly and downwardly with the drills for a purpose later described.

In Figure 2 the right advance return microswitch *r–ar* is secured to the lower left side of fixed plate 85a. A switch operating element is secured to the lower end of vertically extending member 161. The left advance-return microswitch *l–ar* is similarly arranged on the left-hand side. These switches have various contacts which condition certain of the control circuits for operation according to the position of the drills.

Depth control mechanism

Depth control mechanisms 23 and 24 respectively control the traverse of the right drills 19 and 20 and left drills 21 and 22 with respect to the crankshaft, i.e., control the extent to which the drill penetrates the crankshaft and, therefore, control the amount of metal removed.

Mechanisms 23 and 24 are identical in construction and, therefore, reference will be made to only one of them (23). This mechanism is shown in detail in Figures 3, 4 and 5.

Figure 4:
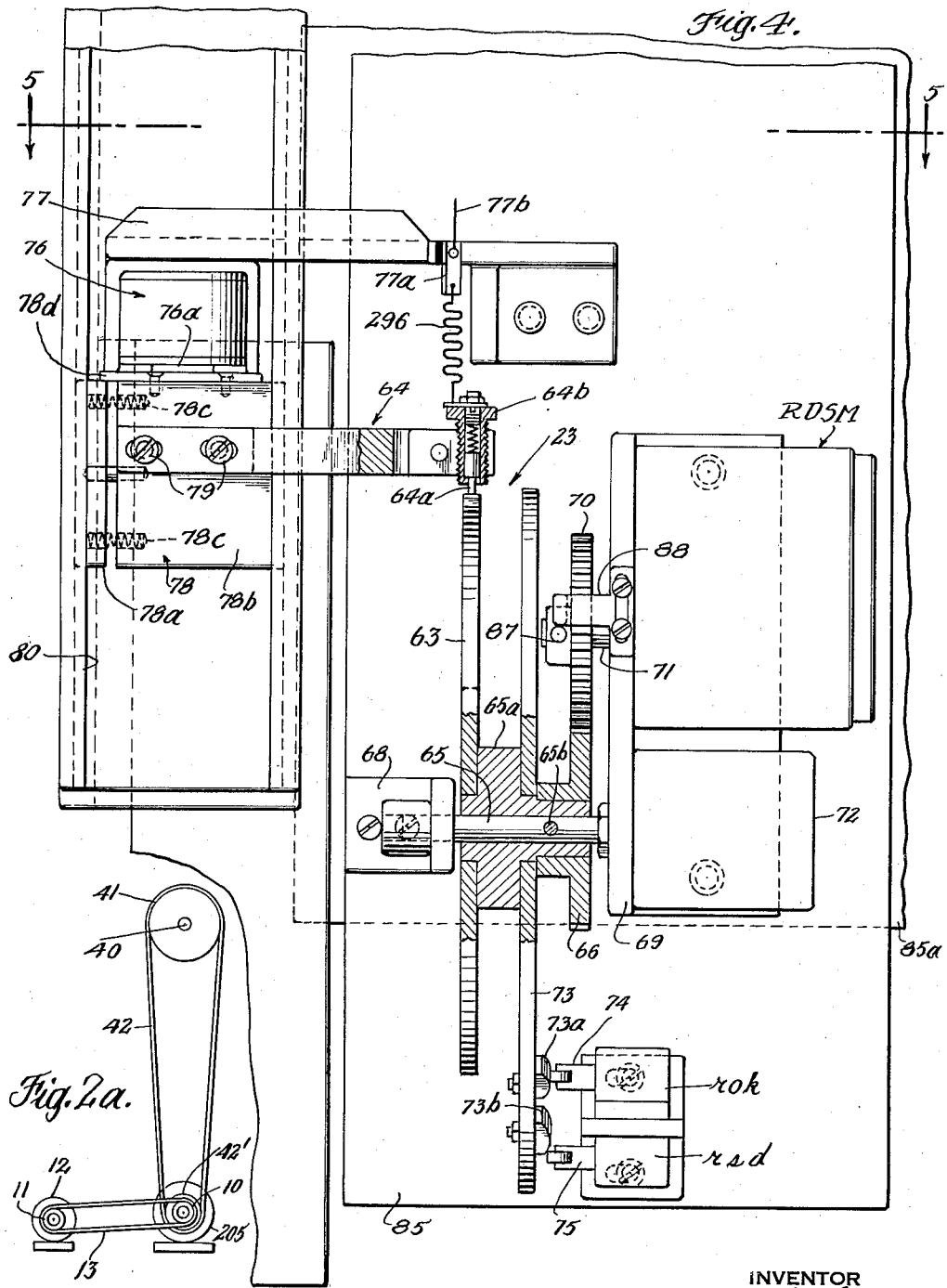
Figure 4 is a front view of the mechanism of Figure 3 with certain parts appearing in section.

As is shown in Figure 4, sleeve 65a is secured to shaft 65 by means of pin 65b. The cam 63, the gear 66 and the operating arm 73 are each secured on the sleeve 65a. The shaft 65 is rotatably supported in fixed brackets 68 and 69 by means of bearings (not shown) and the brackets 68 and 69 are attached to support 85 which is secured to fixed support 85a. Gear 66 engages gear 70 which is attached to the shaft 71 of right depth servo motor RDSM. One end of shaft 65 is also attached to a movable arm of potentiometer 72.

The servo motor RDSM and the potentiometer 72 are fixedly secured to bracket 69. When the servo motor is actuated, the cam 63, the operating arm 73 and the movable arm (shown in Figure 31) of potentiometer 72 are rotated. The servo motor is adapted to drive clockwise or counter-clockwise in accordance with certain control systems to be described.

When the point X on the cam 63 is positioned directly under the follower contact 64a (Figure 3), the amount of unbalance in the right correction plane 48 of the crankshaft is zero. When the point Y on the cam is positioned directly under the follower contact 64a, the amount of unbalance is a "maximum." When points on the cam intermediate X—Y are positioned under the follower contact 64a, corresponding amounts of unbalance are present in the crankshaft.

Figure 3:
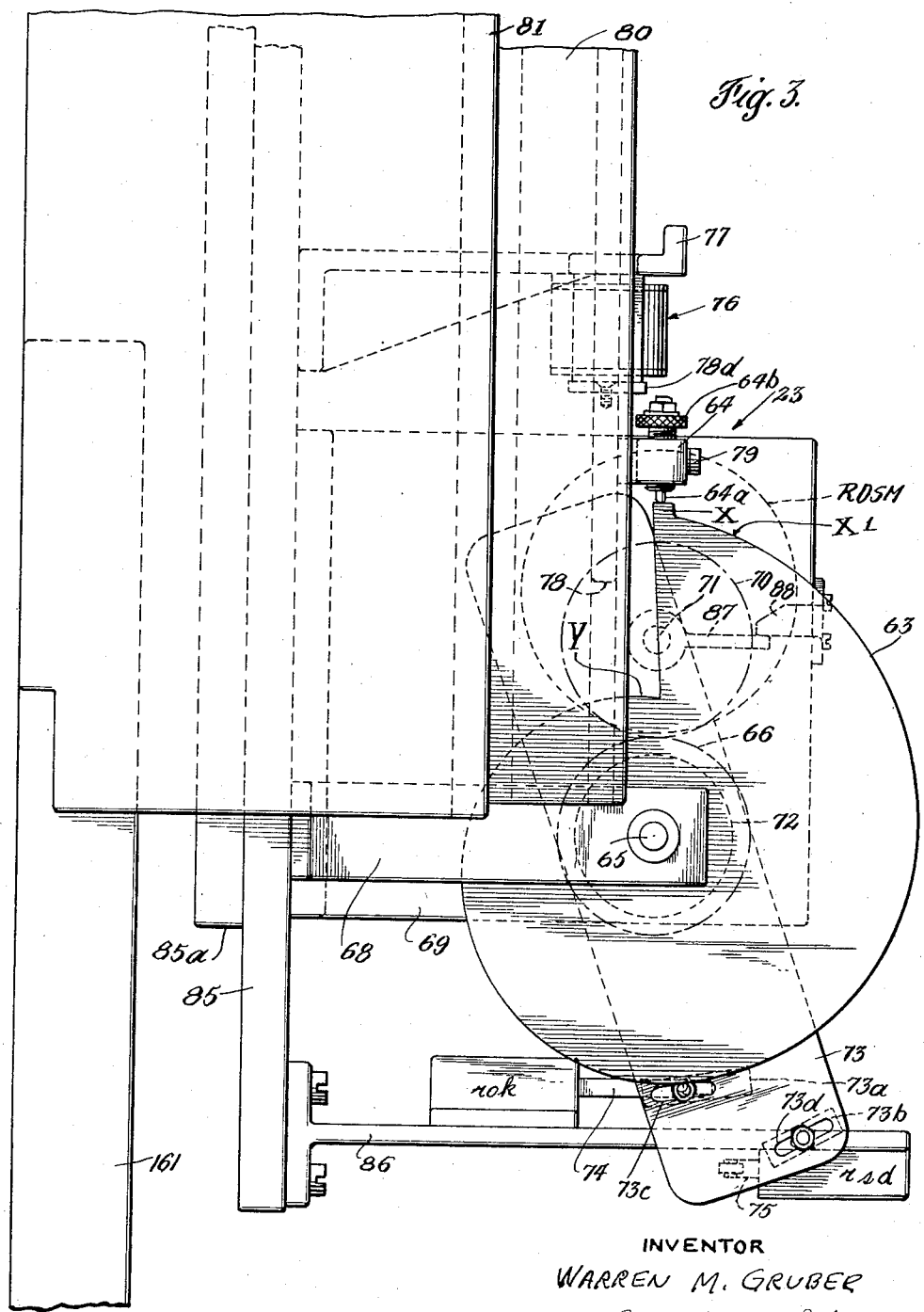
Figure 3 is an enlarged fragmentary elevational view of a drill traverse control mechanism employed in the machine.

The operating arm 73 is provided with cams 73a and 73b which are adapted to respectively contact the roller-equipped actuating arm 74 of the right "o.k." microswitch *rok* and the roller-equipped actuating arm 75 of the right split drill microswitch *rsd*. The *rok* and *rsd* microswitches are secured to bracket 86 which is mounted on support 85. When the servo motor RSDM acts to position the operating arm 73 as shown in Figure 3, the *rok* microswitch is actuated to condition certain mechanism to indicate that the unbalance is within permissable tolerance limits in the right correction plane, and, therefor, no correction operation is required. It is to be observed that the cam 73a is adjustable in slot 73c so that the *rok* microswitch is actuated when, for example, position X–1 is directly under the follower contact 64a. This is to take care of situations where some small amount of unbalance in the crankshaft is permissible.

When the servo drives the cam 63 so that the point Y is directly under the follower arm contact 64a, the operating arm 73 is positioned so that the cam 73b engages the actuating arm 75 of the *rsd* switch. Actuation of the *rsd* switch conditions certain equipment to indicate that the nature of unbalance is such that the correction operation in the right correction plane 48 must be effected by drilling out metal in the crankshaft in more than one angular position. This latter operation, called "split drill' will be described in detail hereinafter. The cam surface 73b in adjustable in slot 73d.

As is shown in Figure 4 the follower arm 64 is adjustably secured to slider 78 by means of screws 79. The parts 78a and 78b of slider 78 have V-shaped edge surfaces fitting the V-shaped grooves 80a and 80b of channel member 80. Springs 78c force the parts 78a and 78b apart to provide a frictional engagement between the slider 78 and the channel member 80. The spring pressure is such as to permit the slider 78 to move with the channel member 80 or to permit relative movement between the two parts. Channel member 80 is fixedly attached to bracket 81 (see Figure 5). As pointed out heretofore, both members 80 and 81 move upwardly and downwardly with the drills.

As is shown in Figure 4 the solenoid 76 is attached to bracket 77 which is secured to fixed support 85. Plate 78d, which is fixedly held to slider 78, is adapted to abut the core 76a of solenoid 76 and functions to hold slider 78 in fixed engagement with the core when solenoid 76 is energized.

The follower arm 64 is made from non-conductive material and is threaded at its outer end to receive a screw 64b which encloses spring-loaded follower contact 64a. The bottom end of flexible connector 296 is secured to the top of screw 64b and the top end of the connector is fixed to contact 77a, which is secured to and insulated from bracket 77. Conductor 77b is also secured to the contact 77a. The above-described arrangement makes for an electrical connection between conductor 77b and contact 64a, notwithstanding relative movement of these parts.

Thus, with the arrangement above-described, energizing of the solenoid 76 fixedly positions the follower while the channel member moves with the drill. When the solenoid 76 is de-energized, the follower is free to move with the channel member, due to its frictional engagement therewith, and hence will move with the drill.

It is to be observed that the position of the cam 63 as shown in Figure 3 prevents downward movement of the follower even if the solenoid were to be de-energized. However, as has been mentioned, this position of the cam represents no unbalance in the crankshaft and under such conditions, downward movement of the drill to remove metal is not required. It is to be observed, however, that in the event the cam were positioned, say, 90° counter-clockwise from that shown on Figure 3 (indicating unbalance), the follower contact 64a and the surface of the cam would be separated by a certain amount since the follower arm is held against downward movement by the energized solenoid. Under such a condition of separation, it will be readily understood that de-energization of the solenoid while the channel member 80 and the drill are moving downwardly, will cause the follower to also move downwardly. As will be pointed out more in detail in the description of certain of the control circuits, the solenoid 76 is de-energized when a drill tip contacts the crankshaft so that the follower contact 64a moves downwardly with the drill at the instant the drill begins to remove metal. The follower continues to move downwardly until the contact 64a engages the cam surface. At such time the downward movement of the drill is stopped and the drill withdrawn and returned to its normally raised position.

There are certain safety features used in connection with control mechanism 23. For example, as is best seen in Figure 3, an arm 87 is secured to shaft 71 of servo motor RDSM. When the motor positions the various parts secured to the shaft as shown, arm 87 engages the underside of stop 88 and in the event the motor continues to drive (counter-clockwise), further rotation of the shaft 71 is prevented. A similar stopping effect takes place when the motor positions point Y of the cam under the follower contact 64a. In this position, arm 87 contacts the upper side of stop 88 to prevent further (clockwise) movement of the shaft 71.

Figure 6:
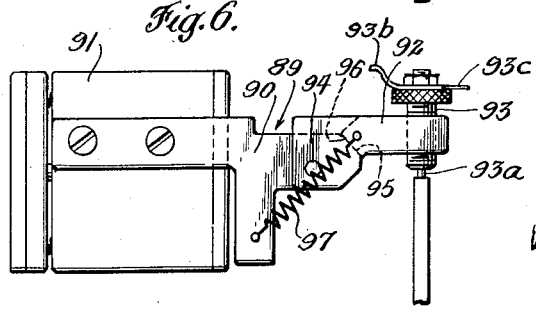
Figure 6 is a plan view of a modified part of the mechanism of Figure 4.
Figure 8:
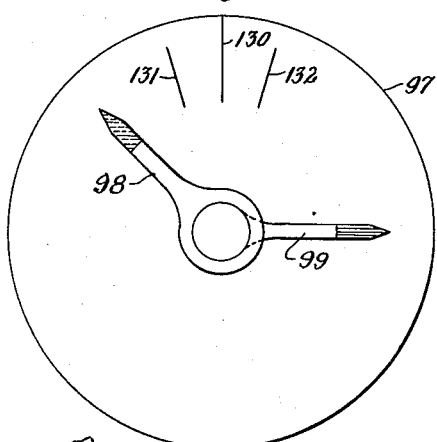
Figure 8 is a plan view of the pointer and dial of the mechanism of Figure 7.
Figure 9:
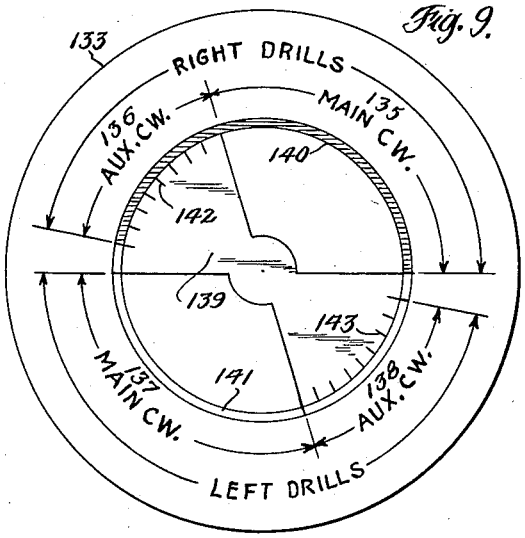
Figure 9 is a plan view of an indicating scale employed in the mechanism of Figure 7.

The mechanism shown in Figure 6 is a modified form of the follower as described in connection with Figures 3, 4 and 5. The follower arm 89 in this modification is comprised of member 90 secured to a slider 91 and a member 92 carrying a screw 93 and a follower contact 93a. These members are connected together by a pivot 94. Secured to the top of nut 93 is a flexible connector 93b and a conductor 93c.

Abutment surface 96 of pivoted member 92 engages abutment surface 95 of member 90. The two surfaces are yieldingly held in engagement by spring 97. This mechanism prevents damage to equipment in the event the drill return mechanism fails to operate and the follower continues to move downwardly against the cam. In such event the spring 97 yields and the member 92 swings upwardly about pivot 94. When the member 92 swings upwardly about pivot 94, the flexible connector 93b contacts member 90. This operates certain mechanism which will be described to stop the downward traverse of the drills.

*Positioner controls and angle indicating mechanism*

The construction of the positioner control and angle indicating mechanism generally shown at 33 in Figure 2, is shown in Figures 7, 8, 9, 10 and 11. This mechanism provides information as to the location of unbalance in each of the correction planes so that the positioner motor properly orients the crankshaft with respect to the drills for the correction operation. Visual information as to the location of unbalance is also provided.

Disk 97 and pointers 98 and 99 form cooperating indicating elements for indicating the location of unbalance—98 in the left correction plane, and 99 in the right correction plane.

Figure 7:
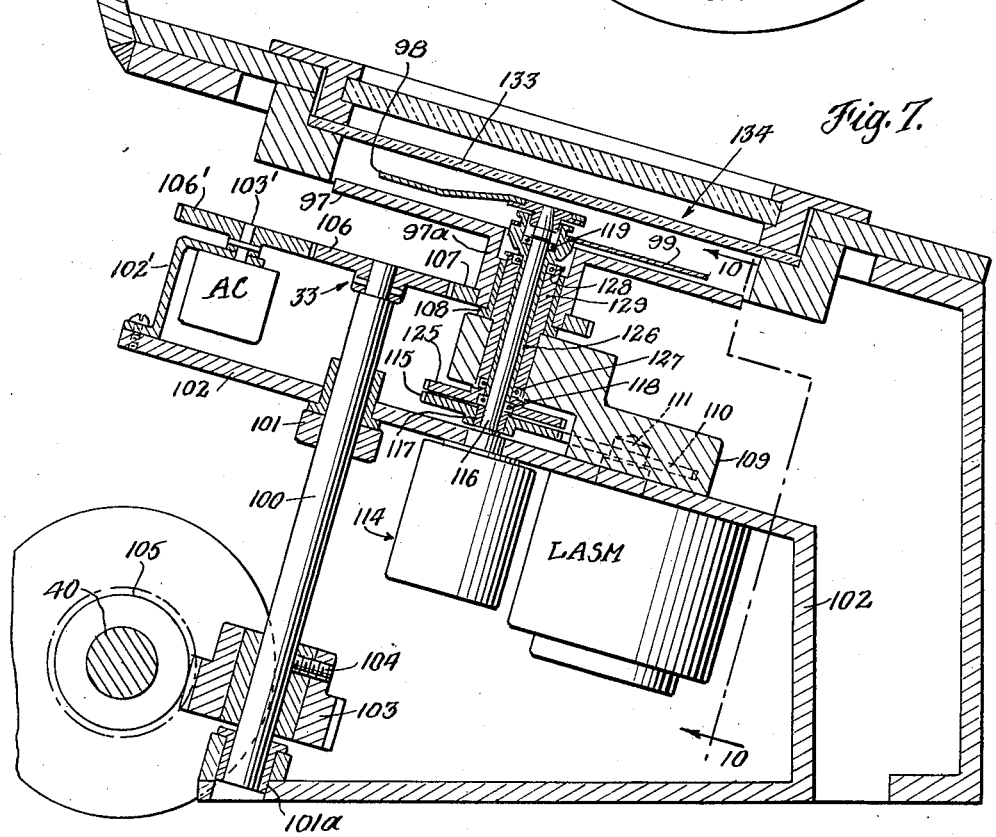
Figure 7 is an enlarged cross section taken on the line 7—7 of Figure 2 of an indicating mechanism employed in the machine.

As shown in Figure 7, a shaft 100 is rotatably supported by bearings 101 and 101a which are mounted on fixed support 102. Gear 103 is secured to the lower end of shaft 100 by set screw 104 and is engaged with gear 105 secured to drive shaft 40. Gear 106 is fixedly attached to the upper end of shaft 100 and engages gear 107 which is secured to the downwardly extending hub 97a of disk 97. The gear 107 and disk 97 are rotatably supported by bushing 108. Thus, by means of the above-described arrangement, disk 97 is adapted to be rotatable with the crankshaft 15.

Figure 11:
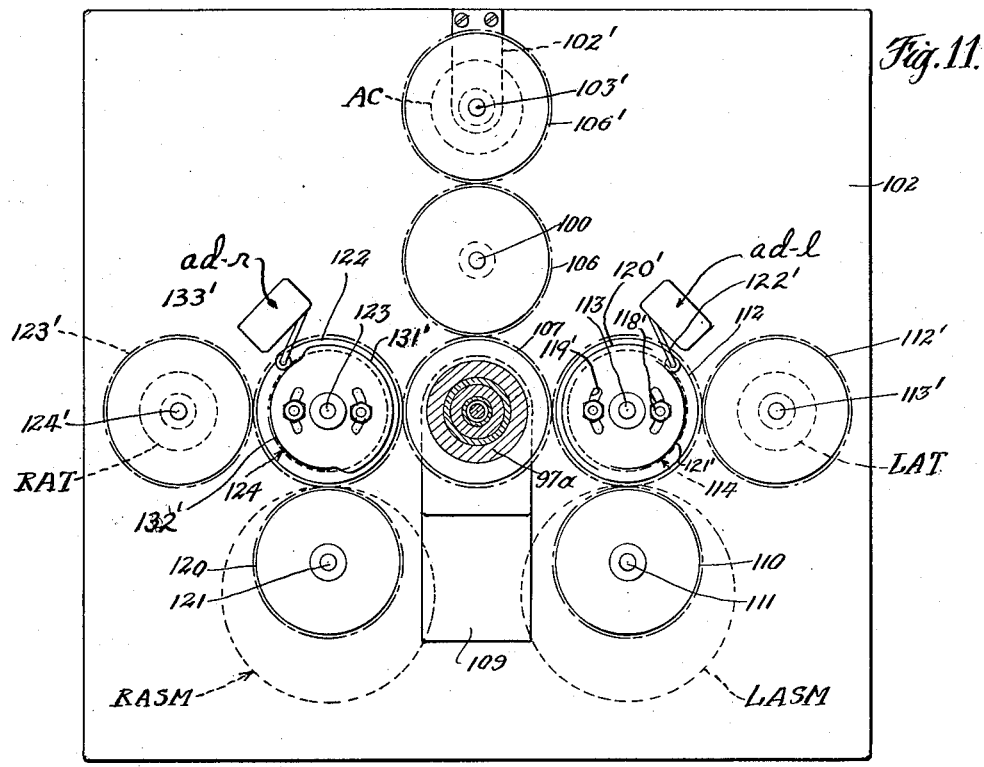
Figure 11 is a plan section taken on the line 11—11 of Figure 10.

As seen in Figure 11, a bracket 102' is secured to support 102, and this rotatably mounts a shaft 103' of the angle receiver AC. Also secured to the shaft 103' is a gear 106' meshing with the gear 106. The shaft 103' is connected with the rotor of the angle receiver AC and causes rotation thereof. It will be understood, therefore, that the rotor of the angle receiver is connected and movable with the crankshaft.

The pointer 98 and the left angle transmitter LAT are adapted to be actuated by left angle servo motor LASM. Gear 110 is secured to the shaft 111 of the motor LASM and engages gear 112 (see Figure 11) attached to the shaft 113 of potentiometer 114. The gear 112 also engages the gear 112' mounted on shaft 113' attached to the rotor of the transmitter LAT. The motor LASM, the transmitter LAT and the potentiometer 114 are fixedly secured to the support 102. Gear 112 also engages gear 115 which is secured with its bushing 117 to shaft 116. The shaft 116 is rotatably mounted in bearings 118 and 119. The pointer 98 is attached to the upper end of shaft 116. Thus, when the motor LASM is actuated, the rotor of the transmitter LAT and the pointer 98 are rotated. The motor LASM is adapted to drive clockwise or counter-clockwise in accordance with certain control systems so as to be positioned in accordance with the angle of unbalance in the left correction plane, as will be later described.

The gear 114 carries a plate 114' mounting the studs 115'. Spacers 116' are mounted on the studs and support a cam 117' held on the studs by the nuts 118'. The slots 119' on the cam 117' provide for angular adjustment of the cam. It will be noted that the cam has an outer surface 120' and an inner surface 121'. The angle encompassed by the inner surface corresponds to the angle encompassed by the main counterweight 15a of the crank as taken in the left correction plane 47. Usually the unbalance in the crank will lie within the main counterweight and the cam will be positioned so that the arm 122' of the microswitch *adl* will engage the inner surface 121'. However, when the unbalance lies outside of the counterweight, the cam will be positioned so that the outer surface 120' engages the arm 122' and actuates the switch. Actuation of the switch prevents further automatic operation of the machine after the testing cycle is completed so that the operator, at that time, can perform an auxiliary drilling operation.

The pointer 99 and the right angle transmitter RPT are adapted to be actuated by right angle servo motor RASM. Gear 120 is secured to the shaft 121 of the motor RASM and engages gear 122 attached to the shaft 123 of the potentiometer 124. The gear 122 also engages the gear 123' mounted on the shaft 124' attached to the rotor of the transmitter RAT. The motor RASM, the transmitter RPT, and the potentiometer 124 are fixedly secured to support 102. Gear 122 also engages gear 125 which is secured to hollow shaft 126 (surrounding shaft 116). The shaft 126 is rotatably mounted in bearings 127 and 128 carried by bushing 129 secured in the fixed bracket 109. The pointer 99 is attached to the upper end of hollow shaft 126. Thus, when motor RASM is actuated, the rotor of the transmitter RAT and the pointer 99 are rotated. The motor RASM is adapted to drive clockwise or counter-clockwise in accordance with certain control systems and be positioned in accordance with the angle of unbalance in the right correction plane as will be described.

The gear 122 carries a plate 135' which mounts the studs 126'. Spacers 127' are disposed on the studs and support a cam 128' held on the studs by the nuts 129'. The slots 130' in the cam provide for angular adjustment of the cam. The cam has an outer surface 131' and an inner surface 132'. The angle encompassed by the inner surface 132' corresponds to the angle encompassed by the main counterweight 15b of the crank as taken in the right correction plane 48. Usually the unbalance in the crank will lie within the counterweight and the cam will be positioned so that the arm 133' of the microswitch adr will engage the inner surface 132'. However, when the unbalance lies outside of the counterweight, the cam will be positioned so that the outer surface 131' engages the arm and actuates the switch adr. Actuation of the switch prevents automatic operation of the machine after the testing cycle is completed so that the operator can, at that time, effect an auxiliary drilling operation.

It will be recalled that the angle of unbalance is determined relative to a known rotational position of the crankshaft, that the right and left drills are physically oriented in a predetermined manner with respect to said position, and that the rotor of the transmitters RAT and LAT and the pointers 98 and 99 are positioned in accordance with the angle of unbalance as measured with respect to said known position. The disk 197 is set up so that the line 130 corresponds to or represents the known position. Thus, when the positioner positions the crankshaft for drilling in the right correction plane, the line 130 on the disk is directly under the pointer 99 and when the crankshaft is positioned for drilling in the left plane, the line 130 is directly under the pointer 99. The purpose of lines 131 and 132 on the disk will be explained later in connection with the "split drill" operation.

Indicating scale 133 (Figure 9) is secured within the recess 134 of indicating mechanism 33 directly above the pointers 98 and 99. The chart is physically oriented with the heretofore mentioned known rotational position of the crankshaft. The chart 133 is preferably constructed of transparent material with the center part 139, and sectors 140 and 141, of opaque material. Since the radius of the opaque material is less than the length of the pointers, portions of the pointers and the indicating lines 130, 131 and 132 are always visible.

Scale 133 shows the angular orientation of the main counterweights 15a and 15b and the auxiliary counterweights 15c and 15d with respect to the above-mentioned known rotational position. The angle encompassed by the main counterweight 15b in the right correction plane 48 is indicated by the main counterweight sector 135. The angle encompassed by the auxiliary counterweight 15d is indicated by the auxiliary counterweight sector 136. The angle encompassed by the main counterweight 15a in the left correction plane 47 is indicated by the main counterweight sector 137. The angle encompassed by the auxiliary counterweight 15c is indicated by the auxiliary counterweight sector 138.

Figure 10:
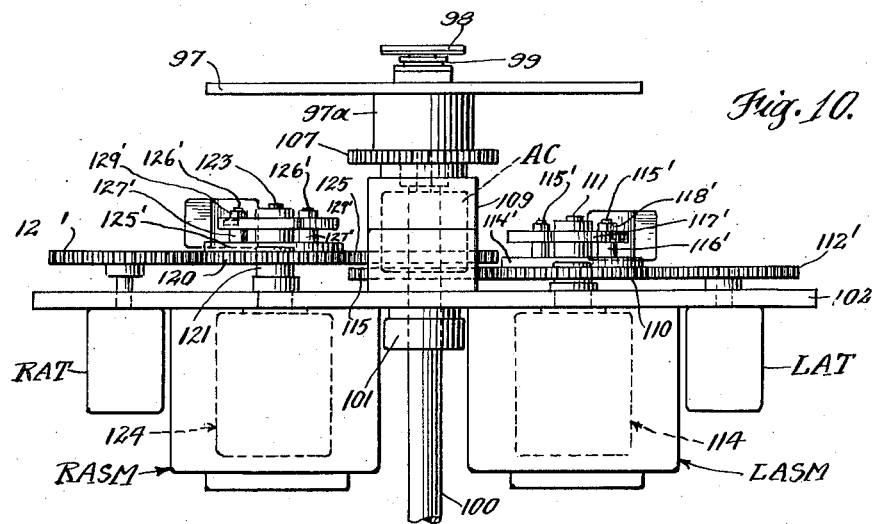
Figure 10 is a cross section taken on the line 10—10 of Figure 7.

It will be recalled in connection with Figure 10 that the cams 117' and 128' cause switches adl and adr to be actuated when the unbalance lies outside of the main counterweights. Since the cam 117' and pointer 98 are positioned by the left angle servo motor LASM and the cam 128' and pointer 99 are positioned by the right angle servo motor RASM, the pointers, if auxiliary drilling is required, will lie within the respective auxiliary counterweight sectors 136 and 138. The fact that auxiliary drilling is required is, therefore, indicated to the operator.

Clamping mechanism

The clamp 25 is slidably mounted in bracket 162 secured to back plate 26. One end of lever 163 is secured to the clamp 25 by pin 164 while the other end is secured to piston rod 165 of the piston of cylinder 166 by pin 167. At a point intermediate its ends, the lever 163 is pivotally connected by pin 168 to a link 169. The link 169 is connected to a fixed support 170 by a pin 171. The cylinder is pneumatically operated via lines 172 to move the piston rod 165, hence the lever 163 and clamp 25 upwardly and downwardly. The clamp microswitch CMS is fixedly secured to the top of bracket 62. The switch has contacts which condition certain control circuits for operation according to the position of the clamp.

Testing mechanism

The relationship of the testing mechanism with certain other components of the present equipment is diagrammatically shown in Figure 20. Starting at the top of the sheet and reading from right to left are shown transducers 176 and 177. (As shown in Figure 2, these transducers are fixedly held to members 178 and 179.) The details of the construction of the transducers and their operation need not be described herein, but they are fully disclosed in copending application of John R. Stovall, Jr., et al., Serial No. 233,294, filed June 25, 1951, and assigned to the assignee of the present invention. However, in general, each carries a displaceable element connected with the cradle 35. The purpose of the transducers is to develop, for each correction plane, a signal from which the testing mechanism measures the amount and angular location of unbalance. The signal produced by transducer 176 is fed to signal cutter SRSD and the signal from transducer 177 is fed to signal cutter SLSD. The signal cutters are used in the "split drill" operation to be described.

The signal cutters are connected to transducer selector RLP which connects the transducer desired to be used in each testing operation. The selector is interconnected with the actuating mechanisms for pivots 49 and 50, so that the proper transducer is operable when one or the other pivot is engaged with the cradle. Transducer 177 is for determining unbalance in the left correction plane 47 and is operable when right pivot 50 is engaged, and the transducer 176 is for determining unbalance in the right correction plane 48 and is operable when left pivot 49 is engaged.

The transducer selector RLP is connected to the testing mechanism 179. The function of the transducer selector is to select the proper transducer for testing in either the right or left correction planes.

The testing mechanism develops a signal which is proportional to the amount of unbalance and a signal which is related to the angular location of unbalance in accordance with the transducer which is operative. A typical signal corresponding to the amount of unbalance is shown at 180. The magnitude of the signal is proportional to the amount of unbalance. Typical angle signals are shown at 182 and 181, which respectively represent large and small angular positions of unbalance with respect to the predetermined or known rotational position of the crankshaft. Meters 31 and 32 respectively indicate the angle signal and the amount signal (see also Figure 2). Such a testing mechanism (179) is described in copending application Serial No. 233,294, above referred to, and is used in the preferred form of the present invention, but it is pointed out that any testing mechanism may be utilized, provided it is capable of delivering the kind of control signals which are utilized in connection with the correction operation.

The timer 183 is interconnected between the testing mechanism and certain components of the correction mechanism. The timer is also shown interconnected with the transfer mechanism 17 and with the positioner as generally designated by P'. The function of the timer mechanism is to interrelate the sequence of operation of the various components of the present invention; for example, the timer first conditions the testing mechanism for operation, while the transfer mechanism holds the crankshaft in the testing station, and then conditions the positioner mechanism to position the crankshaft and the correction mechanism for operation while the transfer mechanism holds the crankshaft in the correction station. The operation of the timer and the various control systems interrelated therewith will be described in more detail hereinafter.

The timer is further interconnected with the testing mechanism and with the pivot selector 178 as is diagrammatically indicated in Figure 20. The function of the timer here is to interrelate the operation of the pivots and the testing mechanism. For example, the left pivot is engaged while the testing mechanism determines the angle and amount of unbalance in the right-hand correction plane.

The timer is also interconnected with the right and left depth and angle control RE and the testing mechanism. The control RE conditions the right depth memory circuit 184 and the right angle memory circuit 186 for operation during testing in the right correction plane. The memory circuits utilize the amount and angle signals produced by the testing mechanism to respectively operate the cam of the right depth control 23, the right angle transmitter RAT and pointer 99 of the angle indicator 33.

The control RE also conditions the left depth memory circuit 185 and the left angle memory circuit 187 for operation during testing in the left correction plane. The memory circuits 185 and 187 utilize the amount and angle signals produced by the testing mechanism to respectively operate the cam of the left depth control 24, the left angle transmitter LAT and the pointer 98 of the angle indicator 33.

As has been previously indicated, the depth control mechanisms 23 and 24 respectively control the penetration of the right and left drills into the crankshaft.

*General operation*

Before describing in detail certain of the control systems of the present invention, the procedure in operating the machine will be outlined. The procedure will be described with particular reference to Figures 2 and 12 through 20 inclusive.

To set up the machine for operation, the operator turns on main power switch MPS on panel 29 (see Figure 2). He then actuates the air pushbutton PBA to condition the means controlling the transfer mechanism, clamp and drills for operation. The machine then is in the "stand-by" position and "stand-by" light *l*–1, panel 29, is on. The operator then places crankshaft 15 on the rollers 37 and moves member 44, which is slidable on shaft 40a to bring the pins 45 into engagement with the holes 46 on the crankshaft. The test button PBT is then pushed to start the machine in its test cycle.

As has been mentioned, the balancing motor 205 drives or rotates the crankshaft during the testing or unbalance determining operation. During the first part of the testing cycle, the left-hand pivot 49 is engaged in the hole 49a in cradle 35 while the right-hand pivot 50 is disengaged from the hole 50a (Figure 12). Also, transducer 176 is operative to generate a signal which is transferred to the testing mechanism 179, which develops a signal proportional to the amount of unbalance and a signal proportional to the angular location of unbalance for the right correction plane. The amount of unbalance signal actuates the right depth memory circuit 184 which operates cam 63 of the right depth control 23. The angle signal actuates the right angle memory circuit 186, which actuates the right angle transmitter RAT and also drives pointer 99 to indicate the location of unbalance.

After the cam 63 and the transmitter RAT have been set, the mechanism is automatically conditioned to next measure the unbalance in the left-hand correction plane 47.

For this part of the testing cycle, the transducer 176 is disengaged from operation and the transducer 177 is conditioned for operation. The right-hand pivot 50 is engaged in hole 50a and the left-hand pivot 49 is disengaged from the hole 49a (Figure 13). The signal from the transducer 177 is transferred to the testing mechanism which develops a signal proportional to the amount of unbalance and a signal proportional to the angular location of unbalance for the left correction plane. The amount of unbalance signal actuates the left depth memory circuit 185, which operates the cam 189 of depth control mechanism 24. The angle signal actuates the left angle memory circuit 187, which actuates the left angle transmitter LAT and also drives the pointer 98 to indicate the angle of unbalance (see Figure 13).

Thus, cam 63 of the right depth control 23 and cam 189 of the left depth control mechanism 24 are each set to a position corresponding to the amount of unbalance in the crankshaft. The transmitters RAT and LAT (and also the pointers 98 and 99) are set to a position corresponding to the location of angular unbalance in the left and right correction planes.

If unbalance is present in the right correction plane, the light *l*–5 will be activated, and if unbalance is present in the left correction plane, light *l*–6 will be activated.

As has been mentioned heretofore, if no unbalance is present in the right correction plane, the right "o.k." microswitch *rok* is actuated and this fact is indicated to the operator by the light *l*–3 on panel 29. If no unbalance is present in the left correction plane, the left "o.k." microswitch *lok* is actuated and this fact is communicated to the operator by light *l*–4 on panel 29.

When the measuring cycle has been completed as above described and no unbalance is present, the mechanism automatically returns to the stand-by position. If unbalance is present in either correction plane, the machine is automatically set up for the drilling operation.

Assuming that unbalance is present in the right correction plane, the crankshaft remains on the rollers 37 while the positioning motor 12 rotates the same so that the counterweight 15b is at the correct orientation with respect to the drill 19 (Figurt 13). This, of course, is indicated to the operator by the line 130 and pointer 99. Then the lift moves the crankshaft off the rollers (Figure 14) and the clamp 25 comes down (Figure 15) to clamp the crank thereon. Then the drill (Figure 15) travels rapidly downwardly to within approximately one-eighth of an inch from the counterweight 15b.

The traverse of the drill is then slowed down to the proper drilling speed and when the drill contacts the counterweight (Figure 16), control mechanism is actuated to de-energize the solenoid 76 which releases follower 64 so that it may travel downwardly with the drill (as the drill penetrates the counterweight 15b) until the follower contact 64a engages the cam 63 (Figure 17). When this contact has been made, the drill traverse is stopped and the drill returns upwardly to its normal position (Figure 18).

The correction operation in the right correction plane being completed, the machine automatically conditions itself for drilling in the left plane, the clamp being automatically raised concurrently with return of the drills. Also, the lift goes down (Figure 18) so that the crank is deposited on the rollers 37. The motor 12 of the positioner mechanism then rotates the crank so that the counterweight 15a is correctly oriented with respect to the drill 21, as is indicated to the operator by the coincidence of the line 130 and the pointer 98. Then the lift comes up to raise the crank off the rollers and the clamp comes down to clamp the crank in position. The drill 21 is then advanced and drilling is accomplished in the left-hand plane similarly as has been described in connection with drilling in the right plane.

After drilling in the left plane has been completed, the clamp 25 is again raised and the lift lowers the crankshaft onto the rollers.

The test button PBT is then pressed for a checking cycle. If the crankshaft is in balance, the lights $l$–4 and $l$–3 will so indicate, and the machine stops operating and goes into stand-by position for removal of the balanced crankshaft and insertion of another. However, if unbalance remains, the machine is automatically set up for another drilling operation as explained above.

In the event that the particular crankshaft being tested has an abnormally large unbalance and it is undesirable to remove metal from only one spot, a split drilling operation may be performed. Split drilling is the removal of metal from more than one angular position about the axis of the crankshaft. In the preferred embodiment of the invention, when split drilling, one-half or approximately so of the total amount of metal required to be removed is drilled out on each side of the spot where single drilling would normally occur.

Various control circuits are set up for split drilling when either the left split drill microswitch $lsd$ (Figure 2) or the right split drill microswitch $rsd$ (Figures 2 and 3) are actuated by the operating arms, for example, the cam surface 73b actuating the $rsd$ microswitch. When the $rsd$ microswitch is actuated, the signal cutter SRSD (see Figure 20) is actuated. This operates to cut the signal developed by transducer 176 in half. The effect of the signal being cut in half is to rotate the cam 63 of right depth control mechanism 23 to a position corresponding to one-half of the actual amount of unbalance present. Thus, in the split drilling operation, the operator is required to rotate the crankshaft so that the index line 131 on disk 97 is coincident with the right pointer 99. The right drill button PBR is then pressed and the drill removes metal in the manner described above. The operator then rotates the crankshaft so that the index line 132 on the disk 97 is coincident with the right pointer 99. Then the right drill button PBR is again pressed and the drill removes metal.

In addition to the normal drilling and split drilling functions, the machine is equipped, as mentioned heretofore, for auxiliary drilling, i.e., in the event of unbalance in a crankshaft at such an angular location that drilling out of metal in the main counterweights to effect balancing is impossible or impractical, provision is made for angularly shifting the mass center or unbalance in order to bring it to a point where it may be corrected by normal drilling in the main counterweights. Auxiliary drilling is done by drills 20 and 22 which are manually operated and controlled to take out metal in the auxiliary counterweights 15c and 15d. As mentioned above, when auxiliary drilling is required in either correction plane, automatic operation of the machine is prevented after the testing cycle is completed so at that time the operator can make required corrections.

When auxiliary drilling is required, for example, in the right-hand correction plane, the operator removes the main drills 19 and 21 and inserts auxiliary drill 20. The operator then throws the auxiliary drill switch ADS on panel 29 to the right-hand side. When the auxiliary drill switch ADS is actuated, the testing mechanism and circuits for automatically determining the amount and angular orientation of unbalance in the right correction plane are disengaged and the depth memory circuit for the right correction plane is set up for manual operation. Depending upon the location of angular unbalance as initially determined by the location of pointer 99 and the amount of unbalance as indicated on meter 31, the operator is provided with certain charts from which he is able to determine the angular orientation and the amount of metal to be removed from the auxiliary counterweight 15d. The operator then actuates knob DSR, which turns cam 63 to the correct position. The operator then rotates the crankshaft so that index line 130 on disk 97 is coincident with the proper angle indicating lines 143 on the scale 133. The operator then pushes the right drill button PBR and the drill 20 removes metal from the counterweight 15d. The operator then proceeds to run a test cycle on the work piece and if the unbalance has been shifted to the region of the crankshaft counterweight 15b, he then proceeds with normal drilling operation.

*Timer mechanism and sequence stepping switch*

The timer mechanism 183 (Figures 23, 24 and 25) and the sequence stepping switch W (Figures 21, 21a and 22) interconnect and condition various of the components of the equipment to provide a means whereby properly timed and sequentially arranged series of events will be carried out during the testing and drilling operations.

The timer is diagrammatically shown in Figure 25 and consists essentially of a plurality of cams C, C1, etc., mounted for rotation on shaft 195. Gear 196 is attached to shaft 195 and is adapted to be driven by motor 197 (Figure 23) through a gear train (not shown). The several cams are similar in construction. Fingers 200 and 201 are secured and insulated from one another on strip 202. The fingers 200 and 201 are respectively adapted to cooperate with cam surfaces 198 and 199 which are desirably designed so that as the cams rotate, contact will be made between the various fingers at contact points $c$, $c$–1, etc. The fingers 200 and 201 are interconnected with various components as will appear hereinafter.

The circuit for operating the timer motor is shown in in Figure 23. Terminals P–1 and P–2 are interconnected with the power terminals P—P (Figure 27) which supply power to the various control circuits. The timer motor 197 is initially supplied with power through wafer arm W4a and terminal 2 of wafer W4 of the sequence stepping switch W. When the motor 197 starts rotating, holding contact $c$ is closed to supply power to the motor and to maintain the motor in running operation during the testing cycle. The wafer arm W4a is adapted to break contact with terminal 2 as will be explained later. The capacitor 203 and rectifier 204 provide a dynamic braking effect to quickly stop the motor when contact $c$ is opened.

The chart of Figure 24 illustrates the percentage time that the contacts $c$, $c$–1, $c$–2, etc., are opened and closed during the testing cycle. Starting from the top and reading down, the chart is explained as follows:

*Timer motor.*—Contact $c$ is open from 0–15% time or cycle and closed 15–100% of the time. The purpose of this closure is to keep the timer motor 197 operative throughout the testing cycle.

*Right pivot.*—Contact $c$–1 is open from 0–15% time and 46–100%. The contact is closed 15–46% time. As has been explained above, the right pivot 50, being spring loaded, is normally engaged with the cradle 35. The effect of the contact c–1 closing is to condition the control mechanism for the pivot 50 (Figure 28) so that the pivot may be disengaged during testing in the right correction plane.

*Testing motor starter.*—Contact c–2 is open from 0 to 4% and 10–100% time, and closed from 4–10% time. The effect of the closing of the contact is to condition the circuit (Figure 26) supplying the testing motor starter S–TM for supplying power to the starter and thus start the testing motor 205 (Figure 27).

*Testing motor stop.*—Contact c–3 is closed from 0–80% and 95–100% time and open from 80–95% time. The effect of the contact c–3 being open is to de-energize the testing motor starter S–TM to stop the motor 205 (Figures 26 and 27).

*Left pivot.*—Contact c–4 is open from 0–48% and 79–100% and is closed from 48–79%. As has been explained above, the left pivot 49 being spring-loaded is normally engaged with the cradle 35. The effect of the contact c–4 closing is to condition the control mechanism (Figure 28) for the pivot 49 so that the pivot may be disengaged during testing in the left correction plane.

*Sequence switch.*—Contact c–5 is open 0–80% and 85–100% time and closed 80–85% time. The effect of the contact c–5 being closed is to sequence the machine from the test cycle to the drill cycle. The wafer arms W1a, W2a, etc., of the sequence stepping switch W are stepped from the "test" terminal 2 to right drill terminal 3. This operation will be more clearly understood in connection with the description of sequence stepping circuit (Figures 21 and 22).

*Transfer mechanism.*—The contact c–6 is open from 0–85% time and closed from 85–100% time. The effect of the contact being closed is to condition the means controlling the transfer mechanism to operate same for the drilling cycle (Figure 37).

*Left lights.*—The contact c–7 is open 0–48% and 95–100% time and closed 48–95% time. The purpose of the contact being closed is to condition the means for controlling certain of the left correction plane indicating mechanisms to operate during the testing and drilling cycles (Figure 34).

*Right lights.*—The contact c–8 is open 0–15% and 95–100% and closed 15–95% time. The purpose of the contact being closed is to condition the means for controlling certain of the right correction plane indicating mechanisms to operate during the testing and drilling cycles (Figure 33).

*Test motor brake.*—The contact c–9 is open 0–5% and 85–100% time and closed 5–85% time. The purpose of the contact being closed is to condition certain mechanism for applying the testing motor brake (not shown) whenever the testing motor starter S–TM is deenergized during this period.

The general arrangement and operation of the sequence stepping switch W will be explained with reference to Figures 21a and 22.

The switch consists essentially of a plurality of wafers W1, W2, W3, etc., which are arranged in stack-like fashion. Each wafer has a rotatable arm W1a, W2a, etc., and a plurality of terminals 1 through 12. The wafer arms are secured to a common shaft 206 and are rotatable by the shaft in a clockwise direction. The shaft 206 has connections (not shown) with sequence switch solenoid SS–S. When the solenoid is energized, the shaft 206 rotates the wafer arms progressively from one terminal to another. The solenoid is adapted to be selectively energized so that the wafer arms are in contact with certain of the terminals for known periods of time. This is accomplished by wafer W1, which is the stepping wafer. The manner in which solenoid SS–S is energized to step the wafer arms will be pointed out in connection with the description of Figure 21.

When the wafer arms are on terminals 1, the machine is in "stand-by" position. When the wafer arms are on terminals 2, the machine is in the testing position or cycle. When the wafer arms are on terminals 3, the machine is set for normal drilling in the right correction plane. Terminals 4 and 5 are used for right split drilling. When the wafer arms are on terminals 6, the machine is set for normal drilling in the left correction plane. Terminals 7 and 8 are used in left split drilling. Terminals 9, 10, 11 and 12 are used only to step the switch home to stand-by terminals 1.

As will be apparent in the reading of the description below, certain of the wafer arms and terminals appear in a plurality of circuits. It will be understood that such interconnections are suitably made through various terminal blocks, etc., which for purposes of simplicity, are not shown.

The leads from the wafer arms and terminals shown in Figure 21a are indicated by numbers which also appear in the various circuits in which the wafer arms and terminals are connected.

The wafer arm W1a is connected in the test circuit (Figure 22) by leads 207 and 208. The terminals on wafer W1 (Figure 21a) are connected with certain of the components of the stepping circuit (Figure 21) as indicated at 208–216. Also see Figures 39 and 44.

On wafer W2, the terminals 1 and 2 are connected together. These terminals together with the wafer arm W2a are interconnected in the safety stop circuit (Figure 26) as is shown at 217 and 218. Terminals 3, 4 and 5 are connected together on wafer W2. These terminals together with wafer arm W2a are interconnected with the right indicator light circuit (Figure 33) as shown by numerals 218 and 219.

Terminal 2, wafer W3, is interconnected with the measure light l–2 on the safety stop circuit (Figure 26) as indicated by numeral 220. Wafer arm W3a of wafer 3 and wafer arm W2a of wafer 2 are interconnected, as shown on Figure 21a by lead 221. This same connection is shown on Figure 26. Terminals 3, 4, 5, 6, 7 and 8 are connected together on wafer W3. These terminals together with wafer arm W3a are connected in the left indicator light circuit (Figure 34) as shown by numerals 222 and 223.

On wafer W4 the terminal 1 and wafer arm W4a are interconnected with certain components of the air circuit (Figure 36) as indicated by numerals 224 and 227. Wafer W4a and terminal 1 are interconnected with the stand-by light l–1 (Figure 26) by lead 224. Terminal 2 and wafer arm W4a of wafer W4 are shown connected in the timer motor circuit (Figure 23) by numerals 225 and 227. Terminals 3, 4, 5, 6, 7 and 8 on wafer W4 are connected together and these terminals, together with wafer arm W4a, are shown connected in the positioner and transfer circuit (Figure 37) by leads 226 and 227.

On wafer W5, terminals 3, 4 and 5 are connected together. These terminals, together with wafer arm W5a, are shown connected in the right drill pushbutton circuit (Figure 39) by leads 229 and 228.

On wafer W6, terminals 6, 7 and 8 are connected together. These terminals, together with wafer arm W6a, are shown connected in the left drill pushbutton circuit (Figure 44) by leads 231 and 230.

As has been mentioned above, the wafer arms of the sequence switch W are stepped to the various terminals by the sequence switch solenoid SS–S. As is seen in the test circuit (Figure 22), the solenoid is connected with wafer arm W1a through contact SSH–1 and stepping contact 232, which are normally closed. The circuit is supplied with A.C. power by terminals P–1 and P–2. The solenoid is D.C.-operated and a rectifying arrangement comprising rectifier 233 and capacitor 234 is provided. As shown in Figure 22, the wafer arm W1a is in "stand-by" position. When the test pushbutton PBT is actuated, the contact PBT–1 is closed and the solenoid energized. The solenoid then rotates the wafer arms W1a, W2a, W3a, etc., from terminals 1 to terminals 2. When the wafer arm W1a reaches terminal 2, the contact 232 is opened by a mechanical connection with the solenoid SS–S and the solenoid SS–S is de-energized. The wafer arms W1a, W2a, etc., will remain on terminals 2 until the solenoid SS–S is again energized. (The manner in which solenoid SS–S is energized to step the wafer arms to the other terminals will be pointed out in connection with the description of Figure 21.)

OPERATION OF CONTROL CIRCUITS

The structure and operation of certain components of the equipment, together with a description of the general over-all operation of the machine in the testing and drilling cycles, has been set out above. The manner in which these components are interconnected for desired operation will be shown in the description of the various control circuits which follows. These circuits are shown in Figures 21 to 48.

For purposes of disclosure and for ease of description, the various circuits as shown are in schematic form and no attempt is made to interconnect the circuits in one composite view. It will be understood, however, that as arranged in the machine, the various circuits are interconnected by terminal boards, etc. Separation of the various control circuits as shown makes the details of operation of the machine more readily understood. The description, as outlined below, follows the pattern of operation of the machine.

1. Preliminary Operations

The operator closes the main power switch MPS and 220-volt A.C. power is supplied from source Z to the primary winding of transformer 236 (Figure 27). The transformer steps down the voltage to 110 volts to supply power across the main power supply terminals P—P. It is here noted that all of the terminals which are interconnected with main power terminals P—P to supply power to the various control circuits are all labelled P–1 and P–2.

The machine is in "stand-by" position and the various wafer arms W1a, W2a, etc., as has been previously mentioned, are on terminals 1. As seen in safety stop circuit (Figure 26), the "stand-by" light l–1 on panel 29 is energized through wafer arm W4a and terminal 1 of wafer 4.

After the main power switch MPS has been closed, power is supplied through terminals P–1 and P–2 to the air circuit shown in Figure 36. The operator then pushes the air pushbutton PBA and the contacts PBA–1 close to energize the air relay A. The air relay holding contacts A–3 are closed when the air relay A is energized to keep air relay energized throughout the testing and drilling cycle. The air relay actuates the air valve 237 (Figure 2), which supplies air to the right pivot valve 238, the left pivot valve 239, the transfer mechanism valve 240 and the clamp valve 241. These latter valves are normally closed and are adapted to be actuated by the actuation of certain relays to be later described.

As seen in Figure 27, closure of the main power switch supplies power through the brake relay contacts B–1 (normally closed) to the brake solenoid B–S. The brake solenoid B–S is connected with braking mechanism for the testing motor 205. When the solenoid B–S is energized, the brake is released, and the motor is free to turn.

As seen in Figure 35, when the main power switch is closed, power is supplied through terminals P–1—P–2 to the coolant pump starter S–CP. When the starter is energized, contacts S–CP1 shown in Figure 27 close and the coolant pump motor is energized. The coolant pump supplies cooling fluid to valve 297, shown in Figure 2.

As seen in Figure 37, the circuits to the positioner motor 12 and to the relay L for the lift or automatic transfer mechanism 17 are in a non-operative condition and the jaws 51 are, therefore, in the down position.

As seen in Figure 38, the circuit for actuating the CR relay for the clamp 25 is also in a non-operative condition and the clamp is held in its normal up position.

The mechanism is now in condition for the operator to place the crank in the machine and initiate the automatic sequence of operations.

2. Crankshaft in Machine

The crankshaft 15 is placed on the rollers 37 and the mechanism 44, which is slidable on shaft 40a is actuated to engage the pins 45 in the corresponding holes 46 on the crankshaft.

3. Push Test Button (a) *Timer motor starts.*—When the test pushbutton PBT is actuated, the contacts PBT–1 (Figure 22) are closed, and thereby the wafer arms W1a, W2a, etc., are rotated from the "stand-by" terminals 1 to the "test" terminals 2.

The rotation of the wafer arm W4a to terminal 2 (Figure 23) starts the timer motor 197. The operation of the timer motor begins to rotate the various cams C, C–1, C–2, etc., to close the various contacts c–1, c–2, c–3, etc., associated therewith.

(b) *Motor starter energized.*—With reference to the safety stop circuit (Figure 26) which is supplied with power through terminals P–1 and P–2, it is seen that the test motor starter S–TM is adapted to be energized when the contacts c–2 close at 4% time. As is shown, the contacts PBS–1 on safety stop pushbutton PBS are closed, the wafer arm W2a is on terminal 2, the transfer mechanism microswitch contacts lms–11 are closed (when the toggle arm is in the position shown in Figure 2) and the contacts c–3 are closed. (It is to be observed that the connection between the testing motor starter S–TB and the contacts c–3 are shown both in Figures 26 and 35 as indicated by the reference numerals 271 and 272.) When the starter S–TM is energized, holding contacts S–TM2 are closed. This holds the starter energized when the contacts c–2 open at 10% time.

(c) *Test motor starts.*—Energizing of the starter S–TM at 4% time closes contacts S–TM1 (Figure 27) which supplies 220-volt power to the testing motor 205 and the motor begins to rotate the work piece. As noted before, the positioner servomotor 12 is back-driven at this time.

(d) *Indicator light energized.*—Also, as seen in Figure 26, the test light l–2 is supplied with power through wafer arm W3a and terminal 2 of wafer W3. It is to be observed that the "stand-by" light l–1 is de-energized as the wafer arm W4a is disconnected from the "stand-by" terminal 1.

The machine automatically conditions itself to perform the testing operation in the right-hand correction plane as described following.

(e) *Right pivot out.*—With reference to the cradle pivot, transducer and servomotor circuit (Figure 28), it will be observed that power is supplied to this circuit from terminals P–1 and P–2. The contacts A–2 are closed, because the air relay A is energized. At 15% time, the timer motor has rotated the cam C–1 so that contacts c–1 are closed. Power is then supplied to the right pivot relay RP through the right auxiliary drill relay contacts RAD2. Energizing of the right pivot relay RP closes contacts RP1 and RP2 (Figure 29) to energize the right pivot solenoid RP–S.

Power is supplied to the solenoid circuits shown in Figure 29 through terminals P–1 and P–2. When the RP–S solenoid is energized, the right pivot valve 238 is actuated and air is supplied to the right pivot cylinder 50b and the right pivot 50 is disengaged from cradle 35.

(f) *Unshort right transducer.*—Further with reference to Figure 28, power is also supplied to the transducer shorting relay PS. When this relay is energized, the contacts PS1 (Figure 30) are opened. The purpose of the PS1 contacts is to short the transducers when not in use so that no signal will be sent through to the testing mechanism 179.

As seen in Figure 30, the transducer coil 176a is connected so that a signal developed therein is transferred to the input terminals of testing mechanism 179. The connections between the transducer coil 176a and the testing mechanism 179 include conductor 246, the signal cutter contacts SRSD1, the calibrating potentiometer 247 and the transducer selector contacts RLP1.

Since the left pivot 49 is engaged while the right pivot 50 is disengaged, the cradle 35 and the crankshaft 15 are free to oscillate as a function of the unbalance present in the right-hand correction plane 48. Thus, a signal is developed in transducer coil 176a and this signal is transferred to the testing mechanism 179.

The testing mechanism operates to develop a signal proportional to the amount of unbalance and a signal proportional to the angular orientation of unbalance in the right correction plane in the manner fully disclosed in copending application, Serial No. 233,294.

The amount of unbalance signal is indicated on meter 32, while the angular location of unbalance is indicated on meter 31. These signals are fed to the right depth memory circuit 184 and to the right angle memory circuit 185. The operation of the memory circuits is described below.

(g) *Servo motors energized.*—Again referring to Figure 28, it is seen that power is supplied to one coil of the right depth servo motor RDSM through connections 248. The other coil of the servo motor is supplied with power through connection 249 from certain parts of the right depth memory circuit 184 (Figure 31) as will be explained shortly. Actuation of the RDSM motor rotates cam 63 of the right drill control mechanism 23.

Power is also supplied through the right auxiliary drill contacts RAD1 to one coil of the right angle servo motor RASM via connections 250. The other coil of the right angle servo motor is supplied with power through connections 251 from certain parts of the right angle memory circuit 185 (Figure 32), as will be explained shortly. Actuation of the RASM motor actuates the right angle transmitter RAT and the pointer 99.

(h) *Right depth memory circuit operates.*—As is seen in Figure 30, the signal proportional to the amount of unbalance is taken from the testing mechanism 179 as by terminals 252, and the signal proportional to the angular location of unbalance is taken from the testing mechanism as by terminals 253.

The amount signal is fed to the right depth memory circuit 184 as shown in Figure 31. The signal appearing on terminals 252 is a sine wave. See numeral 180 on Figure 20. It is desirable in the equipment of the present invention to rectify this wave, and, therefore, rectifier 254 and filter arrangement 255 are provided.

The modified signal appearing on terminal 256 and grounded terminal 256a is fed via right auxiliary drill contacts RAD3 and left auxiliary drill contacts LAD4 to contact arm 257 of converter unit 258. Thus, a voltage proportional to the amount of unbalance appears between the contact arm 257 and ground.

The contact 259 of the converter unit is connected via the right and left depth and angle control relay contacts RE4 to the movable arm 72a of potentiometer 72. This arm is interconnected by shaft 65, gear 66 and gear 70 to the shaft 71 of the right depth servo motor (see Figure 4) and is rotated thereby so as to be variably positioned on the potentiometer resistor 72b. As seen in Figure 31, one side of the potentiometer resistor 72b is connected to the ground terminal 256a and the other side is connected through calibrating potentiometer 260 to the movable arm 261 of the standard cell potentiometer resistor 262. The standard cell is generally indicated by numeral 263. The standard cell functions in a known manner to develop a D.C. output voltage across the potentiometer resistor 262. The arm 261 is movable to adjust the output voltage. Thus, by means of the connections shown, a standard known voltage is impressed across the terminals of potentiometer resistor 72b. Depending upon the position of movable arm 72a, a proportional amount of this voltage appears between contact 259 and ground.

The convertor unit 258 operates to oscillate the center contact arm 264 back and forth between contacts 257 and 259 to compare the voltages appearing between these contacts and ground. If the voltages appearing on contacts 257 and 259 are of unequal magnitude, an A.C. signal will be developed across potentiometer 266 by the charge and discharge of the capacitor 265. This signal is then fed via conductor 268 to amplifier 267, wherein the signal is amplified and is fed by means of connections 249 to one coil of the right depth servo motor RDSM. The other coil of the servo motor is supplied with 110 volt power through connection 248. Depending upon the phase (with relation to the 60 cycle voltage applied to the other coil) of the signal developed across potentiometer 266, the servo motor will be turned either clockwise or counter-clockwise to move the potentiometer arm 72a until the voltages appearing across contacts 257 and 259 are equal in value. At this time, since the voltages are equal, no signal is developed across potentiometer 266 and hence, the servo motor stops turning.

(i) *Right unbalance magnitude indication.*—Thus, by means of the above-described system, the cam 63 connected to servo motor RDSM is positioned in accordance with the amount of unbalance. The cam remains in this position in preparation for use in the drilling cycle.

If the cam 63 is in the position as shown in Figure 3, no unbalance is present in the crankshaft and the right "o.k." microswitch *rok* is actuated. When this switch is actuated, the right "o.k." light *l*–3 and the right "o.k." relay are energized as shown on the right indicator light circuit (Figure 33). It will be recalled that the contacts *c*–8 are closed at 15% time and when the right "o.k." microswitch is activated, *rok*–1 contacts are closed, thus energizing the relay ROK. When the ROK relay is energized, the movable arm of ROK–1 contacts moves to its other position (dotted line) and the SSH–2 contacts, being in closed position, the light *l*–3 is energized.

If unbalance is present in the right correction plane (other than that requiring split drilling), the light *l*–5 (Figure 33), which indicates to the operator the presence of unbalance, will be activated. The power is supplied to light *l*–5 through contacts *c*–8, the RSD–1 contacts, the ROK–1 contacts, and the SSH–2 contacts.

In the event unbalance is of a nature requiring split drilling, it will be recalled that the right split drill microswitch *r–sd* is actuated and, therefore, the right split drill microswitch contacts *rsd*–1 (Figure 33) will be closed and power supplied to the right split drill relay RSD through the now closed contacts *c*–8. When the RSD relay is energized, the holding contacts RSD–3 will be closed. Also, the movable arm of the RSD–1 contacts will move to its other position (dotted lines) to supply power to split drill indicator light *l*–9 and to the split drill relay SRSD. When the SRSD relay is energized, certain control circuits are activated so that after the testing cycle, the split drill operation can be performed, as will be explained in detail later. Also, the contacts SRSD–6 (Figure 37) are closed, which energizes the relay AD, which opens the contacts AD–1 and prevents automatic operation of the positioner, lift, clamp and drills.

(j) *Right angle memory circuit operates.*—As seen in Figure 30, the signal proportional to the angular location of unbalance is taken from the testing mechanism 179 as by terminals 253. This signal is transferred to the right angle memory circuit 185 as is shown on Figure 32. The signal appearing on the terminals 253 is generally in the form of a square wave (see numerals 181 and 182 on Figure 20). The wide width signal 182 represents a large angle of unbalance with respect to the known rotational position in the crankshaft, and the smaller width signal 181 represents a smaller angular location of unbalance with respect to the said point. In the equipment of the present invention, the angle signal described is averaged out so that the signal appearing in the memory circuit is of an amplitude corresponding to the width of the square wave, i.e., corresponding to the angular location of unbalance. For this purpose, filter arrangement 273 is provided which averages out the signal appearing in terminals 253 and serves to transfer same to terminals 274 and 275.

The modified signal appearing on terminals 274 and 275 is fed to contact arm 276 of converter unit 277. Thus, a voltage proportional to the angular location of unbalance appears between the contact arm 276 and terminal 275.

The contact arm 278 of the converter unit 277 is connected via the right and left depth and angle control relay contacts RE3 to the movable arm 124a of potentiometer 124. The movable arm 124a is interconnected with the shaft 121 of the right angle servo motor RASM through gears 122 and 120 (see Figure 11) and is rotated by the motor so as to be variably positioned on the potentiometer resistor 124b. As seen in Figure 32, one side of the potentiometer resistor 124b is interconnected with terminal 275, and the other side is connected through calibrating potentiometer 279 to the movable arm 280 of the standard cell potentiometer resistor 281. The standard cell is generally indicated by reference numeral 282. The standard cell functions in a known manner to develop a D.C. output voltage across the potentiometer resistor 281. The arm 280 is movable to adjust the desired output voltage. Thus, by means of the connections shown, a standard known voltage is impressed across the terminals of the potentiometer resistor 124b. Depending upon the position of the movable arm 124a, a proportional amount of this voltage appears between contact 278 and terminal 275.

The converter unit 277 operates to oscillate the center contact arm 283 back and forth between the contacts 276 and 278 to compare the voltages appearing between these contacts and terminal 275. If the voltages appearing on the contacts 276 and 278 are of unequal magnitude, an A.C. signal will be developed across potentiometer 284 by the charge and discharge of capacitor 285. This signal is then fed via conductor 286 to amplifier 287 wherein the signal is amplified and is fed by means of connections 251 to one coil of the right angle servo motor RASM. The other coil of the servo motor is supplied with 110 volt power through connections 250. Depending upon the phase (with relation to the 60 cycle voltage applied to the other coil) of the signal developed across potentiometer 284, the servo motor will be turned either clockwise or counter-clockwise to turn the potentiometer arm 124a until the voltages appearing at contacts 276 and 278 are equal in magnitude. At this time, since the voltages are equal, the capacitor 285 does not charge and discharge, hence, no voltage is developed across potentiometer 284. With no signal being fed by amplifier 287 to the servo motor, the motor stops turning.

(k) *Right unbalance angle indication.*—Thus, by means of the above-described system, the right angle transmitter RAT and the pointer 99, which are operated by the servo motor RASM, are positioned in accordance with the angular location of unbalance. The transmitter (and pointer) remain in this position for use later in the drilling cycle.

In the event the unbalance lies outside the main counterweight 15b, the switch adr (Figure 11) will be actuated and close the contacts adr-1 (Figure 37) to energize the relay AD, which opens the contacts AD-1. The opening of the AD-1 contacts prevents automatic operation of the positioner, lift, clamp and drills. The operator, after the testing cycle is completed, must perform an auxiliary drilling operation, as will be explained later.

After testing has been completed at 46% time in the right-hand correction plane and the particular indications for the unbalance in this plane have been made, the machine automatically conditions itself for testing in the left-hand correction plane.

(l) *Circuits conditioned for left testing.*—With reference to the pivot, transducer and servo motor circuit (Figure 28), it will be recalled that contacts c–1 are opened at 46% time. Thus, there is no longer power flow to the RP and PS relays and the coils of the right depth and angle servo motors. When the right pivot relay RP is de-energized, the contacts RP–1 and RP–2 open to de-energize the right pivot solenoid RP–S (Figure 29). When the RP–S solenoid is de-energized, the right pivot valve 238 (Figure 2) is actuated and air is removed from the right pivot cylinder 50b and the spring-loaded piston in the cylinder engages the right pivot with the cradle. When the transducer shorting relay PS is de-energized, the contacts PS–1 (Figure 30) are closed, thus again shorting the transducers. De-energizing of the coils in the depth and angle servo motors prevents further movement of the motors, thus providing additional insurance against movement of the cam 63 or of the pointer 99.

Again with reference to Figure 28 at 49% time, the timer motor 179 has rotated cam C–4 so that contacts c–4 are closed. Thus, power is supplied to the left pivot relay LP through the left auxiliary drill contacts LAD–3. Energizing of the left pivot relay LP closes the contacts LP–1 and LP–2 (Figure 29) to energize the left pivot solenoid LP–S.

When the LP–S solenoid is energized, the left pivot valve 239 (Figure 2) is actuated and air is supplied to the left pivot cylinder 49b and the left pivot 49 is disengaged from cradle 35. It will be recalled that the right pivot 50b is now engaged with the cradle, so that the cradle is free to oscillate about pivot 50 for testing in the left correction plane.

Further with reference to Figure 28, power is supplied to the right and left transducer relay RLP and energizing of the RLP relay opens the RLP–2 contacts (Figure 30) which unshorts the signal input to the testing mechanism 179. Also, as seen in Figure 30, the movable arm of the RLP–1 contacts moves to the dotted position to disconnect transducer coil 176a and connect transducer coil 177a for operation.

As has been pointed out above, the cradle 35 and crankshaft 15 are oscillating about right pivot 50 and thus a signal is developed in transducer coil 177a. This signal is supplied to the input terminals 245 (Figure 30) of the testing mechanism 179 by connections including conductor 246, the contacts SLSD–2, calibrating pot 292 and contact RLP–1 (dotted lines). The testing mechanism 179 operates as has been previously indicated and the amount of unbalance signal is indicated on meter 32 while the angular location of unbalance is indicated on meter 31. These signals are transferred to the left depth memory circuit 185 and to the left angle memory circuit 187 in a manner described in connection with the description of the testing in the right correction plane.

Again with reference to Figure 28, power is also supplied to the right and left depth and angle control relay RE.

When the RE relay is energized, the movable arms of the RE–2 and RE–4 contacts (Figure 31) move to the dotted positions. Also, the movable arms of the RE–1 and RE–3 contacts (Figure 32) move to their dotted positions. The effect of the above movement of RE contacts is to disconnect the right depth servo motor RDSM from the memory circuit 184 and connect the left depth servo motor LDSM in the memory circuit 185, and also to disconnect the right angle servo motor RASM from the memory circuit 186 and to connect the left angle servo motor LASM in the memory circuit 187. Thus, the memory circuits are conditioned for operation in accordance with the unbalance in the left correction plane.

As seen in Figure 28, power is also supplied through the left auxiliary drill contacts LAD–1 to one coil of the left angle servo motor LASM via connections 290. The other coil of the left angle servo motor is supplied with power through connections 291 from certain parts of the left angle memory circuit 187 (Figure 32) in a manner to be described in detail later.

(*m*) *Left depth memory circuit.*—Again with respect to Figure 28, it is seen that power is supplied to one coil of the left depth servo motor LDSM through connections 288. The other coil of the servo motor is supplied with power through connections 289 from certain parts of the left depth memory circuit 185 (Figure 31) in a manner described below.

Referring to converter 258, the signal proportional to the amount of unbalance in the left correction plane appears between contacts 257 and ground. The contact arm 259 of the converter unit is connected via right and left depth and angle control relay contacts RE–4 (dotted line) to the movable arm 292*a* of potentiometer 293. This arm is interconnected with the shaft of the left depth servo motor LDSM in a manner similar to that described in connection with the movable arm 72*a* as connected to the shaft 71 of the right depth servo motor. As seen in Figure 31, one side of the potentiometer resistor 293*b* is connected to the grounded terminal 256*a*, and the other side is connected through a calibrating potentiometer 294 to the movable arm 261 of the standard cell potentiometer resistor 262. As has been described before, the cell develops a standard known voltage and this voltage is impressed across the terminals of potentiometer resistor 293*b*. Depending upon the position of movable arm 293*a*, a proportional amount of this voltage appears between contact 259 and ground.

The converter 258 develops a voltage across potentiometer 266 which is fed to the amplifier 267. The amplified voltage is fed to one coil of the left depth servo motor LDSM via the contacts RE–2 (dotted line) and connections 289. The servo motor LDSM is actuated in accordance with the signal to position cam 189. The cam remains in this position in preparation for use in the drilling cycle.

(*n*) *Left unbalance magnitude indication.*—In the event that cam 189 is oriented in a manner similar to that of the position of cam 63 (as is shown on Figure 3), unbalance in the crankshaft is within tolerance and the cam attached to the operating arm 149 associated with control mechanism 24 actuates the left "o.k." microswitch *lok*.

When the *lok* microswitch is actuated, the left "o.k." light *l*–4 and the left "o.k." relay LOK are energized as shown on the left indicator light circuit (Figure 34). It will be recalled that the contacts *c*–7 are closed at 48% time and when the left "o.k." microswitch is activated, the *lok*–1 contacts are closed, thus energizing the relay LOK. When the LOK relay is energized, the movable arm of the LOK–1 contacts moves to its dotted position, and since the SSH–3 contacts are closed, the light *l*–4 is energized.

If unbalance is present in the left correction plane (other than that requiring split drilling), the light *l*–6, which indicates to the operator the presence of unbalance, will be activated. Power is supplied to the light *l*–6 through the contacts *c*–7, the LSD–1 contacts, the LOK–1 contacts, and the SSH–3 contacts.

In the event unbalance is of a nature requiring split drilling, the left split drill microswitch *lsd* will be activated by the cam surface (not shown) on operating arm 149 and the left split drill microswitch contacts *lsd*–1 are closed and power supplied to the left split drill relay LSD (Figure 34) through the now closed contacts *c*–7. When the LSD relay is energized, the holding contacts LSD–3 close. Also, the movable arm of the LSD–1 contacts moves to the dotted position and power is supplied to the left split drill indicator light *l*–10 and also to the left split drill relay SLSD. When the SLSD relay is energized, certain control circuits are activated so that after the testing cycle, the split drill operation can be performed. Also, the contacts SLSD–6 (Figure 37) are closed, which energizes the relay AD, which opens the contacts AD–1 and prevents automatic operation of the positioner, lift, clamp and drills.

(*o*) *Left angle memory circuit.*—An angle signal appearing at terminals 253 on testing mechanism 179 (Figure 30) is transferred to the left angle memory circuit 187 through a filter arrangement 273 (Figure 32). Thus, a signal proportional to the angular location of unbalance in the left correction plane appears between contact 276 of converter unit 277 and terminal 275. The contact 278 of converter unit 277 is connected via the right and left depth and angle control relay contacts RE–3 (dotted line) to the movable arm 114*a* of potentiometer 114. The movable arm 114*a* is interconnected with the shaft 111 of the left angle servo motor LASM through gears 112 and 110 and is rotated by a motor so as to be variably positioned on the potentiometer resistor 114*b*. As seen in Figure 32, one side of the potentiometer resistor 114*b* is interconnected with terminal 275 and the other side is interconnected through calibrating pot 295 with the movable arm 280 of the standard cell potentiometer resistor 281. Thus, by means of the connections shown, a standard known voltage is impressed across the terminals of the potentiometer resistor 114*b*. Depending upon the position of the movable arm 114*a*, a proportional amount of this voltage appears between contact 278 and terminal 275.

The oscillation of the center contact arm 283 develops a signal voltage across potentiometer 284 which is fed to the amplifier 287 via conductor 286. The amplified signal is then fed to one coil of the left angle servo motor LASM via contacts RE–1 (dotted line) and the connections 291. The other coil of the servo motor is supplied with 110 volt power through connections 290.

(*p*) *Left angle indication.*—Thus, the left angle transmitter LAT and the pointer 98, which are operated by the servo motor LASM, are positioned in accordance with the angular location of unbalance in the left correction plane. The transmitter (and pointer) remain in this position for use later in the drilling cycle.

In the event the unbalance lies outside the main counterweight 15*b*, the switch *adl* (Figure 11) will be actuated and close the contacts *adl*–1 (Figure 37) to energize the relay AD, which opens the AD–1 contacts and prevents automatic operation of the positioner, lift, clamp and drills. After the testing cycle is completed, the operator performs the auxiliary drilling operation as will be explained later.

After testing in the left correction plane has been completed, the machine is automatically conditioned for carrying out the required drilling operation, or if no unbalance is present, automatically returned to stand-by condition.

(*q*) *Machine conditioned to stand-by.*—The manner in which the machine returns to stand-by condition is explained following. With reference to Figure 24, it will be recalled that at 79% time, the timer motor has rotated cam C–4 so that the contacts *c*–4 open. Thus, as shown in Figure 28, the opening of the *c*–4 contacts de-energizes the left pivot relay LP, the depth and angle control relay RE, the transducer selector relay RLP, and the respective coils of the left depth and left angle servo motors. When the left pivot relay LP is de-energized, the left pivot 49 engages the cradle 35 and thus, the cradle, since the right pivot 50 is already engaged, is held in a fixed position. When the control relay RE is de-energized, the various RE contacts shown on Figures 31 and 32 return to their normal positions, which sets up the memory circuit mechanism associated therewith for operation when testing is desired to be done in the right correction plane. When the transducer selector relay RLP is de-energized, the RLP–1 contacts shown on Figure 30 return to the normal position to interconnect the transducer 176a and the RLP–2 contacts short the input of the testing mechanism.

With reference to Figures 24, 26 and 35, it will be recalled that at 80% time, the contacts c–3 open and the testing motor starter S–TM is de-energized. As seen on Figure 27, when the starter is de-energized, the S–TM–1 contacts are opened and the testing motor stops. With reference to Figure 35, it is pointed out that when the starter is de-energized, the S–TM–3 contacts close. The contacts c–9 are closed at this time (Figure 24) and, therefore, the brake relay B is energized. When the brake relay is energized, the brake relay contacts B–1 shown on Figure 27 are opened, thus de-energizing the brake solenoid B–S. As has been previously explained, when the brake solenoid B–S is de-energized, the braking mechanism (not shown) on the testing motor 205 clamps the motor so that it cannot turn.

Thus, by means of the above-described system, the pivots 49 and 50 are engaged with the cradle and the testing machine motor has been stopped.

Note here, however, that at 85% time, the contacts c–9 open (Figure 24) and the effect of this is to de-energize the brake relay B (Figure 35) so that the B–1 contacts (Figure 27) close and energize the brake solenoid B–S so that the braking mechanism permits the motor 205 to turn. Thus, the positioner motor 12 can turn the crankshaft, as will be noted later.

The wafer arms W1a, W2a, etc., it will be recalled, are on terminals 2 during the testing operation, and afterward, if no unbalance is present in either plane, are automatically returned to the "stand-by" terminals 1. How this is accomplished is explained following.

With reference to Figures 21 and 24, it will be observed that the contacts c–5 close at 80% time. With closure of the contacts c–5, the sequence switch solenoid SS–S is energized (see Figure 22). When the solenoid is energized, the wafer arms move from terminals 2 to terminals 3. With the wafer arms on terminal 3, it will be recalled, since no unbalance is present, the right "o.k." relay ROK is activated and consequently the ROK–2 contacts are in the closed position (dotted lines) and the sequence switch solenoid SS–S is again energized to move the wafer arm to terminal 4.

When the wafer arms are on terminals 4, the solenoid is again energized because with no unbalance, the right split drill microswitch RSD is not actuated and the RSD–3 contacts are closed. The wafer arms are, therefore, moved to terminals 5. On terminals 5 the solenoid is again energized because the RSD–2 contacts are closed and the wafer arms move to terminals 6. On terminals 6, since the LOK–2 contacts are closed (dotted lines) because no unbalance is present, the solenoid will again be energized and the wafer arms will move to terminals 7. On terminals 7 the solenoid is again energized because, with no unbalance present, the left split drill microswitch LSD is not actuated and the LSD–3 contacts are closed and the wafer arms move to terminals 8. On terminals 8 the solenoid will again be energized because the LSD–2 contacts are closed and the wafer arms will be moved to terminals 9. Terminals 9, 10, 11 and 12 being connected together, the solenoid will be serially energized and the wafer arms will move from 9 to 10 to 11 to 12 and then back to terminals 1, which is the "stand-by" position.

The "stand-by" position will be indicated to the operator by the light l–1, which is activated when the wafer arm W4a contacts terminal 1 (Figure 26).

(r) *Positioner orients crankshaft and machine conditioned for drilling in the right plane.*—The manner in which the machine is automatically conditioned for carrying out the required drilling operation is as follows:

As explained above, the wafer arms are stepped from terminals 2 to terminals 3 at 80% time. If normal drilling is required in the right correction plane, the right "o.k." microswitch will not be closed and the ROK relay is inactive (Figure 33). Therefore, the ROK–2 contacts connected to terminal 3 of wafer W1 (Figure 21) will be closed and the wafer arms will remain on terminals 3 for a certain period of the right drill operation and then be stepped (as will later be described) to terminals 6 for drilling in the left correction plane, if that need be done.

If no unbalance is present in the right correction plane, the wafer arms will be stepped from terminals 3 to 4 to 5 to 6 as above described in connection with stepping of the arms to "stand-by".

Thus, with the wafer arms on terminals 6 in accordance with one or the other of the operations above described, the wafer arms will either remain on terminals 6 or be immediately stepped as per the following.

If unbalance is present in the left correction plane, the LOK–2 contacts will be opened and the wafer arms will remain on terminals 6 for a certain period of time of the left drill operation and then be stepped back to the "stand-by" position in a manner to be later described.

If no unbalance is present in the left correction plane, the wafer will be stepped to stand-by in a manner already described.

The above explanation of the stepping of the wafer switch W did not take into account the sequence under conditions of unbalance requiring split drilling in the right or left correction planes or both. This, however, is explained later in connection with the explanation of the split drill operation.

In the event of unbalance in one or the other of the correction planes or both, the wafer arms accordingly stop on terminals 3 or 6, or both. Stopping of the wafer arm W4a on terminal 3 or 6 of wafer W4 automatically activates the positioner mechanism as explained following.

With reference to Figure 37, assume that the wafer arm W4a has stopped on terminal 3 and that the contact c–6 has closed. The S–TM4 contacts are closed, since the starter motor has been de-energized. With reference to Figure 39, it will be seen that the TSR relay has picked up via terminal 3, wafer arm W5a, ROK–2 and the LAD–2 contacts. This interconnects right angle transmitter RAT to the angle receiver AC by the closure of the TSR–1 contacts (Figure 48).

The time delay relay TD will be energized through wafer arm W4a, terminal 3, contacts c–6, S–TM4 and CR–7. The time delay relay preferably is of the dashpot type which prevents the operation of the contacts associated therewith until after a predetermined time. In this instance, the time for actuation of the TD–1 and TD–2 contacts is about four or five seconds. During this time interval, it will be noted that the TD–1 contacts are closed so that the servo motor 12 is interconnected between the power terminals P–1 and P–2. As explained above, either the K–1 or J–1 contacts will be closed so that the servo motor turns the crank to the correct position with respect to the drill. At the end of the time interval, the time delay relay TD finally picks up so that the TD–1 contacts open and the TD–2 contacts close. When TD–1 opens, the servo motor 12 is de-energized and when the TD–2 contacts are closed, the LL relay picks up and the LL–2 contacts close. The closing of the LL–2 contacts energizes the lift or automatic transfer relay L.

When the transfer relay L is energized, contacts L1 and L2 shown on Figure 29 close to energize the transfer mechanism solenoid L–S. Energizing of the L–S solenoid operates valve 240 (Figure 2) to permit air pressure to be supplied to the upper side of air cylinder 62 and connects the lower side to exhaust. This moves piston arm 60 inwardly and pivots the toggle arms 56 and 57 to move the jaws 51 of the transfer mechanism upwardly, which lifts the crankshaft 15 off the rollers 37. At this time the transfer microswitch *lms* is actuated.

*4. Right drill automatically actuated*

With reference to Figure 39, it is seen that the right drill operation light *l-7* is supplied with power through contacts LAD-2, ROK-3, wafer arm W5*a*, and terminal 3 of wafer W5, and through contacts *lms3* of the transfer microswitch, which are closed since the transfer mechanism is up.

The energizing of the LL relay as mentioned above causes the LL-1 contacts (Figure 39) to close. The right drill relay RD is then supplied with power through the LAD-2 contacts, the ROK-2 contacts, the wafer arm W5*a* and terminal 3, and through the *lms3* contacts and the AC-1 contacts. It is to be noted here that the RD relay may be manually energized rather than automatically, as above mentioned, by the operator operating the right pushbutton PBR, which closes the PBR-1 contacts (adjacent the LL-1 contacts).

Thus, when the relay RD is energized, the holding contacts RD-3 close (dotted lines), which hold up the relay when the LL-1 contacts or the PBR-1 contacts open. When the drill advances right advance-return contacts *rar-2* close, which holds up the RD relay when (as will be noted later) the RR-4 contacts open.

When the right drill relay RD is energized, the RD-1 contacts, shown on Figure 35, are closed, and with the transfer mechanism microswitch actuated by toggle arm 57, the *lms-1* contacts are also closed and power is supplied to the right drill motor starter S-RDM. Energizing of the starter closes contacts S-RDM1 shown on Figure 27 to supply power to the right drill motor 300. The right drill motor has connections to rotate the right drills 19 and 20 and also has connections to build up pressure for the hydraulic mechanism enclosed within housing 151.

Energizing of the right drill relay RD throws the movable arm of the RD-4 contacts to its other position (dotted line), as is shown on Figure 38. Since the transfer microswitch has been activated by toggle arm 57, the *lms-2* contacts are closed and power is thus supplied to the clamp relay CR through the RD-4 contacts (dotted line) and the AC-2 contacts. When the clamp relay CR is energized, the contacts CR-1 and CR-2 shown on Figure 29 are closed and the clamp solenoid C-S is energized. When the clamp solenoid C-S is energized, the valve 241 is activated to supply air pressure through lines 172 to the clamp cylinder 166. The piston 165 is moved upwardly and the toggle mechanism heretofore described is operated to move the clamp downwardly so that the clamp jaws 53 secure the crankshaft on the lift or jaws 51.

Energizing of the clamp relay CR closes the CR-8 contacts (Figure 37) and opens contacts CR-7, which opens the power connection to the TD relay and to the positioner motor 12. With the TD relay de-energized, the TD-1 contacts close and the TD-2 contacts open, which de-energizes the LL relay and opens the LL-1 contacts (Figure 39) and the LL-2 contacts (Figure 37). The right drill relay RD (Figure 39) remains energized through its holding contacts RD-3 and the lift relay L (Figure 37) remains energized through the LR-8 contacts.

Energizing the clamp relay C-R also closes contacts CR-3 and CR-4 on Figure 29. These contacts, together with contacts L-1 and L-2, interlock the transfer mechanism and the clamp, i.e., the transfer mechanism cannot go down until the clamp is up.

When the transfer mechanism is up, the transfer microswitch *lms* is actuated and the *lms-5* contacts shown on Figure 41 are closed. This supplies power through rectifier 301, potentiometer 302, and the right work contactor contacts RWC-1 and RWC-2 to energize holding solenoid 76. Energizing of the holding solenoid 76 holds follower 64 in position (Figure 4).

With reference to the right drill advance circuit shown in Figure 40, it is seen that when the right drill relay RD is energized, the RD-5 contacts close (dotted lines) and the right advance relay RA is supplied with power through the following elements: the transfer mechanism microswitch contacts *lms-4* (which are closed because the transfer mechanism is up), the right drill advance return microswitch contacts *rar-3* (which are closed when the drill is in its normal up position), and the clamp microswitch contacts *cms-1* (which are also closed, as the clamp is in its normal up position).

When the right advance relay RA is energized, the contacts RA-1 and RA-2 are closed (Figure 29) to supply power to the right advance solenoid RA-S. Energizing of the RA-S solenoid operates the hydraulic mechanism in housing 157, which permits the drill to advance downwardly at rapid traverse. As the drill advances, the right advance return microswitch contacts *rar-3* open to de-energize the RA relay and the RA-1 and RA-2 contacts are opened to de-energize the right advance solenoid RA-S. Although the right advance solenoid is de-energized, the mechanism in housing 157 permits the drill to continue to advance.

The drill continues to advance downwardly until approximately within 1/8″ from the counterweight 15*b*. At such time a dog on vertically extending member 161 contacts a cam on horizontally extending member 157*a* which operates the hydraulic mechanism within housing 157 to slow the drill traverse down to feed speed. The drill then continues to advance until the drill tip makes contact with the counterweight 15*b*. At this time, the pressure of the contact so made serves to slightly "back up" the drill, so that the right work contactor RWC located within housing 151 is actuated and the movable arms of the RWC-1 and RWC-2 contacts move to the dotted line positions as is shown in Figure 41.

The moving of these switches to the dotted line position de-energizes solenoid 76 and the follower arm 64 is free to travel downwardly with the drill.

The coolant relay CC is energized through the following elements: the *lms-5* contacts which are closed since the transfer mechanism is up, the RD-6 contacts which are closed as the RD relay is energized, and the RWC contacts in the dotted line position. When the coolant relay CC is energized, the coolant solenoid CC-S is also energized by closing of contacts CC-1 and CC-2 in Figure 29. The coolant solenoid CC-S operates the valve 297 (Figure 2) to supply coolant through the line 298 to the drills.

The drill advances into the counterweight 15*b* until the contact arm 64*a* makes contact with the cam 63. At this instant, the downward traverse of the drill is stopped and the drill reversed by mechanism shown in depth contactor circuit (Figure 42). With reference to Figure 42, it is seen that the primary windings of transformer 306 are supplied with power through terminals P-1 and P-2. The top half of the secondary winding of transformer 306 is interconnected to the plate of tube 307 through right depth contactor relay RDC. The grid of the tube 307, interconnected to the lower half of the secondary winding of transformer 306 by means of the connections shown, is negatively biased to prevent the tube 307 from conducting.

A somewhat diagrammatic view of the cam 63, the follower 64, the flexible member 296 and conductor 77*b* is shown on Figure 42, the structural details of which were described in connection with Figure 4. The cam 63, being interconnected with the chassis of the mechanism, is at ground potential. Thus, when the follower 64 contacts the cam, the bias means supplied to tube 307 is grounded out. Therefore, the tube 307 begins to conduct and right depth contactor relay RDC is energized. Energizing of the RDC relay performs two functions. One is to advance the wafer arms W1a, W2a, etc., and the other is to activate mechanism to return the drill.

The first function will be explained with reference to Figure 21, wherein it will be recalled that the wafer arm W1a is on terminal 3. When the RDC relay is energized, the RDC-2 contacts close. The right advance-return microswitch contacts rar-1 are closed when the drill is down, and thus power is supplied to sequence switch solenoid SS-S to advance the wafer arm W1a to terminal 4. On terminal 4 with the RSD-3 contacts closed, the solenoid is again energized and the wafer arm moves to terminal 5. On terminal 5 the RSD-2 contacts being closed, the solenoid is again energized and the wafer arm moves to terminal 6. With unbalance in the left-hand correction plane, the wafer arm will remain on terminal 6 in preparation for the left drilling operation, because the left "o.k." relay contacts LOK-2 and the left depth control relay contacts LDC-2 are open and the left split drill relay contacts LSD-2 are in the position shown in the dotted lines.

When the wafer arms move to terminal 6, the right drill operation light shown in Figure 39 is de-energized as wafer arm W5a is no longer in contact with terminals 3, 4 or 5 of wafer W5.

The second function performed by the energization of the RDC relay will be explained with reference to the right drill return circuit of Figure 43. When the RDC relay is energized, the contacts RDC-1 will close, and power will be supplied to the right return relay RR through the following elements: the transfer mechanism microswitch contacts lms-6 (which are closed since the transfer mechanism is in its normal up position), the right drill relay contacts RD-7 (which are also closed because the RD relay is energized), and the right drill advance-return microswitch contacts rar-4 (which were closed when the drill began its advance). When the right return relay R is energized, the holding contacts RR-1 will close to hold up the relay.

Energizing of the right return relay RR closes contacts RR-2 and RR-3 (Figure 29) to supply power to the right return solenoid RR-S. The energizing of the right return solenoid actuates the mechanism in housing 157 to reverse the traverse of the drill.

When the drill begins its return, the follower arm 64 moves upwardly and the short in the bias circuit for tube 307 (Figure 42) is removed and the tube stops conducting and the RDC relay is de-energized.

When the drill is fully up and with the RDC relay de-energized, the RDC-1 and rar-4 contacts in Figure 43 open to de-energize the right return relay RR. When the right return relay RR is de-energized, the holding contacts RR-1 open. Also, as seen in Figure 39, the RR-4 and rar-2 contacts are opened to de-energize the RD relay, which opens the holding contacts RD-3. In addition the de-energizing of the RR relay opens the RR-1 and RR-2 contacts in Figure 29 to de-energize the right return solenoid RR-S.

When the right drill relay RD is de-energized, the RD-1 contacts (Figure 35) open to de-energize the right drill motor starter S-RDM which opens the S-RDM-1 contacts (Figure 27) to de-energize the right drill motor.

Also, de-energizing of the RD relay moves contacts RD-4, shown on Figure 38, to the normally closed position, which de-energizes the clamp relay CR and opens contacts CR-1 and CR-2 (Figure 29) to de-energize the clamp solenoid C-S. The contacts CR-3 and CR-4 in the lift solenoid circuit are also opened. The de-energizing of the clamp solenoid C-S actuates the air valve 241 to bleed the air cylinder 166 to move the clamp 25 upwardly.

In addition, de-energizing of the RD relay opens contacts RD-6 (Figure 41) to de-energize the coolant relay CC which acts to stop the coolant supply to the drills.

When the drill returns to its up position, the work contactor RWC is actuated and the contacts RWC-1 and RWC-2 are closed to energize the solenoid 76. The follower 64 has moved upwardly with the drills to its normal position, where it is fixedly held by the energized solenoid.

As mentioned above, the clamp relay CR is de-energized and this causes the lift to go down so as to deposit the crank on the rollers 37. This takes place as follows. In Figure 37 the CR-8 contacts open up and since the LL-2 contacts are also open, the lift relay L is de-energized, and this opens the L-1 and L-2 contacts (Figure 29), and it will be noted that the CR-3 and CR-4 contacts are open so that the lift solenoid LS is de-energized. The de-energizing of the LS solenoid operates valve 240 (Figure 2) to connect the upper side of piston 62 to exhaust and to admit air to the lower side. This moves the piston arm 60 outwardly and pivots the toggle arms 56 and 57 to move the lift or jaws 51 downwardly. When the lift goes down, all of the contacts on the lift microswitch lms are open.

Further, with reference to Figure 37, it will be noted that the de-energizing of the clamp relay CR closes the CR-7 contacts and this sets up the positioner servo motor 12 and time delay TD for energizing when the crank is positioned for the left correction plane.

The drilling operation in the right correction plane has been completed and the machine is automatically set up for drilling in the left correction plane, which will be explained below.

5. Positioner orients crankshaft and machine conditioned for drilling in the right plane With reference to Figure 39, it will be noted that the TSR relay is de-energized when the wafer arm W5a leaves the terminal 5. This, of course, opens the TSR-1 contacts (Figure 48) to disconnect the right angle transmitter RAT from the receiver AC. Also with reference to Figure 44, it will be observed that the TSL relay is energized when the wafer arm W6a arrives on terminal 6 (the LOK-3 contacts being closed, since there is unbalance in the left plane). When the TSL relay is energized, the TSL-1 contacts (Figure 48) close to connect the transmitter LAT to the receiver AC.

It will be recalled that wafer arm W4a has stopped on terminal 6 (Figure 29) and also that the CR-7 contacts (Figure 39) are closed. With the transmitter LAT and the receiver AC connected and motor 12 supplied with power, the positioner circuits (Figure 48) turn the motor 12 so that the counterweight 15a of the crank is correctly positioned with respect to drill 21.

6. Left drill automatically actuated

The closing of the CR-7 contacts also energizes the time delay relays TD, and after a predetermined interval, the contacts TD-1 open to de-energize the servo motor and the TD-2 contacts close to energize the relay LL-1. The energizing of the relay LL closes contacts LL-2 which effects energizing of the lift relay L and this causes closure of the L-1, L-2 contacts (Figure 29) to energize the lift solenoid LS, which operates valve 240 to cause the lift to move the crankshaft off the rollers 37.

The left drill operation light l-8 as shown on Figure 44 is energized through limit switch contacts lms-7 which are closed, since the lift is up, and through the wafer arm W6a and terminal 6 of wafer W6 and the LOK-2 contacts.

The energizing of the LL relay mentioned above causes the LL-3 contact (Figure 44) to close. The left drill relay LD is then energized through the lms-7 contacts, the AC-2 contacts, the wafer arm W6a and terminal 6 and the LOK-3 contacts. It is to be noted here that the LD relay may be manually energized rather than automatically as above mentioned by the operator operating the left pushbutton PBL, which closes the PBL-1 contacts (adjacent LL-3 contacts). Thus, when the left drill relay LD is energized, the holding contacts LD-3 close and hold up the LD relay through the left return relay contacts LR-1. When the drill advances, the left advance-return microswitch contacts *lar-1* close, which holds up the LD relay when (as will be explained) the LR-1 contacts open.

Energizing of the LD relay closes the contacts LD-4 (Figure 38) and since the transfer microswitch *lms* has been activated by the toggle arm 57, the contacts *lms-2* are closed and power is supplied to the clamp relay CR through *lms-2*, LD-4 and AC-2. When the clamp relay, CR is energized, the contacts CR-1 and CR-2 shown in Figure 29 are closed and the clamp solenoid CS is energized. When the clamp solenoid CS is energized, the valve 241 is actuated to supply air to the clamp cylinder 166 (Figure 1). The piston 165 is moved downwardly to secure the clamp on the lift.

Energizing of the clamp relay CR closes the CR-8 contacts (Figure 37) and opens the contacts CR-7, which opens the power connection to the time delay relay TD and to the positioner servo motor 12. With the TD relay de-energized, the TD-1 contacts close and the TD-2 contacts open, which de-energizes the LL relay and opens the LL-3 contacts (Figure 44) and the LL-2 contacts (Figure 37). The left drill relay LD (Figure 34) remains energized through its holding contacts LD-3 and the lift relay L (Figure 37) remains energized through CR-8 contacts.

Energizing of the clamp relay CR also closes contacts CR-3 and CR-4 on Figure 29. These contacts, together with the contacts L-1 and L-2, interlock the lift and the clamp, i.e., the lift cannot go down until the clamp is up.

Further, with reference to the energizing of the LD relay, this closes the LD-1 contacts shown in Figure 35 and the left drill motor starter S-LDM is energized via the *lms-1* contacts which are closed because the lift is up. When the starter S-LDM is energized, the S-LDM-1 contacts shown on Figure 27 close and power is supplied to the left drill motor 155. The motor rotates the drills and actuates certain mechanism to supply hydraulic pressure to the operating mechanisms within housing 309.

As seen in Figure 41, when the lift is up, the lift microswitch *lms* is actuated and the *lms-5* contacts are closed. This supplies power to the rectifier 304, potentiometer 305 and the left work contactor contacts LWC-1 and LWC-2, to energize the holding solenoid 303. Energizing of the holding solenoid 303 holds the follower 310 in position (Figure 2).

Energizing of the LD relay also closes contacts LD-4 on the left drill advance circuit, as shown in Figure 45, to energize the left advance relay LA through the transfer mechanism microswitch contacts *lms-8*, through the left drill advance return microswitch contacts *lar-2* (which are closed when the drill is in the normal up position) and through the clamp microswitch contacts *cms-2* (which are closed when the clamp is down).

The energizing of the left advance relay LA closes the LA-1 and LA-2 contacts shown on Figure 29 to energize the left advance solenoid LA-S. Energizing of the LA-S solenoid operates hydraulic mechanism in the housing 309 which permits the drill to advance downwardly at rapid traverse. As the drill advances, the left advance-return microswitch contact *lar-2* open to de-energize the LA relay and the RA-1 and RA-2 contacts (Figure 29) are opened to de-energize the left advance solenoid LA-S. Although the left advance relay is de-energized, the mechanism in housing 157 permits the drill to continue to advance.

The drill begins to advance rapidly downwardly until it reaches within approximately ⅛″ of the counterweight 15a, and at that time a dog on vertically extending members 161a contacts a cam on horizontally extending member 309a, which actuates certain of the mechanism in housing 309 to throw the drill traverse into feed speed.

The drill continues to advance until the drill tip engages the counterweight 15a. At this point, the pressure of engagement "backs up" the drill, which actuates the left work contact switch LWC, and the movable arms of contacts LWC-1 and LWC-2 are thrown to their other positions (dotted lines). The left holding solenoid 303 is de-energized and the follower 310 is free to travel downwardly with the drills.

When the LWC contacts are thrown to the dotted line position, the coolant relay CC is energized through the LD-2 contacts, which are closed and through the *lms-5* contacts which are also closed. Energizing of the coolant relay CC actuates certain mechanism within housing 297 (Figure 2), which supplies coolant to the drills.

The drill and the follower arm 310 continue to advance downwardly until the contact associated with the follower engages cam 189. At this instant, in a manner similar to that described in connection with drilling in the right plane, the bias on tube 311 is grounded out and the tube begins to conduct to energize the left depth contactor relay LDC.

The energizing of the left depth contactor relay LDC performs two functions. One is to advance the wafer arms and the other is to actuate mechanism for returning the drill.

The first function will be explained with reference to Figure 21. It will be recalled that wafer arm W1a is on terminal 6. The energizing of the LDC relay closes contacts LDC-2, and since the left advance return microswitch *lar* has been actuated, the *lar-1* contacts are closed, hence power is supplied to the sequence switch solenoid SS-S and the wafer arms are moved from terminal 6 to terminal 7. On terminal 7 with the left split drill relay contacts LSD-3 closed, the wafer arm will be advanced to terminal 8, and on terminal 8 with the LSD-2 contacts closed, the wafer arms will be advanced through terminals 9, 10, 11 and 12, and back to the "stand-by" terminals 1. At this time, since the wafer arms are disconnected from terminals 6, 7 and 8, the left drill operation light *l-8* shown on Figure 44 will be de-energized.

The other function of the left depth contactor relay LDC will be explained in connection with the left drill return circuit shown on Figure 46. The left depth contactor contacts LDC-1 will close to energize the left return relay LR through the transfer mechanism microswitch contacts *lms-9* (which are closed since the transfer mechanism is up), through the LD-1 contacts (which are also closed as the LD relay is energized (Figure 44)), and through the left drill advance-return microswitch contacts *lar-3* (which are also closed since the drill is advanced). Energizing of the relay LR closes holding contacts LR-2 to hold up the LR relay when the LDC-1 contacts subsequently open.

Energizing of the left return relay LR closes contacts LR-3 and LR-4, shown on Figure 29, to energize the left return solenoid LR-S. When the LR-S solenoid is energized, certain mechanism in housing 309 stops and returns the drill.

When the drill begins its return, the follower arm 310 moves upwardly and the short on the bias circuit for tube 311 (Figure 42) is removed and thus the tube stops conducting and the LDC relay is de-energized.

When the drill is fully up, and with the LDC relay deenergized, the LDC-1 contacts and the *lar-3* contacts shown on Figure 46 open to de-energize the left return relay LR. When the left return relay LR is de-energized, the holding contacts LR-2 open. Also, as seen in Figure 44, the LR-1 and *lar-1* contacts are opened to de-energize the LD relay, which opens holding contacts LD-3. In addition, de-energizing of the LR relay opens the LR-3 and LR-4 contacts to de-energize the left return solenoid LR-S, as is shown on Figure 29.

The de-energizing of the LD relay opens the LD-1 contacts shown on Figure 35 to de-energize the left drill motor starter S–LDM. When the starter is de-energized, contacts S–LDM1 shown on Figure 27 are open to de-energize the left drill motor 155.

When the LD relay is de-energized, the LD–3 contacts shown on Figure 38 open to de-energize the clamp relay CR, which opens contacts CR–1 and CR–2 to de-energize the clamp solenoid C–S which, in turn, operates valve 241 to actuate the clamp operating cylinder 166 to return the clamp upwardly.

With the de-energizing of the clamp relay CR, the CR–3 contacts (Figure 37) open and since the LL–2 contacts are open, the lift relay L is de-energized. This opens the contacts L–1 and L–2 (Figure 29) and since the CR–3 and CR–4 contacts are open, the lift solenoid LS is de-energized, which operates the valve 240 to cause the lift to go down.

Also, the LD–2 contacts, shown on Figure 41, are opened, to de-energize the coolant relay CC, which operates to stop the flow of coolant to the drills.

When the drill has returned to its up position, the work contactor LWC is actuated and the contacts LWC–1 and LWC–2 are closed to energize the solenoid 305. The follower 310 has moved upwardly with the drills to its normal position where it is fixedly held by the energized solenoid.

At this time, drilling in both planes has been completed and the machine is in "stand-by" position and conditioned for the operator to run a testing cycle to check the accuracy of the drilling operation.

7. Checking cycle

The operator pushes the test button PBT and the machine automatically measures the amount and angular location of unbalance in each plane in accordance with the description as above outlined.

8. Split drilling

The split drilling operation will be described with reference to an unbalance in the crankshaft of a nature requiring a split drilling operation in both the left and right-hand correction planes.

It will be recalled in connection with the description of the testing cycle in the right-hand correction plane that if an unbalance is such that the right split drill micro-switch *rsd* is actuated, the *rsd*–1 contacts (see Figure 33) close and power is supplied to the RSD relay through the c–8 contacts. When the RSD relay is energized, the RSD holding contacts close and the movable arm of the RSD–1 contacts moves to dotted line position. The split drill indicator light *l*–9 is energized, and also the signal cutter SRSD.

Also, when the signal cutter relay SRSD is energized, the SRSD–6 contacts (Figure 37) close and energize the AD relay which opens the AD–1 contacts to prevent automatic operation of the positioner, etc. Further, the movable arm of the SRSD–1 contacts shown on Figure 30 moves to its other position (dotted lines). The effect of this is to connect the arm 312a of potentiometer 312 with the testing mechanism 179. The adjustable arm 312a is set so that approximately one-half of the voltage being developed across the transducer coil 176a is fed to the testing mechanism 179.

The testing mechanism receives this signal and functions in a manner described heretofore. The signal produced by the testing mechanism is fed to the right depth memory circuit 184 and the memory circuit functions to position the cam 63 in accordance with the signal. Since the signal received is approximately one-half that originally received, the cam is moved to a position corresponding to approximately one-half of the original signal.

The cam 189 for the left correction plane is positioned in a manner similar to that described above. It will be recalled that at the end of the test cycle for the left correction plane, if the unbalance is of a nature requiring split drilling, the left split drill microswitch *lsd* will be actuated and the contacts *lsd*–1 (Figure 34) will be closed and power supplied to the left split drill relay LSD through contacts c–7. The energizing of the LSD relay closes holding contacts LSD–3 and the movable arm of the LSD–1 contacts moves to its other position (dotted line) and power is supplied to the left split drill indicator light *l*–10 and to the signal cutter SLSD.

When the signal cutter relay SLSD is energized, the SLSD–6 contacts close which, in the event split drilling is not required in the right correction plane so that the SRSD–6 contacts were not closed, would prevent automatic operation of the positioner. Further, the movable arm of the contacts SLSD–2 shown on Figure 30 moves to its other position (dotted line). This connects the arm 320a of potentiometer 320 with the testing mechanism 179. The adjustable arm 320a is set so that approximately one-half the voltage being developed across the transducer coil 177a is fed to the testing mechanism 179.

The testing mechanism receives this signal and functions in a manner described heretofore.

The signal produced by the testing mechanism is fed to the left depth memory circuit 185 and the memory circuit functions to position the cam 189 in accordance with the signal. Since the signal received is approximately one-half of that originally received, the cam is moved to a position corresponding to approximately one-half of the original signal.

Thus, with the cams 63 and 189 positioned as described, the operator is ready to proceed with the split drilling operation.

The operator then manipulates the SAD switch (Figure 2) which closes the contacts SAD–1 (Figure 37) to energize the lift relay L, which causes the lift to move the crankshaft off the rollers. He then manipulates the handwheel 190 for the crankshaft until the index line 131 on disk 97 is coincident with pointer 99.

The operator then pushes the right drill button PBR which brings down the clamp to secure the crankshaft in the correction position. The right drill then comes down and drills out metal in accordance with the depth determined by the cam 63 and then returns to its normal up position.

Since, in the split drilling operation, the operator is required to drill two holes, the mechanism is provided with certain interlocks which prevent further operation of the machine until the second hole is drilled out. This interlock will be explained in connection with Figure 21.

It will be recalled that after the testing cycle, the wafer arms W1a and W2a, etc., are stepped from terminals 2 to terminals 3. As has been explained in connection with normal drilling, the wafer arms remain on terminals 3 until the right depth contactor relay RDC is energized. When the RDC relay is energized, the RDC–2 contacts are closed and with the drill down the right advance-return microswitch has been actuated to close the *rar*–1 contacts. The wafer arms are then stepped from terminals 3 to terminals 4. On terminals 4, since the right split drill relay RSD is energized during the split drill operation, the RSD–3 contacts will be open. Therefore, the wafer arms will remain on terminals 4 until such time as the right drill pushbutton PBR is again actuated to drill the second hole.

With reference to Figure 38, it will be recalled that when the drill returns to its normal up position, the right drill relay RD is de-energized and the RD–4 contacts open to de-energize the clamp relay CR, which brings up the clamp.

The operator then rotates the crankshaft until index line 132 coincides with pointer 99, and he then pushes the right drill buttom PBR and the clamp comes down to secure the crankshaft and the drill mechanism operates to drill out the required amount of metal from the second hole.

Also, when the operator pushes the right drill pushbutton PBR for drilling out the second hole, the PBR-2 contacts shown on Figure 21 close and the wafer arms are stepped from terminals 4 to terminals 5. With the wafer arm W1a on terminal 5, the right split drill relay contacts RSD-2 will be in the position shown by the dotted lines because the right split drill relay RSD is energized and a circuit will be established to the right depth contactor contacts RDC-2 through conductor 313. It will be recalled that the RDC-2 contacts close when the RDC relay is energized at the bottommost stroke of the drill, and since the right advance return microswitch is actuated when the drill is down, the rar-1 contacts are closed. Therefore, through the above-described circuit, the sequence switch solenoid is energized and the wafer arms move from terminals 5 to terminals 6. The wafer arms remain on terminals 6 because with unbalance present, the LOK relay is not actuated and the LOK-2 contacts are open. The wafer arms remain on terminal 6 in preparation for the drilling operation in the left correction plane and left drill operation light *l*-8 in Figure 44 is on.

With the wafer arms stepped as above described, the right drill operation light *l*-7 shown on Figure 39 goes out because the wafer arm W5a of wafer W5 is disconnected from terminals 3, 4 and 5. Also, the right split drill signal light *l*-9, the right split drill relay RSD, and the signal cutter relay SRSD shown on Figure 33, are de-energized because the wafer arm W2a of wafer W2 is disconnected from terminals 3, 4 and 5. It is to be recalled that the contacts c-8 are open at this time (see Figure 24) and, therefore, no circuit can be established through this connection.

When the signal cutter relay SRSD is de-energized, the SRSD-1 contacts, shown on Figure 30, move from the dotted line position and disconnect the potentiometer arm 312a. Also, the SRSD-6 contacts (Figure 37) open, but the AD relay is not de-energized because the SLSD-6 contacts are still closed.

De-energizing of the right drill relay RD stops the right drill motor 300 in the manner previously described, de-energizes the coolant relay CC shown on Figure 41, and de-energizes the clamp relay CR to bring up the clamp.

The machine then is set for split drilling in the left correction plane and the operator turns the crankshaft until index line 131 is coincident with pointer 98. The crankshaft is then correctly positioned for drilling out the first hole.

The operator then pushes the left pushbutton PBL and the clamp comes down to secure the crankshaft. The coolant system is operated to supply coolant to the drills and the drill mechanism operates to drill out metal in accordance with the depth determined by cam 189 and then returns to its normal up position.

As mentioned above, in the description of the right split drilling operation, the operator is required to drill two holes and the left side is provided with an interlock system similarly as the right side, so that the machine cannot continue to operate until the second hole has been drilled. This interlock will be explained in connection with Figure 21.

It will be recalled that the wafer arms W1a, W2a, etc., are on terminals 6 at the beginning of the split drilling operation on the left side, and when the left depth contactor relay is energized, when the drill reaches its extreme down position, the LDC-2 contacts close and with the left advance-return microswitch *lar* actuated, the *lar*-1 contacts are closed and the sequence switch solenoid is energized to step the wafer arms from terminals 6 to terminals 7. As seen in Figure 21, the wafer arm W1a is connected to the left split drill relay contacts LSD-3 through terminals 7. These contacts are opened, since the left split drill relay is energized. Therefore, the wafer arms will remain on terminals 7 until the left pushbutton PBL is actuated to operate the drills for drilling the second hole.

After the drill returns to its normal up position, the left drill relay LD, (Figure 44) is de-energized. This opens the LD-2 contacts to de-energize the clamp relay CR (Figure 38) and the clamp moves to its upward position.

Also, the LD-2 contacts on Figure 41 open to de-energize the coolant relay CC and to stop the flow of coolant to the drills.

With the clamp up, the operator then turns the crankshaft until the index line 132 is coincident with the pointer 98. The crankshaft then is properly positioned for the drilling of the second hole in the left side.

The operator then again pushes the PBL button. This again energizes the left drill relay LD, which acts to energize the clamp relay CR, and the clamp comes down to clamp the crankshaft. The coolant relay CC is also energized and coolant is supplied to the drills. The drill comes down and drills out metal in accordance with the depth determined by cam 189 and then returns to its normal up position.

When the left drill pushbutton PBL is pushed for the second time, the PBL-1 contacts shown on Figure 21 close and power is supplied through the wafer arm W1a and terminal 7 of the wafer W1 to the sequence switch solenoid, which steps the wafer arms from terminals 7 to terminals 8. With the wafer arm W1a on terminal 8 and with the left split drill relay energized, the left split drill relay contacts LSD-2 are in the dotted line position and a circuit is established via conductor 321 from terminal 8 through the LSD-2 contacts to the left depth contacts LDC-2. It will be recalled that these contacts close when the left depth contacts relay is energized at the time the drill reaches its furthermost down position. The left advance-return microswitch will be actuated with the drill in the down position and, therefore, the *lar*-1 contacts are closed. Thus, a circuit is established via the above-described connections and the sequence switch solenoid is energized to step the wafer arms from terminals 8 to terminals 9. On terminals 9 the wafer arms will be stepped back to the "stand-by" terminals 1 in the manner described heretofore.

With the wafer arms stepped as above described, the left drill operation light *l*-8 shown on Figure 44 will be de-energized because the wafer arm W6a is disconnected from terminal 8 of wafer 6.

Also, stepping of the wafer de-energizes the left split drill relay LSD, the left split drill indicator light *l*-10 and the signal cutter SLSD, which are shown on Figure 34. These circuits are de-energized because the wafer arm W3a is disconnected from terminal 8 of wafer W3.

De-energizing of the signal cutter SLSD actuates the contacts SLSD-2, shown on Figure 30, to disconnect potentiometer arm 320a. Further, the SLSD-6 contacts (Figure 37) open to de-energize the AD relay and effect closure of the AD-1 contacts. It should be noted that closure of the AD-1 contacts does not then energize the servo motor 12 and time delay relay TD because the wafer arm W4a is in the "stand-by" position and so out of contact with any of the terminals 3-8.

When the drill has returned to its normal up position, the left drill relay LD is de-energized and this opens the LD-3 contacts shown on Figure 38 to de-energize the clamp relay CR which, in turn, operates to bring the clamp up.

Also, the LD-2 contacts shown on Figure 41 open to de-energize the coolant relay CC which stops the flow of coolant to the drills. In addition, the LD-1 contacts shown on Figure 35 open to de-energize the left drill motor starter S-LDM, which operates to stop the left drill motor.

It will be noted that stepping of the wafer arm to "stand-by" also de-energizes the transfer relay L shown in Figure 37. The operator manipulates the switch SAD to open the SAD-1 contacts (Figure 37) and the circuit is again ready to function automatically.

With the transfer mechanism down, the clamp in the upward position, the drill motors stopped, and the various indicator lights actuated, the drill cycle has been completed. The operator is then in a position to run a test cycle on the machine to test the accuracy of the split drilling operation.

9. Auxiliary drilling

The auxiliary drilling operation will be described with reference to an unbalance in the crankshaft of a nature requiring an auxiliary drilling operation on both the left and right-hand sides.

It will be recalled in connection with the description of the testing cycle in the right-hand correction plane that if the unbalance is of a nature to require an auxiliary drilling operation, the *adr* switch will be actuated and the *adr*-1 contacts (Figure 37) will close to energize the AD relay and open the AD–1 contacts so that power is cut off to the servo motor 12 and relay TD. Also, the pointer 99 will lie within the auxiliary counter-weight sector 136 on scale 133, shown in Figure 9.

The fact that unbalance is present in the right-hand correction plane will also be indicated to the operator by the indicator lights *l*–5 or *l*–9. The particular light will be actuated when the wafer arms are on terminals 2 and remain actuated when the wafer arms are stepped from terminals 2 to terminals 3 by the closure of contacts *c*–5 (Figure 21) as has been explained heretofore.

In order to accomplish the shifting of the center of mass, drilling is done, as has been mentioned heretofore, in the auxiliary counterweight 15*d*. In order for the operator to more easily determined the amount of metal and its angular location that is necessary to be removed from the auxiliary counterweight, he is provided with certain charts from which he is able to determine the setting of cam 63 and the proper angular orientation of the crankshaft.

The operations to set up the cam 63 in its proper position and to correctly orient the crankshaft are described below. The operator turns the auxiliary drill switch ADS on panel 29 to the right. When this switch is moved, the movable arms of the ADS–1 and ADS–2 contacts move to their other positions, shown by dotted lines, in auxiliary drill switch circuit (Figure 47).

Movement of the movable arm of the ADS–1 contact deenergizes the sequence switch holding relay SSH. When this relay is de-energized, the SSH–1 contacts in the test circuit (Figure 22) are opened. This renders the sequence switch solenoid SS–S inoperative. Also, energizing of the SSH relay opens the SSH–2 contacts shown on the right drill indicator light circuit (Figure 33) which de-energizes the right drill light 1–5 or 1–9. In addition, the opening of the SSH–3 contacts shown on the left drill light circuit (Figure 34) breaks the circuit to the light 1–6 or 1–10.

The operator manipulates the SAD switch to close the SAD–1 contacts (Figure 37) to energize the lift relay L and bring up the lift. Closing of the ADS–2 contacts energizes the right auxiliary drill relay RAD and also energizes the right auxiliary drill operation light 1–11 through the lift microswitch contacts *lms*–10, which are closed since the lift is up.

When the right auxiliary drill relay RAD is energized, the RAD–1 contacts shown in Figure 28 move to the dotted line position, this disconnects the right angle servo motor RASM, and with one coil de-energized, the motor is rendered inoperative. Closure of the RAD relay also moves the movable arm of the RAD–3 contacts to the dotted line position shown in Figure 31. By means of this connection, the contact 257 of converter 258 is connected through the LAD–4 contacts, through the RAD–3 contacts, to the movable arm 322*a* of potentiometer resistor 322*b* of potentiometer 322.

One side of potentiometer resistor 322*b* is connected to the potentiometer resistor 262 of standard cell 263, and is also connected to ground terminal 256*a*. The other side of potentiometer resistor 322*b* is connected via calibrating potentiometer 323 to the movable arm 261 of the standard cell. Thus, a known voltage is impressed across the terminals of potentiometer resistor 322*b*.

The movable arm 322*a* is interconnected with the right depth setting knob DSR on panel 29. When the DSR knob is turned, the mavable arm is variably positioned on the potentiometer resistor 322*b*. Thus, a proportional amount of the voltage appearing across potentiometer resistor 322*b* will appear between converter contact 257 and ground. As explained before, the voltage appearing between contact 259 and ground will be determined by the position of movable arm 72*a* on potentiometer resistor 72*b*.

Thus, by means of the above-described connections, the signal from the testing mechanism, which ordinarily would appear between terminal 257 and ground, has been cut out and substituted therefor is another signal which is a function of the actuation of knob DSR. Thus, the knob DSR may be properly manipulated and the memory circuit operates in a manner heretofore described to position cam 63.

The knob DSR may be set in accordance with information obtained from the above-mentioned graphs.

With the cam 63 properly positioned, the operator than rotates and crankshaft so that the index line 130 on disk 97 is coincident with one of the index lines 142 on the scale 133. The proper index line selected is determined from the graphs provided to the operator. The operator then removes drills 19 and 21 and inserts drill 20.

The machine is now set up for the operator to perform the auxiliary drill operation.

The operator then pushes the right drill button PBR, at which time the clamp 25 comes down to clamp the crankshaft and the coolant mechanism operates to supply coolant to the drill. When drilling has been completed and the drill returned, the clamp 25 comes up to free the work piece and the coolant mechanism operates to stop the supply of fluid.

The operator changes the appropriate drills and the machine is then conditioned for the auxiliary drilling operation in the left correction plane.

The operator throws the auxiliary drill switch ADS to the left side (Figure 47) and the contacts ADS–1 remain open to keep the SSH relay de-energized so that the SSH–1 contacts remain open. When the ADS–2 contacts are moved to the left, then right auxiliary drill relay RAD is de-energized along with the right auxiliary drill operation light 1–11. This operation energizes the left auxiliary drill relay LAD and also energizes the left auxiliary drill operation light 1–12. The RAD–1 contacts shown on Figure 28 move from the dotted position to reconnect the RASM servo motor, the RDSM motor, the transducer shorting relay RP and the right pivot relay RP. The RAD–3 contacts, shown on Figure 31, also move from the dotted position to interconnect the right depth memory circuit 184.

With energizing of the left auxiliary drill relay LAD, the LAD–2 contacts shown in Figure 28 move to the dotted position to disconnect the LASM servo motor. This operation energizes the control relay RE which actuates the RE–2 and RE–4 contacts shown in Figure 31, to move to the dotted positions and thus interconnect the left depth servo motor for operation. The LAD–3 contacts shown in Figure 28 are opened and, therefore, the left pivot relay is de-energized. The LAD–4 contacts shown in Figure 31 move to the dotted position to interconnect the potentiometer 324 with the contact arm 257 on converter 258. The contact 259 of the converter is connected to the potentiometer 293.

The movable arm 324*b* is interconnected with the left depth setting knob DSL. When the DSL knob is actuated, the circuit functions in a manner similar to that described in connection with the description of the function of the DSR knob, and the cam 189 is appropriately positioned.

The operator then rotates the crankshaft until the index line 130 on disk 97 is coincident with the proper index lines 143 in the left auxiliary counterweight sector 138.

With the cam and crankshaft properly positioned, the operator pushes the left drill button PBL.

When the drill returns to its normal up position, the operator turns the ADS switch back to its center position, and the left auxiliary drill relay LAD and the left auxiliary drill operation light 1–12 are de-energized. De-energizing of the LAD relay moves the various LAD contacts mentioned above back to their normal positions.

The operator then pushes the safety stop button PBS to sequence the machine to "stand-by" position. The operation of the safety stop button to accomplish this operation will be explained later. As will be seen in Figure 37, the stepping of the sequence switch to "stand-by" de-energizes the lift relay L so that the lift deposits the crankshaft on the rollers. The operator then manipulates the SAD switch to open the SAD–1 contacts.

The machine is now in condition for the operator to run a test cycle to determine whether or not the center of mass in each correction plane has been shifted so that drilling may be accomplished in the main counterweights.

MANUAL TEST

Under normal operating procedure, the equipment of the present invention first tests for unbalance in the right correction plane and then automatically conditions itself for testing in the left correction plane. These periods of testing in the right and left correction planes are accomplished in fixed periods of time. In the event that it is desired to test in one or the other of the correction planes for more than the normal period, for example, for calibration purposes, this may be accomplished as follows:

When it is desired to so test in the right correction plane, the operator throws the manual test switch MTB, shown on panel 29, to the right-hand side. Actuation of the MTB switch closes contacts MTB–1 and MTB–3, shown in Figure 28. The movable arm of the MTB switch is interconnected in the safety stop circuit (Figure 26) by lead 480a. Contacts MTB–3 and MTB–4 of the switch are interconnected in the safety stop circuit by lead 480b. As will be apparent, the positioning of the movable arm of the MTB switch on contact 3 effectively short-circuits the testing motor starter contacts S–TM2 and the c–2 contacts. Thus, closure of the switch as above mentioned energizes the testing motor starter relay S–TM. Energizing of the starter relay closes contacts S–TM1 on Figure 27 to supply power to the testing motor 205.

During this operation, the timing mechanism and the sequence stepping switch are both inoperative. With reference to Figure 22, it will be recalled that the sequence switch solenoid is initially energized by actuation of the test pushbutton PBT. Since the motor is started with the actuation of the manual test switch MTB, it is not necessary to close the test button. With reference to Figure 23, it will be observed that the timer motor which operates the timing mechanism cannot be started until the wafer arm W4a is on terminal 2 of wafer W4. Since the sequence switch solenoid is never energized to step the wafer arms, the arms will remain on terminals 1 and consequently the timer motor cannot operate.

When the movable arm of the MTB switch is in engagement with contacts MTB–1, power is supplied to the right pivot relay RP, the transducer shorting relay PS, and one coil of the RDSM and RASM servo motors. Actuation of the right pivot relay RP disengages the right pivot 50 from the cradle 35. Energizing of the transducer shorting relay PS unshorts the transducers so that a signal from the right transducer coil 176a may be fed to the testing mechanism 179, as is seen in Figure 30. The respective coils of the right depth servo motor RDSM and the right angle servo motor RASM are fed with power through connections 248 and 250.

The mechanism then operates in the manner described heretofore to position the cam 63 and the pointer 99. The mechanism may be left in this condition for an indefinite period while certain calibration operations or other tests are carried out. For example, under such conditions, the calibration potentiometer 260 in the right depth memory circuit and the calibration potentiometer 279 in the right angle memory circuit may be adjusted.

Testing for prolonged periods of time may be performed in the left correction plane by the operator throwing the manual test switch MTB to the left side. This interconnects the movable arms of the MTB switch to terminal MTB–2 and terminal MTB–4.

Thus, the right pivot relay is de-energized, the effect of which is to engage the right pivot. The de-energizing of the transducer shorting relay PS shorts out the transducers and power is removed from the coils of the RDSM and RASM motors, to render the same inoperative. As has been explained above, when the movable arm is in engagement with contact 4, the testing motor is operative, and with the movable arm in engagement with terminal 2, the left pivot relay LP is energized, which disengages the left pivot 49. The control relay RE is energized, which operates the various RE contacts on the memory circuits shown in Figures 31 and 32, which sets up these circuits for operation on the left side. Energizing of the pivot selector relay RLP disconnects the coil 176a and interconnects the transducer coil 177a for operation. The coils of the left depth servo motor and the left angle servo motor are supplied with power through the connections 288 and 290.

Thus, the machine is set up for indefinite testing in the left correction plane and the operator may perform desired calibration operations.

SAFETY STOP

The equipment is provided with a safety stop button which operates to stop the operation of the equipment when the machine is in the "stand-by" position or operating in the testing cycles or going through any of the drilling operations. The safety stop button is shown connected in the safety stop circuit (Figure 26) and in the depth contactor circuit (Figure 42).

When the machine is operating in the test cycle, the wafer arms W1a, W2a, etc., are on terminals 2. As seen in Figure 26, if the safety stop button is actuated, the terminals PBS–1 open to de-energize the testing motor starter S–TM, which stops the testing motor. The testing motor brake is also applied when the starter S–TM is de-energized. At 80% time the wafer arms W1a, W2a, etc., are stepped from terminals 2 to terminals 3. With wafer arms on terminals 3, actuation of safety button PBS steps the wafer arms to stand-by in a manner explained following.

As is seen in Figure 26, one side of the contacts PBS–2 and PBS–4 is connected together. The leads 420a, 420b and 420c connect the PBS–2 contacts and the PBS–4 contacts in the depth contactor circuit, as shown in Figure 42.

When the safety stop button PBS is actuated, the contacts PBS–2 and PBS–4 are closed. The effect of this is to short-circuit the bias potentials being applied to tubes 307 and 311. The tubes, therefore, start conducting and the depth contactor relays RDC and LDC are energized. This closes the contacts RDC–2 and LDC–2 shown on the sequence switch stepping circuit (Figure 21). Since the wafer arm W1a is engaged with terminal 3, closure of the RDC–2 contacts will step the wafer arms from 3 to 4 and then on through the various terminals back to the "stand-by" terminals 1, in a manner heretofore described.

With the machine set for normal drilling, split drilling or auxiliary drilling, actuation of the safety stop switch PBS will return the drills to their normally up position and at the same time, the machine will be sequenced to the "stand-by" position. For example, if normal drilling operation is being performed in the right correction plane, the wafer arms W1a, W2a, etc., are on terminals 3. Actuation of the safety stop button energizes the right and left depth contactor relays RDC and LDC and closes the RDC-2 and the LDC-2 contacts and the wafer arms, therefore, will be stepped from terminals 3 back to the "stand-by" terminals 1.

If normal drilling is being accomplished in the left correction plane, the wafer arms W1a, W2a, etc., are on terminals 6. Actuation of the safety stop button effects the closure of the LDC-2 contacts and the wafer arms are thus stepped from terminals 6 to "stand-by" terminals 1.

If split drilling is being accomplished in the right-hand correction plane, for example, if the operator is on the first hole, the wafer arms are on terminals 3 and closure of the RDC-2 contacts by actuation of the safety stop button PBS steps the wafer arms from terminals 3 back to "stand-by" terminals 1. If the operator is on the second hole of the right split drill operation, the wafer arms W1a, W2a, etc., will be on terminals 5, and closure of the RDC-2 contacts and the LDC-2 contacts by actuation of the safety stop button will step the wafer arms from terminals 5 to "stand-by" terminals 1.

For split drilling in the left-hand correction plane, the wafer arms for the first hole are on terminals 6 and for the second hole are on terminals 8. In either of these cases, the actuation of the LDC relay closes the LDC-2 contacts and the wafer arms are stepped from terminals 6 or terminals 8 back to the "stand-by" terminals 1.

When the machine is set for auxiliary drilling either in the left or right correction planes, since the wafer arms are on terminals 3 for the right auxiliary drill and on terminals 6 for the left auxiliary drill, actuation of the RDC and LDC relays will both return the drills to normal position but does not advance the wafer arms as the sequence switch holding contacts (Figure 22) are open.

If the machine is set up for manual testing, either in the right or left correction planes, the actuation of the safety stop will de-energize the motor starter S-TM to stop the testing motor 205, and also de-energize the power being supplied through the manual test switch MTB. Since the wafer arms W1a, W2a, etc., are on "stand-by" terminals 1 for the manual test operation, it is necessary for the operator to throw the manual test switch MTB to the neutral position to keep the manual test circuit de-energized.

I claim:

1. In equipment for balancing a work piece: testing mechanism for determining dynamic unbalance in said work piece by determining the amount and location of unbalance in each of two planes of correction of said work piece, the planes being speced along and normal to the rotational axes of the work piece; means for performing a correction operation in each of said planes; means connected with said testing mechanism to physically position said work piece in each of said correction planes with respect to said correction mechanism in accordance with the location of unbalance; and control means connected with said elements to establish the following sequence of operations: to cause said testing mechanism to operate to determine said amount and location of unbalance in each of said correction planes; to cause said positioning mechanism to operate to position said work piece in one of said correction planes; to cause said correction mechanism to perform a correction operation in said one plane; to cause said positioning mechanism to position said work piece in accordance with the location of unbalance in the other of said planes; and to cause said correction mechanism to perform a correction operation in the other of said planes.

2. In equipment for balancing a work piece: mechanism rotatably supporting said work piece in a testing station; drive means for rotating said work piece in the testing station; mechanism for determining the magnitude and angle of unbalance in a plane of correction drawn transverse the axis of rotation of the work piece; means for performing a correction operation on said work piece in said correction plane; and positioner mechanism for physically positioning the work piece with respect to said correction mechanism including a positioning motor interconnected to said drive means, a synchro transmitter, the rotor of which is connected to said testing mechanism and positionable in accordance with the angle of unbalance, a synchro receiver connected to said transmitter whose rotor is interconnected to said drive means, and a phase-sensitive device connected to the receiver rotor and adapted to supply a driving signal to said positioning motor in accordance with the angular position of the receiver rotor.

3. In equipment for balancing a work piece: mechanism rotatably supporting said work piece in a testing station; drive means for rotating said work piece in the testing station; mechanism for determining the magnitude and angle of unbalance in two planes of correction drawn transverse of the axis of rotation of the work piece; means for performing a correction operation on said work piece in said correction planes; and positioner mechanism for physically positioning the work piece with respect to said correction mechanism including a positioning motor interconnected to said drive means, a pair of synchro transmitters, the rotors of which are respectively connected to said testing mechanism and adapted to be respectively positioned in accordance with the angular location of unbalance in said correction planes, a synchro receiver alternatively connectible with said transmitters, whose rotor is connected to said drive means, and a phase-sensitive device connected to the receiver rotor and adapted to supply a driving signal to said positioning motor in accordance with the angular position of the receiver rotor.

4. In equipment for balancing a work piece: mechanism for rotatably supporting a work piece in a testing station; mechanism for determining the amount and location of unbalance in a correction plane for the work piece while in said testing station; lift means to move the work piece from the testing station whereby the work piece is supported in a correction station; means to clamp said work piece in said correction station; means for performing a correction operation on said work piece in said plane while in said correction station; means connected with said testing mechanism for physically positioning said work piece with respect to said correction mechanism in said correction plane in accordance with the location of unbalance therein; and control means connected with said elements to establish the following sequence of operations: to cause said testing mechanism to determine said amount and location of unbalance; to cause said positioning mechanism to operate to position said work piece; to cause said lift mechanism to move said work piece to said correction station; to cause said clamp mechanism to clamp said work piece in said correction station; and to cause said correction mechanism to perform a correction operation.

5. In equipment for balancing a work piece: mechanism for rotatably supporting a work piece in a testing station; mechanism for determining the amount and location of unbalance in each of two planes of correction of said work piece; lift means to move the work piece from the testing station whereby the work piece is supported in a correction station; means to clamp said work piece in said correction station; means for performing a correction operation on said work piece in each of said planes while said work piece is in said correction station; means connected with said testing mechanism for physically positioning said work piece with respect to said correction mechanism in said correction planes respectively in accordance with the location of unbalance therein; and control means connected with said elements to establish the following sequence of operations: to cause said testing mechanism to determine the amount and location of unbalance in each of said correction planes; to cause said positioning mechanism to operate to position said work piece in one of said correction planes; to cause said lift mechanism to move said work piece to said correction station; to cause said clamp mechanism to clamp said work piece in said correction station; to cause said correction mechanism to perform a correction operation in said one plane; to cause said clamp mechanism to unclamp said work piece; to cause said lift mechanism to move the work piece to said testing station; to cause said positioning mechanism to operate to position said work piece in the other of said correction planes; to cause said lift mechanism to move said work piece to said correction station; to cause said clamp mechanism to clamp said work piece in said correction station; and to cause said correction mechanism to perform a correction operation in said other correction plane.

References Cited in the file of this patent

UNITED STATES PATENTS

| | | |
|---|---|---|
| 2,235,393 | Baker | Mar. 18, 1941 |
| 2,300,354 | Eddison | Oct. 27, 1942 |
| 2,322,561 | Bevins et al. | June 22, 1943 |
| 2,331,733 | Senger | Oct. 12, 1943 |
| 2,346,975 | Laboulais | Apr. 18, 1944 |
| 2,449,563 | Minorsky | Sept. 21, 1948 |
| 2,492,092 | Bulliet | Dec. 20, 1949 |
| 2,779,217 | Stovall et al. | Jan. 29, 1957 |
| 2,783,649 | Hope | Mar. 5, 1957 |
| 2,792,725 | Lannen | May 21, 1957 |
| 2,810,307 | Hack | Oct. 22, 1957 |

FOREIGN PATENTS

| | | |
|---|---|---|
| 744,295 | Great Britain | Feb. 1, 1956 |

OTHER REFERENCES

The Machinist (British), pp. 283 to 288. Copy in Div. 36.

Disclaimer 2,909,948.—*Warren M. Gruber*, Horsham, Pa. BALANCING EQUIPMENT. Patent dated Oct. 27, 1959. Disclaimer filed Sept. 25, 1962, by the inventor and the assignee, *Tinius Olsen Testing Machine Company*.

Hereby enter this disclaimer to claims 1, 4 and 5 of said patent.
[*Official Gazette October 30, 1962.*]